United States Patent
Vaisman et al.

(10) Patent No.: US 11,801,731 B1
(45) Date of Patent: Oct. 31, 2023

(54) THERMAL MANAGEMENT SYSTEMS

(71) Applicant: Booz Allen Hamilton Inc., McLean, VA (US)

(72) Inventors: Igor Vaisman, Carmel, IN (US); Joshua Peters, Knoxville, TN (US)

(73) Assignee: Booz Allen Hamilton Inc., McLean, VA (US)

( * ) Notice: Subject to any disclaimer, the term of this patent is extended or adjusted under 35 U.S.C. 154(b) by 0 days.

(21) Appl. No.: 16/807,353

(22) Filed: Mar. 3, 2020

Related U.S. Application Data

(60) Provisional application No. 62/813,831, filed on Mar. 5, 2019.

(51) Int. Cl.
*B60H 1/00* (2006.01)
*B60H 1/14* (2006.01)

(52) U.S. Cl.
CPC ......... *B60H 1/00899* (2013.01); *B60H 1/143* (2013.01); *B60H 2001/00928* (2013.01)

(58) Field of Classification Search
CPC ............... B60H 1/00899; B60H 1/143; B60H 2001/00928
See application file for complete search history.

(56) References Cited

U.S. PATENT DOCUMENTS

| | | | |
|---|---|---|---|
| 1,836,318 A | 12/1931 | Gay | |
| 2,083,611 A * | 6/1937 | Marshall | F25B 23/006 174/15.1 |
| 2,180,090 A * | 11/1939 | Mesinger | F17C 9/02 137/169 |
| 2,207,728 A * | 7/1940 | Goodman | F25B 29/003 62/509 |
| 2,207,729 A * | 7/1940 | Goodman | F25B 49/02 62/133 |
| 2,226,797 A * | 12/1940 | Andersson | F25B 25/005 62/110 |
| 2,489,514 A | 11/1949 | Benz | |

(Continued)

FOREIGN PATENT DOCUMENTS

| | | |
|---|---|---|
| JP | 8-278040 | 10/1996 |
| WO | WO 2013/115156 | 8/2013 |

OTHER PUBLICATIONS

U.S. Appl. No. 16/872,584, filed May 12, 2020, Vaisman et al.
(Continued)

*Primary Examiner* — Ljiljana V. Ciric
(74) *Attorney, Agent, or Firm* — Fish & Richardson P.C.

(57) ABSTRACT

A thermal management system includes an open-circuit refrigeration system having an open-circuit refrigerant fluid flow path. The open-circuit refrigeration system includes a receiver configured to store a refrigerant fluid, an evaporator configured to receive the refrigerant fluid at an evaporator inlet and to extract heat from a heat load that contacts the evaporator, and provide refrigerant vapor at an evaporator outlet. The open-circuit refrigeration system also includes a vapor pump device having a vapor pump inlet that receives the refrigerant vapor and having a vapor pump outlet that outputs compressed refrigerant vapor to an exhaust line coupled to the vapor pump outlet, with the receiver, the evaporator, the vapor pump device, and the exhaust line connected in the open-circuit refrigerant fluid flow path.

34 Claims, 34 Drawing Sheets

(56) References Cited

U.S. PATENT DOCUMENTS

| | | | |
|---|---|---|---|
| 2,526,221 A | 10/1950 | Goddard | |
| 2,785,540 A | 3/1957 | Biehn | |
| 2,885,864 A | 5/1959 | Benjamin | |
| 3,059,444 A * | 10/1962 | Bickel | A23G 9/228 62/352 |
| 3,073,380 A * | 1/1963 | Palmason | B01D 3/06 159/2.3 |
| 3,300,996 A | 1/1967 | Atwood | |
| 3,468,421 A | 9/1969 | Hazel et al. | |
| 3,542,338 A | 11/1970 | Scaramucci | |
| 3,600,904 A | 8/1971 | Tilney | |
| 3,667,244 A * | 6/1972 | Hock | F25B 47/022 62/352 |
| 3,685,310 A | 8/1972 | Bitter et al. | |
| 3,789,583 A | 2/1974 | Smith | |
| 3,866,427 A | 2/1975 | Rothmayer et al. | |
| 3,882,689 A * | 5/1975 | Rogers | F25B 5/00 62/115 |
| 4,015,439 A * | 4/1977 | Stern | F25B 23/00 62/115 |
| 4,016,657 A | 4/1977 | Passey | |
| 4,054,433 A | 10/1977 | Buffiere et al. | |
| 4,105,439 A | 8/1978 | Barnes | |
| 4,123,919 A | 11/1978 | Fehlhaber | |
| 4,151,724 A | 5/1979 | Garland | |
| 4,169,361 A | 10/1979 | Baldus | |
| 4,191,511 A | 3/1980 | Stewart et al. | |
| 4,275,570 A | 6/1981 | Szymaszek et al. | |
| 4,280,105 A * | 7/1981 | Marcy | H01S 3/041 372/58 |
| 4,313,305 A * | 2/1982 | Egosi | F25B 30/00 203/DIG. 20 |
| 4,323,109 A | 4/1982 | Jaster | |
| 4,352,272 A | 10/1982 | Taplay | |
| 4,419,865 A | 12/1983 | Szymaszek | |
| 4,438,635 A | 3/1984 | McCoy, Jr. | |
| 4,466,253 A | 8/1984 | Jaster | |
| 4,539,816 A | 9/1985 | Fox | |
| 4,870,830 A | 10/1989 | Hohenwarter et al. | |
| 4,969,495 A | 11/1990 | Grant | |
| 5,088,304 A | 2/1992 | Schlichtig | |
| 5,094,277 A | 3/1992 | Grant | |
| 5,127,230 A | 7/1992 | Neeser et al. | |
| 5,174,126 A * | 12/1992 | Cameron | B01D 53/261 62/270 |
| 5,176,008 A | 1/1993 | Van Steenburgh, Jr. | |
| 5,187,953 A | 2/1993 | Mount | |
| 5,191,776 A | 3/1993 | Severance et al. | |
| 5,245,840 A | 9/1993 | Van Steenburgh, Jr. | |
| 5,297,392 A | 3/1994 | Takata et al. | |
| 5,325,894 A | 7/1994 | Kooy et al. | |
| 5,353,603 A | 10/1994 | Outlaw et al. | |
| 5,360,139 A | 11/1994 | Goode | |
| 5,429,179 A * | 7/1995 | Klausing | F02G 5/00 62/238.7 |
| 5,471,848 A | 12/1995 | Major et al. | |
| 5,513,961 A | 5/1996 | Engdahl et al. | |
| 5,690,743 A | 11/1997 | Murakami et al. | |
| 5,762,119 A | 6/1998 | Platz et al. | |
| 5,974,812 A | 11/1999 | Kátai et al. | |
| 6,044,647 A | 4/2000 | Drube et al. | |
| 6,076,360 A | 6/2000 | Viegas et al. | |
| 6,112,532 A | 9/2000 | Bakken | |
| 6,230,518 B1 | 5/2001 | Hahn et al. | |
| 6,314,749 B1 | 11/2001 | Van Steenburgh, Jr. | |
| 6,336,333 B1 * | 1/2002 | Lindgren | C09K 5/042 252/67 |
| 6,354,088 B1 | 3/2002 | Emmer et al. | |
| 6,381,972 B1 | 5/2002 | Cotter | |
| 6,427,453 B1 * | 8/2002 | Holtzapple | F24F 5/00 62/502 |
| 6,474,101 B1 | 11/2002 | Quine et al. | |
| 6,564,578 B1 | 5/2003 | Fischer-Calderon | |
| 6,684,658 B2 * | 2/2004 | Holtzapple | F04C 29/005 62/196.4 |
| 6,964,168 B1 | 11/2005 | Pierson et al. | |
| 7,287,581 B2 * | 10/2007 | Ziehr | B60H 1/00278 62/238.7 |
| 7,377,126 B2 | 5/2008 | Gorbounov et al. | |
| 7,497,180 B2 | 3/2009 | Karlsson et al. | |
| 7,891,197 B2 | 2/2011 | Winter | |
| 7,987,685 B2 | 8/2011 | Oshitani et al. | |
| 9,016,413 B2 * | 4/2015 | Ikeya | B60K 11/08 219/202 |
| 9,267,645 B2 | 2/2016 | Mackey | |
| 9,331,349 B2 * | 5/2016 | Yamazaki | H01M 8/04029 |
| 9,791,221 B1 | 10/2017 | Litch | |
| 9,887,079 B2 | 2/2018 | Sugawara et al. | |
| 9,987,904 B2 * | 6/2018 | Koyama | H01M 8/04029 |
| 10,612,821 B1 | 4/2020 | Fernando | |
| 11,112,155 B1 * | 9/2021 | Vaisman | F25B 19/005 |
| 11,168,925 B1 * | 11/2021 | Vaisman | F25B 39/028 |
| 11,293,673 B1 | 4/2022 | Vaisman et al. | |
| 11,313,594 B1 | 4/2022 | Davis et al. | |
| 11,333,402 B1 * | 5/2022 | Vaisman | F25B 41/20 |
| 11,384,960 B1 * | 7/2022 | Vaisman | F25B 49/00 |
| 11,408,649 B1 * | 8/2022 | Vaisman | F25B 39/028 |
| 11,421,917 B1 * | 8/2022 | Vaisman | F25B 19/00 |
| 11,448,431 B1 * | 9/2022 | Davis | F25B 7/00 |
| 11,486,607 B1 * | 11/2022 | Davis | F25B 9/006 |
| 11,536,494 B1 * | 12/2022 | Davis | F25B 7/00 |
| 11,561,029 B1 * | 1/2023 | Vaisman | F25B 49/00 |
| 11,561,030 B1 * | 1/2023 | Vaisman | F25B 1/00 |
| 11,561,033 B1 * | 1/2023 | Vaisman | F25B 40/06 |
| 11,561,036 B1 * | 1/2023 | Vaisman | F25B 43/003 |
| 11,629,890 B1 * | 4/2023 | Vaisman | F25B 5/02 62/199 |
| 11,629,892 B1 * | 4/2023 | Vaisman | F25B 5/04 62/79 |
| 11,629,901 B1 * | 4/2023 | Vaisman | F25B 43/00 62/115 |
| 11,635,237 B1 * | 4/2023 | Vaisman | F25B 39/028 62/115 |
| 11,639,818 B2 * | 5/2023 | Vaisman | F25B 41/24 62/159 |
| 11,644,221 B1 * | 5/2023 | Vaisman | F25B 31/02 62/115 |
| 11,644,251 B2 * | 5/2023 | Vaisman | F25B 41/31 62/115 |
| 11,692,742 B1 * | 7/2023 | Vaisman | F25B 41/345 62/117 |
| 11,698,210 B1 * | 7/2023 | Vaisman | F25B 39/00 62/160 |
| 11,732,941 B1 * | 8/2023 | Vaisman | F25B 41/24 62/117 |
| 2002/0088243 A1 * | 7/2002 | Holtzapple | F25B 29/00 62/304 |
| 2002/0148225 A1 | 10/2002 | Lewis | |
| 2002/0157407 A1 | 10/2002 | Weng | |
| 2004/0123624 A1 | 7/2004 | Ohta et al. | |
| 2004/0154328 A1 * | 8/2004 | Holtzapple | F04C 18/0223 62/268 |
| 2005/0060970 A1 | 3/2005 | Polderman | |
| 2005/0201429 A1 | 9/2005 | Rice et al. | |
| 2006/0107671 A1 | 5/2006 | Yoshida et al. | |
| 2006/0207285 A1 | 9/2006 | Oshitani et al. | |
| 2006/0218964 A1 | 10/2006 | Saito et al. | |
| 2006/0222522 A1 * | 10/2006 | Holtzapple | F04C 18/0223 417/313 |
| 2006/0254308 A1 | 11/2006 | Yokoyama et al. | |
| 2007/0000262 A1 | 1/2007 | Ikegami et al. | |
| 2007/0007879 A1 | 1/2007 | Bergman, Jr. et al. | |
| 2007/0039349 A1 | 2/2007 | Yamada et al. | |
| 2007/0180852 A1 | 8/2007 | Sugiura et al. | |
| 2008/0087040 A1 | 4/2008 | Oshitani et al. | |
| 2008/0092559 A1 | 4/2008 | Williams et al. | |
| 2008/0148754 A1 | 6/2008 | Snytsar | |
| 2008/0196446 A1 | 8/2008 | Nakamura et al. | |
| 2009/0110986 A1 * | 4/2009 | Choi | H01M 8/04302 429/432 |
| 2009/0158727 A1 | 6/2009 | Marsala | |

(56) References Cited

U.S. PATENT DOCUMENTS

| | | |
|---|---|---|
| 2009/0211298 A1 | 8/2009 | Saul |
| 2009/0219960 A1 | 9/2009 | Uberna et al. |
| 2009/0228152 A1 | 9/2009 | Anderson et al. |
| 2010/0050668 A1 | 3/2010 | Bush et al. |
| 2010/0098525 A1 | 4/2010 | Guelich |
| 2010/0154395 A1* | 6/2010 | Frick .................... F22B 1/1807 123/142.5 R |
| 2011/0114284 A1 | 5/2011 | Siegenthaler |
| 2011/0185712 A1* | 8/2011 | Burns ...................... F28F 9/26 165/182 |
| 2011/0185726 A1* | 8/2011 | Burns ..................... F01K 23/10 60/618 |
| 2011/0209771 A1 | 9/2011 | Yung et al. |
| 2011/0314805 A1* | 12/2011 | Seale ................... F02G 1/0435 60/522 |
| 2012/0167601 A1 | 7/2012 | Cogswell et al. |
| 2012/0204583 A1 | 8/2012 | Liu |
| 2012/0312379 A1 | 12/2012 | Gielda et al. |
| 2013/0000341 A1 | 1/2013 | De Piero et al. |
| 2013/0025305 A1 | 1/2013 | Higashiiue et al. |
| 2013/0104593 A1 | 5/2013 | Occhipinti |
| 2013/0111934 A1 | 5/2013 | Wang et al. |
| 2013/0111947 A1 | 5/2013 | Hodges et al. |
| 2013/0125569 A1 | 5/2013 | Verma et al. |
| 2013/0241204 A1 | 9/2013 | Brookman et al. |
| 2013/0340622 A1 | 12/2013 | Marty et al. |
| 2014/0075984 A1 | 3/2014 | Sugawara et al. |
| 2014/0165633 A1 | 6/2014 | De Piero et al. |
| 2014/0166238 A1 | 6/2014 | Sandu |
| 2014/0260341 A1 | 9/2014 | Vaisman et al. |
| 2014/0260415 A1 | 9/2014 | Ducote, Jr. et al. |
| 2014/0326002 A1 | 11/2014 | Sunderland et al. |
| 2014/0331699 A1 | 11/2014 | Higashiiue |
| 2014/0342260 A1* | 11/2014 | Koyama ................. B60L 1/003 429/439 |
| 2014/0345318 A1 | 11/2014 | Nagano et al. |
| 2014/0356748 A1* | 12/2014 | Yamazaki ......... H01M 8/04007 429/435 |
| 2014/0366563 A1 | 12/2014 | Vaisman et al. |
| 2015/0059379 A1 | 3/2015 | Ootani et al. |
| 2015/0121718 A1 | 5/2015 | Huang et al. |
| 2015/0184885 A1 | 7/2015 | Prins |
| 2015/0260435 A1 | 9/2015 | Kawano et al. |
| 2015/0260463 A1* | 9/2015 | Laughlin ................... F01K 3/12 165/104.31 |
| 2015/0263477 A1 | 9/2015 | Onaka |
| 2016/0010907 A1 | 1/2016 | Ali |
| 2016/0114260 A1 | 4/2016 | Frick |
| 2016/0200175 A1 | 7/2016 | Nakajima et al. |
| 2016/0201956 A1 | 7/2016 | Tamura et al. |
| 2016/0216029 A1 | 7/2016 | Ragot |
| 2016/0291137 A1 | 10/2016 | Sakimura et al. |
| 2016/0333747 A1 | 11/2016 | KanFman |
| 2017/0002731 A1* | 1/2017 | Wei ......................... F03G 6/003 |
| 2017/0081982 A1 | 3/2017 | Kollmeier et al. |
| 2017/0108263 A1 | 4/2017 | Cermak et al. |
| 2017/0167767 A1 | 6/2017 | Shi et al. |
| 2017/0205120 A1 | 7/2017 | Ali et al. |
| 2017/0299229 A1 | 10/2017 | Carter et al. |
| 2018/0023805 A1 | 1/2018 | Qin et al. |
| 2018/0111504 A1* | 4/2018 | Matsusue ................ B60L 58/33 |
| 2018/0149396 A1 | 5/2018 | Kawano et al. |
| 2018/0180307 A1 | 6/2018 | Owejan et al. |
| 2018/0245740 A1 | 8/2018 | Kaminsky et al. |
| 2018/0245835 A1 | 8/2018 | Kamei et al. |
| 2018/0328638 A1 | 11/2018 | Mahmoud et al. |
| 2018/0347878 A1 | 12/2018 | Son et al. |
| 2018/0356133 A1 | 12/2018 | Tsuji et al. |
| 2019/0048757 A1 | 2/2019 | Noureldin et al. |
| 2019/0111764 A1 | 4/2019 | Oshitani et al. |
| 2019/0170425 A1 | 6/2019 | Takami et al. |
| 2019/0203988 A1 | 7/2019 | Kobayashi et al. |
| 2019/0248450 A1 | 8/2019 | Lee et al. |
| 2019/0293302 A1 | 9/2019 | Van et al. |
| 2019/0360730 A1 | 11/2019 | Hagh et al. |
| 2019/0381857 A1 | 12/2019 | Lee et al. |
| 2019/0393525 A1 | 12/2019 | Diethelm et al. |
| 2020/0158386 A1 | 5/2020 | Wu et al. |
| 2020/0239109 A1 | 7/2020 | Lee et al. |
| 2020/0363101 A1 | 11/2020 | Jansen |
| 2021/0285700 A1 | 9/2021 | Brillhart |
| 2022/0390149 A1* | 12/2022 | Vaisman .................. F25B 41/20 |
| 2022/0404105 A1* | 12/2022 | Vaisman ............... F25B 43/043 |
| 2022/0412619 A1* | 12/2022 | Swain ................... F25B 39/028 |
| 2022/0412624 A1* | 12/2022 | Vaisman ................. F25B 41/22 |
| 2023/0003423 A1* | 1/2023 | Vaisman ............... F25B 43/043 |
| 2023/0026371 A1* | 1/2023 | Swain ................... F28F 9/0275 |
| 2023/0096113 A1* | 3/2023 | Vaisman ................ F25B 9/008 62/115 |

OTHER PUBLICATIONS

U.S. Appl. No. 16/872,590, filed May 12, 2020, Vaisman et al.
U.S. Appl. No. 16/872,592, filed May 12, 2020, Vaisman et al.
NASA History Office, "Quest for Performance: The Evolution of Modern Aircraft, Part II: The Jet Age, Chapter 10: Technology of the Jet Airplane, Turbojet and Turbofan Systems," NASA Scientific and Technical Information Branch, originally published in 1985, last updated Aug. 6, 2004, 21. pages.
U.S. Appl. No. 16/807,582, filed May 3, 2020, Vaisman.
U.S. Appl. No. 16/807,413, filed May 3, 3030, Vaisman.
U.S. Appl. No. 16/807,411, filed May 3, 2020, Vaisman.
U.S. Appl. No. 16/807,340, filed May 3, 2020, Vaisman.
U.S. Appl. No. 16/684,775, filed Nov. 15, 2019, Peters et al.
U.S. Appl. No. 16/666,995, filed Oct. 29, 2019, Vaisman et al.
U.S. Appl. No. 16/666,992, filed Oct. 29, 2019, Vaisman et al.
U.S. Appl. No. 16/666,986, filed Oct. 29, 2019, Vaisman et al.
U.S. Appl. No. 16/666,977, filed Oct. 29, 2019, Vaisman et al.
U.S. Appl. No. 16/666,973, filed Oct. 29, 2019, Vaisman et al.
U.S. Appl. No. 16/666,966, filed Oct. 29, 2019, Vaisman et al.
U.S. Appl. No. 16/666,962, filed Oct. 29, 2019, Vaisman et al.
U.S. Appl. No. 16/666,959, filed Oct. 29, 2019, Vaisman et al.
U.S. Appl. No. 16/666,954, filed Oct. 29, 2019, Vaisman et al.
U.S. Appl. No. 16/666,950, filed Oct. 29, 2019, Vaisman et al.
U.S. Appl. No. 16/666,940, filed Oct. 29, 2019, Vaisman et al.
U.S. Appl. No. 16/666,899, filed Oct. 29, 2019, Davis et al.
U.S. Appl. No. 16/666,881, filed Oct. 29, 2019, Davis et al.
U.S. Appl. No. 16/666,865, filed Oct. 29, 2019, Davis et al.
U.S. Appl. No. 16/666,859, filed Oct. 29, 2019, Davis et al.
U.S. Appl. No. 16/666,851, filed Oct. 29, 2019, Davis et al.
U.S. Appl. No. 16/448,388, filed Jun. 21, 2019, Vaisman et al.
U.S. Appl. No. 16/448,332, filed Jun. 21, 2019, Vaisman et al.
U.S. Appl. No. 16/448,283, filed Jun. 21, 2019, Vaisman et al.
U.S. Appl. No. 16/448,271, filed Jun. 21, 2019, Vaisman et al.
U.S. Appl. No. 16/448,196, filed Jun. 21, 2019, Vaisman et al.
[No Author Listed], "Thermostatic Expansion Valves" Theory of Operation, Application, and Selection, Bulletin 10-9, Sporlan, Mar. 2011, 19 pages.
ammonia21.com [online], "R717 vs r404a do the advantages outweigh the disadvantages," Nov. 30, 2012, retrieved from <http://www.annnnonia21.conn/articles/3717/>, 13 pages.
Elstroem, "Capacitive Sensors Measuring the Vapor Quality, Phase of the refrigerant and Ice thickness for Optimized evaporator performance," Proceedings of the 13th IIR Gustav Lorentzen Conference on Natural Refrigerants (GL:2018), Valencia, Spain, Jun. 18-20, 2018, 10 pages.
Elstroem, "New Refrigerant Quality Measurement and Demand Defrost Methods," 2017 IIAR Natural Refrigeration Conference & Heavy Equipment Expo, San Antonio, TX, Technical Paper #1, 38 pages.
en.wikipedia.org [online] "Inert gas—Wikipedia" retrieved on Oct. 1, 2021, retrieved from URL <https://en.wikipedia.org/w/index.php?title=Inert_gas&oldid=1047231716>, 4 pages.
en.wikipedia.org [online] "Pressure regulator—Wikipedia," retrieved on Oct. 7, 2021, retrieved from URL < https://en.wikipedia.org/wiki/Pressure_regulator>, 8 pages.

(56) References Cited

OTHER PUBLICATIONS en.wikipedia.org [online], "Isenthalpic process—Wikipedia, the free encyclopedia," available on or before Mar. 29, 2015, via Internet Archive: Wayback Machine URL <https://web.archive.org/web/20150329105343/https://en.wikipedia.org/wiki/lsenthalpicprocess>, retrieved on Jan. 12, 2021, retrieved from URL <https://en.wikipedia.org/wiki/lsenthalpicprocess>, 2 pages.
en.wikipedia.org [online], "Thermal expansion valve—Wikipedia", Dec. 23, 2020, retrieved on Jan. 8, 2021, retrieved from URL <https://en.wikipedia.org/wiki/Thernnal expansion valve>, 4 pages.
en.wikipedia.org [online], "Thermal expansion valve—Wikipedia," available on or before Feb. 14, 2015, via Internet Archive: Wayback Machine URL <https://web.archive.org/web/20150214054154/https://en.wikipedia.org.wiki/Thermal_expansion_valve>, retrieved on Jan. 12, 2021, URL <https://en.wikipedia.org/wiki/Thermal_expansion_valve>, 3 pages.
engineersedge.com [online], "Throttling Process Thermodynamic," Apr. 16, 2015, via Internet Archive: Wayback Machine URL <https://web.archive.org/web/20150416181050/https://www.engineersedge.conn/thernnodynannics/throttling process.htm>, retrieved on Jan. 12, 2021, retrieved from URL <https://en.wikipedia.org/wiki/lsenthalpicprocess>, 1 pages.
International Search Report and Written Opinion in International Appln. No. PCT/US2020/056787, dated Jan. 27, 2021, 13 pages.
Ohio.edu [online], "20 Engineering Thermodynamics Israel Urieli", Sep. 9, 2009, retrieved from URL< https://www.ohio.edu/mechanical/thermo/Intro/Chapt.1_6/Chapter2a.html>, 1 page.
osha.gov, [online] "Storage and handling of anhydrous ammonia," Part No. 1910, Standard No. 1910.111, GPO Source: e-CFR, 2005, retrieved on Oct. 2, 2021, retrieved from URL <https://www.osha.gov/laws-regs/regulations/standardnumber/1910/1910.111>, 31 pages.
thermal-engineering.org [online] "What is Vapor Quality—Dryness Fraction—Definition," May 22, 2019, retrieved on Oct. 19, 2021, retrieved from URL < https://www.thermal-engineering.org/what-is-vapor-quality-dryness-fraction-definition/>, 6 pages.
Wojtan et al., "Investigation of flow boiling in horizontal tubes: Part I—A new diabatic two-phase flow pattern map. International journal of heat and mass transfer," Jul. 2005, 48(14):2955-69.
Wojtan et al., "Investigation of flow boiling in horizontal tubes: Part II—Development of a new heat transfer model for stratified-wavy, dryout and mist flow regimes," International journal of heat and mass transfer, Jul. 2005, 48(14):2970-85.
U.S. Appl. No. 10/126,022, filed Nov. 13, 2018, Cooper.
U.S. Appl. No. 10/907,869, filed Feb. 2, 2021, Hagh et al.
U.S. Appl. No. 11/168,925, filed Nov. 9, 2021, Vaisman et al.
U.S. Appl. No. 11/231,209, filed Jan. 25, 2022, Cavalleri et al.
HBDX-Sensor & Regulator, instruction-manual, H B Products (Year: 2022).
[No Author Listed] [online], "Open vs. Closed Refrigeration," course video by HVAC School, Dec. 3, 2020, retrieved on Dec. 8, 2022, <https://www.youtube.com/watch?v=XbxVmvLFYxs&t=1s>, 3 pages [Video Submission].

* cited by examiner

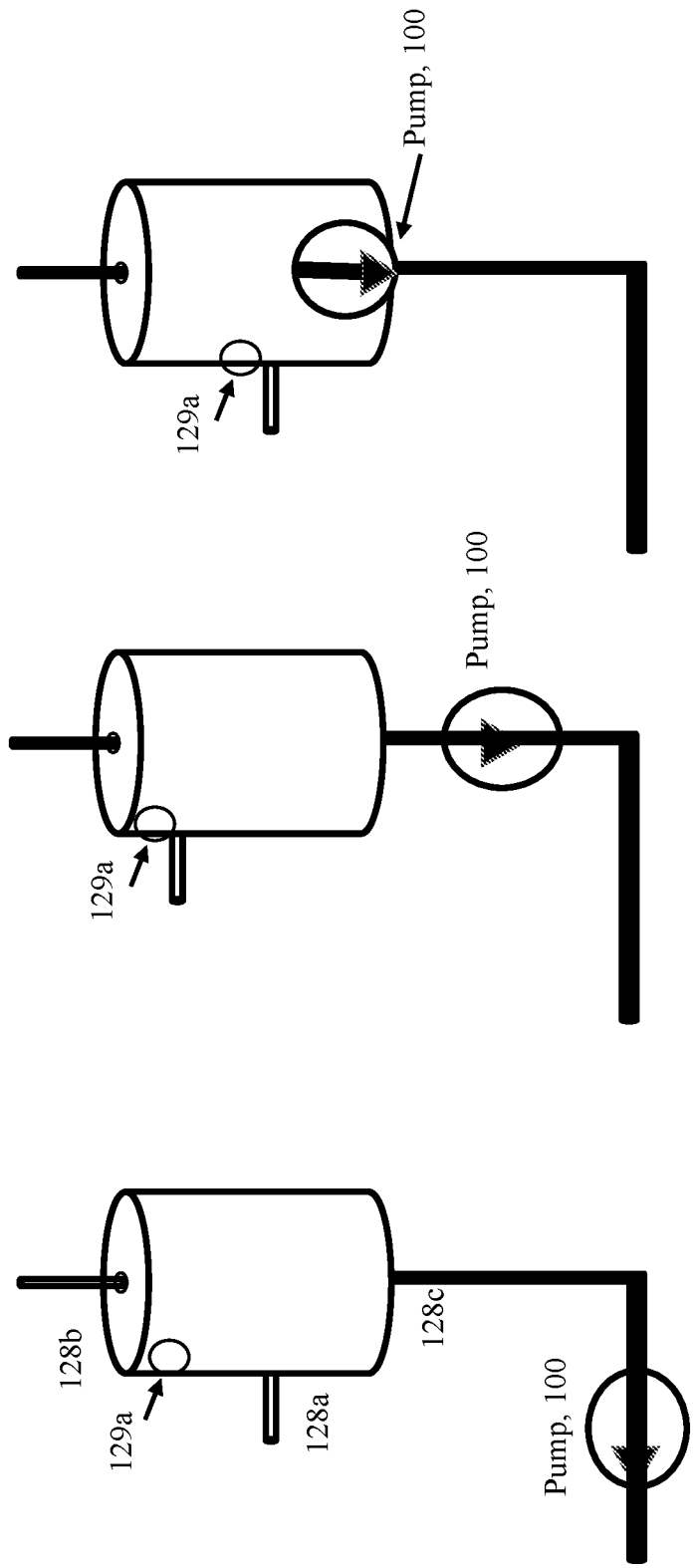

THERMAL MANAGEMENT SYSTEMS

CLAIM OF PRIORITY

This application claims priority under 35 USC § 119(e) to U.S. Provisional Patent Application Ser. No. 62/813,831, filed on Mar. 5, 2019, and entitled "THERMAL MANAGEMENT SYSTEMS," the entire contents of which are hereby incorporated by reference.

BACKGROUND

This disclosure relates to refrigeration.

Refrigeration systems absorb thermal energy from the heat sources operating at temperatures below the temperature of the surrounding environment, and discharge thermal energy into the surrounding environment.

Conventional refrigeration systems can include at least a compressor, a heat rejection exchanger (i.e., a condenser), a liquid refrigerant receiver, an expansion device, and a heat absorption exchanger (i.e., an evaporator). Such systems can be used to maintain operating temperature set points for a wide variety of cooled heat sources (loads, processes, equipment, systems) thermally interacting with the evaporator. Closed-circuit refrigeration systems may pump significant amounts of absorbed thermal energy from heat sources into the surrounding environment. In closed-circuit systems, compressors are used to compress vapor from the evaporation and condensers are used to condense the vapor to cool the vapor into a liquid. The combination of condensers and compressors can add significant amount of weight and can consume relatively large amounts of electrical power. In general, the larger the amount of absorbed thermal energy that the system is designed to handle, the heavier the refrigeration system and the larger the amount of power consumed during operation, even when cooling of a heat source occurs over relatively short time periods.

SUMMARY

According to an aspect, a thermal management system includes an open-circuit refrigeration system having an open-circuit refrigerant fluid flow path, with the open-circuit refrigeration system including a receiver configured to store a refrigerant fluid, with the receiver having an outlet, an evaporator configured to receive the refrigerant fluid and to extract heat from a heat load that contacts the evaporator, the evaporator having an inlet and an outlet, a vapor pump device having a vapor pump inlet that receives refrigerant vapor from the evaporator and having a vapor pump outlet that outputs compressed refrigerant vapor, an exhaust line, and a back pressure regulator that receives at a back pressure regulator inlet, the compressed refrigerant vapor from the vapor pump outlet, the back pressure regulator configurable to discharge at a back pressure regulator outlet, the received compressed refrigerant vapor through the exhaust line, so that the discharged compressed refrigerant vapor is not returned to the receiver, and with the receiver, the evaporator, the vapor pump device, the back pressure regulator, and the exhaust line connected in the open-circuit refrigerant fluid flow path.

Embodiments of the thermal management systems may include any one or more of the following features or other features particular to the aspect.

The vapor pump device is configurable to control a refrigerant fluid pressure according to a specified evaporation temperature, and assist in controlled discharge of refrigerant vapor from the open-circuit refrigerant fluid flow path by the back pressure regulator. The open-circuit refrigeration system is configured to control temperature of a heat load in proximity to the evaporator, at least in part, by operation of the pump device and the back pressure regulator. The vapor pump device is one of a variable speed pump, a compressor, and a vacuum pump. The back pressure regulator regulates refrigerant flow at the back pressure regulator inlet to a set point value of inlet pressure.

The system includes a junction device disposed in the open-circuit refrigerant fluid flow path between the vapor pump device and the back pressure regulator, with the junction device having an inlet that receives the compressed refrigerant vapor from the vapor pump outlet, the junction device having a first outlet and a second outlet, with a portion of the compressed refrigerant vapor from the vapor pump outlet being diverted out of the first outlet and into an inlet of the receiver, and with a remaining portion of the compressed refrigerant vapor being received by the back pressure regulator inlet. The portion of the compressed refrigerant vapor diverted by the junction device is used to control pressure in the receiver to extend operation of the system. The portion of the compressed refrigerant vapor diverted by the junction device maintains a substantially constant pressure in the receiver. The back pressure regulator is a fixed control device. The refrigerant fluid is water. The refrigerant fluid is ammonia.

The evaporator is configured to operate at a superheat condition. The system further includes an expansion device, a sensor device that measures one or more thermodynamic properties of the refrigerant fluid in the open-circuit refrigeration fluid flow path and that produces signals representing the measured one or more thermodynamic properties. The sensor produces one or more sensor signals that are measures of one or more thermodynamic properties of the refrigerant fluid, and the expansion device is configured to cause the evaporator to operate at a superheat condition. The superheat condition is calculated by a controller system in response to the one or more sensor signals produced from the sensor device.

The system further includes a controller system that includes a processor device and memory operatively coupled to the processor device, which controller system calculates the superheat condition in response to the signals produced from the sensor device, with the signals being representative of at least one or more of pressure and temperature measurements of the refrigerant fluid exiting the evaporator. The system includes a control device disposed in the open-circuit refrigerant fluid flow path between the receiver outlet and the evaporator inlet, the control device configurable to control a vapor quality of the refrigerant fluid at the evaporator outlet.

The control device is an expansion device, and the evaporator operates at a vapor quality of "1" at the evaporator outlet to provide substantially only refrigerant vapor to the vapor pump device inlet. The control device is an electrically controllable expansion device, with the system further including a controller system that includes a processor device and memory operatively coupled to the processor device, with the controller system configured to send a control signal to the electrically controllable expansion device to control operation of the electrically controllable expansion device.

The system further includes one or more sensor devices that produce one or more sensor signals that are measures of one or more thermodynamic properties of the refrigerant fluid in the open-circuit refrigeration fluid flow path. The evaporator operates within a threshold of critical vapor quality of 1.0. The open-circuit refrigeration system is configured to operate with a controlled vapor quality at the evaporator outlet, where vapor quality is the ratio of mass of vapor to mass of liquid plus mass of vapor. The system includes a controller system that includes a processor device, and memory coupled to the processor device, with the processor executing computer instructions to cause the controller unit to receive the one or more sensor signals produced by the one or more sensor devices, calculate a state of the refrigerant fluid at the outlet of the receiver according to values of the one or more sensor signals, and provide the one or more control signals to control the electrically controllable expansion device to cause the open-circuit refrigeration system to operate with a controlled vapor quality at the exit of the evaporator. The system includes an electronically controlled expansion device disposed in the open-circuit refrigerant fluid flow path between the outlet of the receiver and the inlet of the evaporator, one or more sensor devices that produce one or more measures of one or more thermodynamic properties of the refrigerant fluid, and a controller system including a processor device, and memory operatively coupled to the processor device, with the controller system configurable by execution of computer instructions to control one or more of the vapor pump device, the back pressure regulator, and the electronically controlled expansion device.

The receiver is a first receiver, the open-circuit refrigeration system further including a second receiver configured to store a gas, with the second receiver coupled in the open-circuit refrigerant fluid flow path to the first receiver. The system includes a control device that is configurable to control a flow of the gas from the second receiver to the first receiver to regulate a vapor pressure in the first receiver and to maintain a target vapor pressure in the first receiver during operation of the system. The control device is a pressure regulator having a pressure regulator inlet coupled to the second receiver and a pressure regulator outlet coupled to the first receiver, and which pressure regulator regulates a pressure at the pressure regulator outlet.

The control device is a first control device, the open-circuit refrigeration system further including a second control device, the second control device configurable to receive liquid refrigerant fluid from the first receiver at a first pressure, expand the liquid refrigerant fluid to generate a liquid/vapor refrigerant fluid mixture at a second pressure, and direct the liquid/vapor refrigerant fluid mixture into the evaporator. The second control device includes an expansion valve that is coupled between the outlet of the first receiver and the inlet of the evaporator, and which expansion valve provides a constant-enthalpy expansion of the liquid refrigerant fluid to generate the liquid/vapor refrigerant fluid mixture and cause the evaporator to operate at a superheat. The expansion valve is an electronically controllable expansion valve. The refrigerant fluid includes ammonia. The gas does not react chemically with the refrigerant fluid. The gas includes at least one gas selected from the group consisting of nitrogen, argon, xenon, and helium. The system includes a thermal load in thermal communication with the evaporator that is configured to remove heat from the thermal load. The thermal load is a high energy load.

According to an additional aspect, a thermal management method includes transporting a refrigerant fluid along a refrigerant fluid flow path that extends from a receiver that stores refrigerant fluid through an evaporator to an exhaust line, extracting heat from a heat load in contact with the evaporator, pumping by a vapor pump device, the refrigerant vapor from the fluid flow path towards the exhaust line, receiving, at an inlet of a back pressure regulator, the refrigerant vapor from the vapor pump device, and controllably exhausting the refrigerant vapor through an outlet of the back pressure regulator, so that the exhausted refrigerant vapor is not returned to the refrigerant fluid flow path.

Embodiments of the thermal management systems may include any one or more of the following features or other features particular to the aspect.

The method includes regulating a vapor quality of the refrigerant fluid at an outlet of the evaporator, and regulating a temperature of the heat load according to a vacuum pressure corresponding to a specified evaporation temperature. The method includes controlling, by a control device, a vapor quality value at an outlet of the evaporator to be substantially 1.0, where vapor quality is the ratio of mass of vapor to mass of liquid plus mass of vapor. The method includes diverting a first portion of the refrigerant vapor from the vapor pump device into the receiver, with a remaining portion of the refrigerant vapor from the vapor pump device being received at the inlet of the back pressure regulator. The refrigerant fluid is water or ammonia.

The receiver is a first receiver, and the method further includes transporting a gas stored in a second receiver to the first receiver to control a vapor pressure in the refrigerant receiver. The refrigerant is ammonia and the gas does not react chemically with the ammonia. The refrigerant is ammonia and the gas includes at least one gas selected from the group consisting of nitrogen, argon, xenon, and helium.

Other aspects are also disclosed.

One or more of the aspects of the open-circuit refrigeration systems disclosed herein may have one or more of the following advantages, amongst other advantages.

For example, relative to closed-circuit systems, the absence of condensers can result in a significant reduction in the overall size and mass of such systems, relative to conventional closed-circuit systems, particularly when the open-circuit refrigeration systems are sized for operation over relatively short time periods. The inclusion of a compressor in the open-circuit system provides additional upstream control of vapor pressure and hence load temperature, but such compressors would generally be smaller and lighter in size and consume less power for a given amount of refrigeration relative to a closed-circuit system because the compressor would not be required to compress vapor back to a liquid phase.

The benefit of maintaining the refrigerant fluid within a two-phase (liquid and vapor) region of the refrigerant fluid's phase diagram, is that the heat extracted from high heat flux loads can be used to drive a constant-temperature liquid to vapor phase transition of the refrigerant fluid, allowing the refrigerant fluid to absorb heat from a high heat flux load without undergoing a significant temperature change. In practical applications, a pressure drop exists during this transition and associated evaporating temperature drop exists as well. Consequently, the temperature of a high heat flux load can be stabilized within a range of temperatures that is relatively small, even though the amount of heat generated by the load and absorbed by the refrigerant fluid is relatively large. In addition, the boiling heat transfer coefficients of a two phase refrigerant fluid may be significantly higher than the heat transfer coefficients of single-phase refrigerant fluid.

The details of one or more embodiments are set forth in the accompanying drawings and the description below. Other features and advantages will be apparent from the description, drawings, and claims.

DESCRIPTION OF DRAWINGS

FIGS. 12, 12A-12C are diagrammatical views of liquid separators.

DETAILED DESCRIPTION

I. General Introduction

Figure 1:
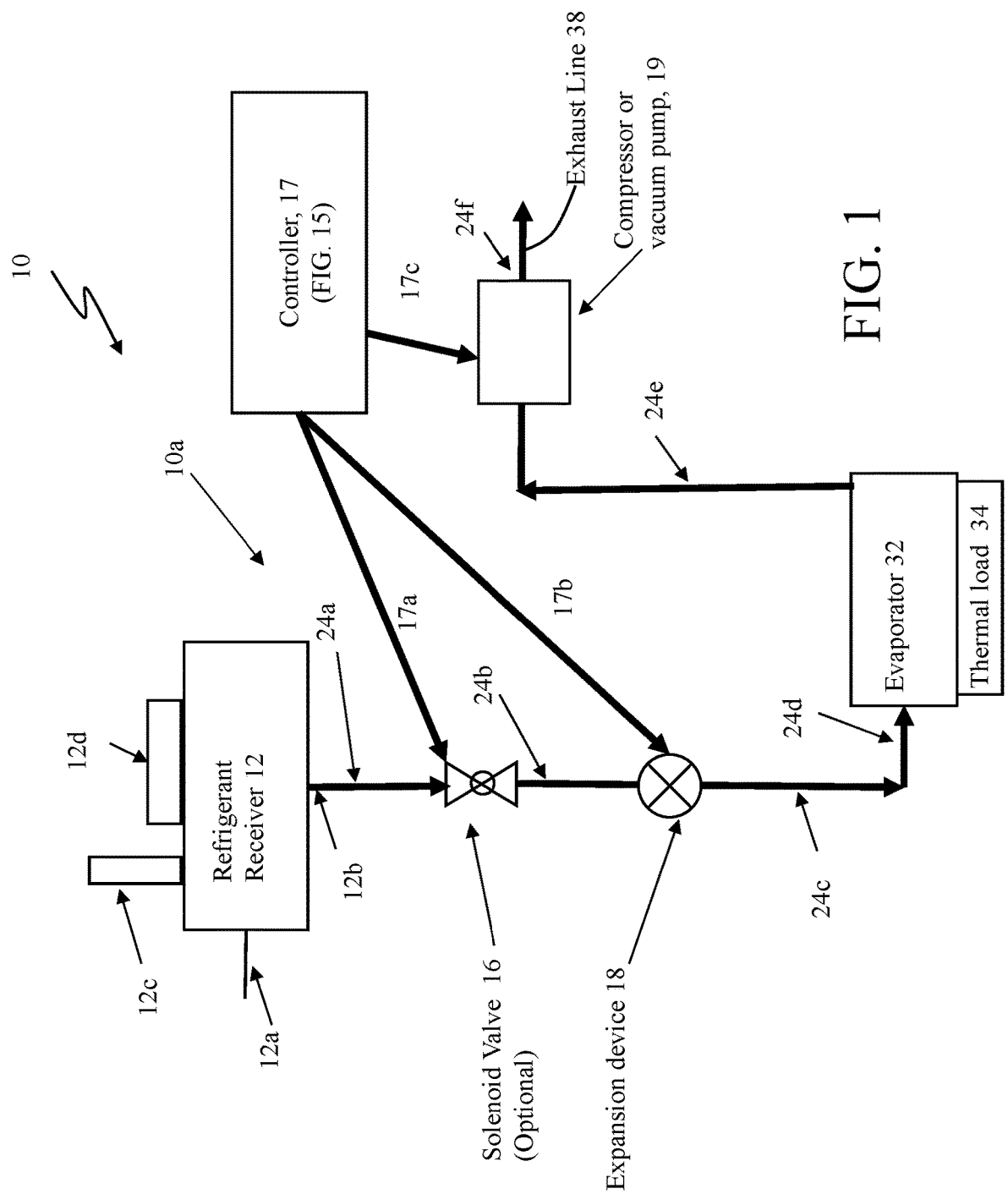
FIG. 1 is a schematic diagram of an example of a thermal management system that includes an open-circuit refrigeration system with an exhaust compressor or vacuum pump.

Cooling of large loads and high heat flux loads that are also highly temperature sensitive can present a number of challenges. On one hand, such loads generate significant quantities of heat that is extracted during cooling. In conventional closed-cycle refrigeration systems, cooling high heat flux loads typically involves circulating refrigerant fluid at a relatively high mass flow rate. However, closed-cycle system components that are used for refrigerant fluid circulation—include large compressors to compress vapor at a low pressure to vapor at a high pressure and condensers to remove heat from the compressed vapor at the high pressure and convert to a liquid—are typically heavy and consume significant power. As a result, many closed-cycle systems are not well suited for deployment in mobile platforms—such as on small vehicles or in space—where size and weight constraints may make the use of large compressors and condensers impractical.

On the other hand, temperature sensitive loads such as electronic components and devices may require temperature regulation within a relatively narrow range of operating temperatures. Maintaining the temperature of such a load to within a small tolerance of a temperature set point can be challenging when a single-phase refrigerant fluid is used for heat extraction, since the refrigerant fluid itself will increase in temperature as heat is absorbed from the load.

Directed energy systems that are mounted to mobile vehicles such as trucks or exist in space may present many of the foregoing operating challenges, as such systems may include high heat flux, temperature sensitive components that require precise cooling during operation in a relatively short time. The thermal management systems disclosed herein, while generally applicable to the cooling of a wide variety of heat loads, are particularly well suited for operation with such directed energy systems.

In particular, the thermal management systems and methods disclosed herein include a number of features that reduce both overall size and weight relative to conventional refrigeration systems, and still extract excess heat energy from both high heat flux, highly temperature sensitive components and relatively temperature insensitive components, to accurately match temperature set points for the components. At the same time, the disclosed thermal management systems that use a compressor or vacuum pump (when the evaporating pressure is substantially below ambient pressure) would in general require less power than conventional closed circuitry systems for a given amount of refrigeration over a specified period(s) of operation. Whereas certain conventional refrigeration systems used closed-circuit refrigerant flow paths, the systems and methods disclosed herein use open-cycle refrigerant flow paths. Depending upon the nature of the refrigerant fluid, exhaust refrigerant fluid may be incinerated as fuel, chemically treated, and/or simply discharged at the end of the flow path.

II. Thermal Management Systems with Open-circuit Refrigeration Systems with Compressor Exhaust Referring to FIG. 1, an example of a thermal management system 10 that includes an open-circuit refrigeration system with compressor-assisted exhaust (OCRSCE) 10a is shown. System 10 includes a receiver 12, an optional valve 16, a control device 18 (i.e., an fluid expansion device 18 that is optional in some embodiments), an evaporator 32, a vapor pumping device 19, e.g., a compressor or a vacuum pump, (compressor/vacuum pump 19) and conduits 24a-24f, with conduit 24f at or being an exhaust line 38. The compressor or vacuum pump 19 (compressor/vacuum pump 19) can be a single-speed, multi-speed or a variable speed device. A heat load 34 is coupled to the evaporator 32. OCRSCE 10a in some embodiments also includes a controller 17 (see FIG. 15 for an exemplary embodiment) that produces control signals, e.g., 17a-17c, based on sensed thermodynamic properties to control operation of the various control devices such as the optional valve 16, the control device 18, the compressor/vacuum pump 19, etc., as needed. That is, controller 17 may receive signals (of sensed thermodynamic properties of the system), and send control signals (as appropriate) to the expansion device 16, the optional solenoid valve 18, a motor of the compressor/vacuum pump 19 or a control to change the speed or to shut off or starting the compressor/vacuum pump 19, etc.

As used herein "compressor or vacuum pump" or "compressor/vacuum pump 19" generally refers to a compressor or a vacuum pump as alternative devices for use as vapor pumping device 19 (as well as 59 and 119, in FIGS. 3, 5A-8A, discussed below). A compressor is, in general, a device that increases the pressure of a gas by reducing the gas' volume. The compressor is similar to a vacuum pump as both increase the pressure on a fluid and both can transport the fluid through a pipe, and also reduce the volume of the compressed gas or vapor. Usually the term compressor refers to devices operating at and above ambient pressure and vacuum pumps refer to devices operating below ambient pressure. In general, either a "compressor" or a "vacuum pump" are suitable alternative devices for use as the component 19 or 59 or 119, taking into consideration specific requirements of a given system 10.

Figure 2A:
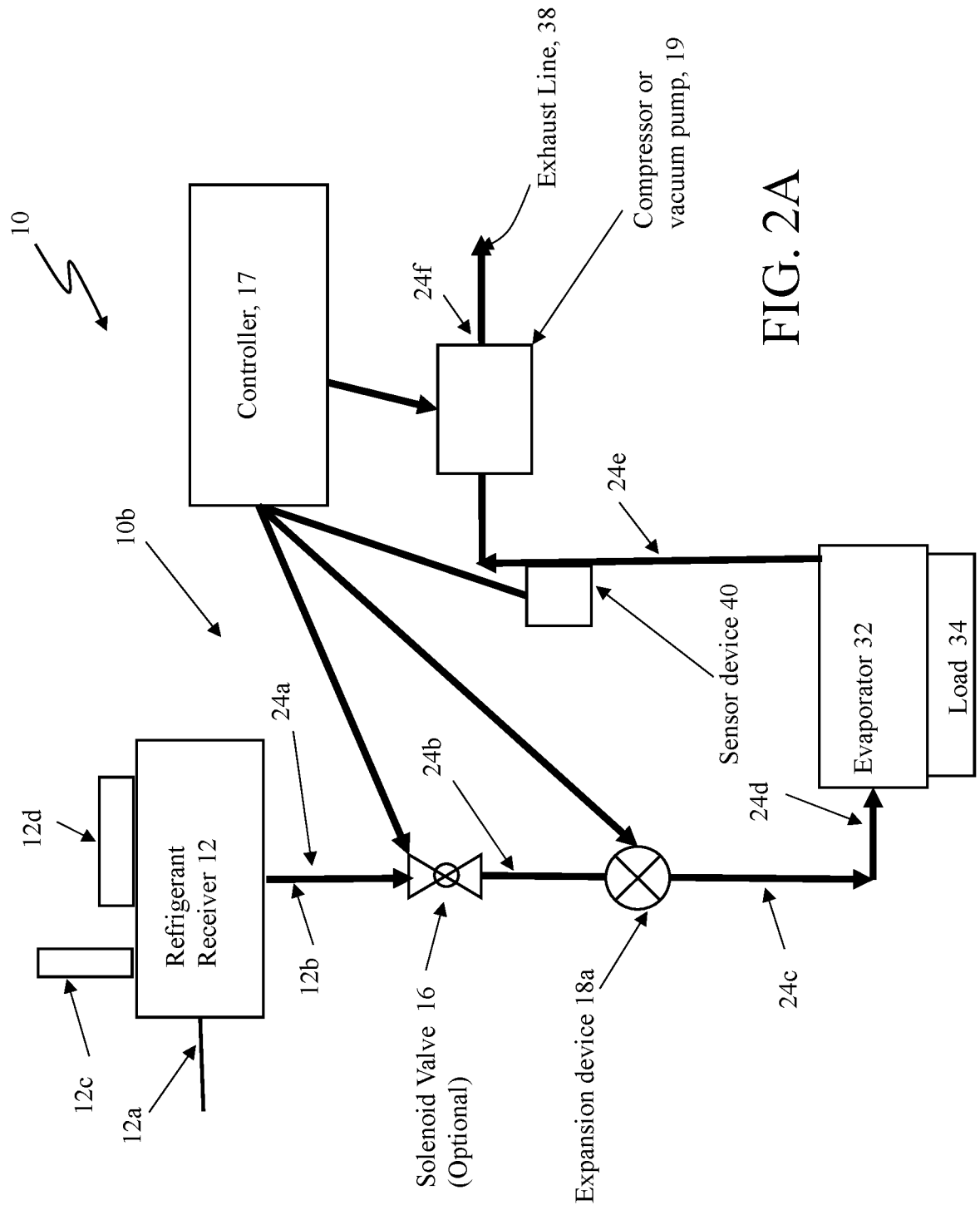
FIGS. 2A-2F are schematic diagrams of other examples of a thermal management system that includes alternative open-circuit refrigeration systems with an exhaust compressor or vacuum pump.

Control device 18 functions as a flow control device. In general, control device 18 can be implemented as any one or more of a variety of different mechanical and/or electronic devices. For example, in some embodiments, control device 18 can be implemented as a fixed orifice, a capillary tube, and/or a mechanical or electronic expansion valve 18a (FIG. 2A). In general, fixed orifices and capillary tubes are passive flow restriction elements which do not actively regulate refrigerant fluid flow.

Mechanical expansion valves (usually called thermostatic or thermal expansion valves) are typically flow control devices that enthalpically expand a refrigerant fluid from a first pressure to an evaporating pressure, controlling superheat at the evaporator 34 exit. Mechanical expansion valves generally include an orifice, a moving seat that changes the cross-sectional area of the orifice and the refrigerant fluid volume and mass flow rates, a diaphragm moving the seat, and a bulb (features not illustrated) at the evaporator exit. The bulb is charged with a fluid and it hermetically fluidly communicates with a chamber above the diaphragm. The bulb senses the refrigerant fluid temperature at the evaporator exit (or another location) and the pressure of the fluid inside the bulb transfers the pressure in the bulb through the chamber to the diaphragm, and moves the diaphragm and the seat to close or to open the orifice.

Typical electrical expansion valves include an orifice, a moving seat, a motor or actuator that changes the position of the seat with respect to the orifice, a controller, and pressure and temperature sensors at the evaporator exit. The controller calculates the superheat for the expanded refrigerant fluid based on pressure and temperature measurements at the evaporator exit. If the superheat is above a set-point value, the seat moves to increase the cross-sectional area and the refrigerant fluid volume and mass flow rates to match the superheat set-point value. If the superheat is below the set-point value the seat moves to decrease the cross-sectional area and the refrigerant fluid flow rates.

Examples of suitable commercially available expansion valves that can function as control device 18 include, but are not limited to, thermostatic expansion valves available from the Sporlan Division of Parker Hannifin Corporation (Washington, MO) and from Danfoss (Syddanmark, Denmark).

Receiver 12 includes an inlet port 12a, an outlet port 12b, a pressure relief valve 12c, and an optional heater 12d. Receiver 12 is typically implemented as an insulated vessel that stores a refrigerant fluid at relatively high pressure. The use of the compressor/vacuum pump 19 greatly assists in controlled removal or exhaust of vapor from the system 10a. (See discussion for FIG. 10 for details on refrigerant receivers.)

Evaporator 32 can be implemented in a variety of ways. In general, the evaporator 32 functions as a heat exchanger, providing thermal contact between the refrigerant fluid and the heat load 34. Typically, the evaporator 32 includes one or more flow channels extending internally between an inlet and an outlet of the evaporator, allowing refrigerant fluid to flow through the evaporator and absorb heat from the heat load 34. (See discussion for FIGS. 11A, 11B for details on evaporators).

The compressor/vacuum pump 19 generally functions to control the fluid pressure upstream of the evaporator 32. In general, the compressor/vacuum pump 19 can be implemented using a variety of different pump/compressor technologies. In general, the compressor/vacuum pump 19 is selected based on the refrigerant fluid volume flow rate, the pressure differential across the compressor/vacuum pump 19, and the pressure and temperature at the compressor or vacuum pump inlet. The compressor/vacuum pump 19 is configured by the controller 17 or otherwise to control a temperature of the heat load by control of the fluid pressure upstream of the evaporator 32.

Refrigerant Fluids

A variety of different refrigerant fluids can be used in system 10. For these open-circuit refrigeration systems, in general emissions regulations and operating environments may limit the types of refrigerant fluids that can be used. For example, in certain embodiments, the refrigerant fluid can be ammonia having very large latent heat; after passing through the cooling circuit, the ammonia refrigerant can be disposed of by incineration, by chemical treatment (i.e., neutralization), and/or by direct venting to the atmosphere. In certain embodiments, the refrigerant fluid can be an ammonia-based mixture that includes ammonia and one or more other substances. For example, mixtures can include one or more additives that facilitate ammonia absorption or ammonia burning.

More generally, any fluid can be used as a refrigerant in the open-circuit refrigeration systems disclosed herein, provided that the fluid is suitable for cooling heat load 34 (e.g., the fluid boils at an appropriate temperature) and, in embodiments where the refrigerant fluid is exhausted directly to the environment, regulations and other safety and operating considerations do not inhibit such discharge.

In particular, the open-circuit refrigeration system 10 can operate with water as the refrigerant. The receiver 12 may be charged with water at atmospheric pressure. During operation the water is enthalpically expanded into a vacuum pressure corresponding to a desired evaporating temperature, cools heat load 34, evaporates into a vapor, and the vapor is discharged by the vacuum pump/compressor 19 into ambient environment.

While, in the OCRSCE 10a, the compressor consumes power, the discharge pressure can be lower than the discharge pressure of an equivalent closed-circuit refrigeration system, and, therefore, the power consumed by the compressor/vacuum pump 19 can be less than the power consumed by a compressor of the equivalent closed-circuit refrigerant system. Moreover a power requirement can be reduced if an ejector is added, as will be discussed below (see FIG. 3, etc.)

Referring now to FIGS. 2A-2E some alternative configurations 10b-10g of the OCRSCE are shown. Items illustrated and referenced, but not mentioned in the discussion below are discussed and referenced in FIG. 1.

Also discussed below will be a general OCRSCE system configuration that is one of several open-circuit refrigeration configurations that include two receivers (one for a pressurizing gas and the other for refrigerant), but which otherwise parallel OCRSCE configurations 10a-10g.

Referring to FIG. 2A, OCRSCE 10b is shown having the control device 18 of FIG. 1, implemented as an electronically controlled expansion device 18a (expansion device 18a). The expansion device 18a is operated with a sensor device 40 that controls the expansion device 18a either directly or through the controller 17. The evaporator 32 operates in two phase (liquid/gas) and superheated region with controlled superheat. The sensor controlled expansion device 18a and the sensor 40 provide a mechanism to measure and control superheat. The compressor/vacuum pump 19 in general functions to control refrigerant fluid pressure upstream of the evaporator 32. The use of the compressor/vacuum pump 19 assists in controlled removal or exhaust of refrigerant vapor from the system 10b. After passing through compressor/vacuum pump 19, the refrigerant fluid is discharged as exhaust through conduit 24f, which functions as an exhaust line 38 for system 10b. Typically, compressor/vacuum pump 19 adjusts the upstream refrigerant fluid pressure in system 10. The compressor/vacuum pump 19 is configurable to control the temperature of heat load 34 that can be adjusted (by changing a pumping rate) to selectively change a temperature set point value (i.e., a target temperature) for heat load 34.

The vapor quality of the refrigerant fluid after passing through evaporator 32 can be controlled either directly or indirectly with respect to a vapor quality set point by, e.g., the sensor device and/or controller 17 controlling operation of the expansion valve 18. The evaporator 32 may be configured to maintain exit vapor quality below the critical vapor quality defined as "1." Vapor quality is the ratio of mass of vapor to mass of liquid+mass of vapor and is generally kept in a range of approximately 0.5 to almost 1.0; more specifically 0.6 to 0.95; more specifically 0.75 to 0.9; more specifically 0.8 to 0.9 or more specifically about 0.8 to 0.85. "Vapor quality" is defined as mass of vapor/total mass (vapor+liquid). In this sense, vapor quality cannot exceed "1" or be equal to a value less than "0."

Figure 2B:
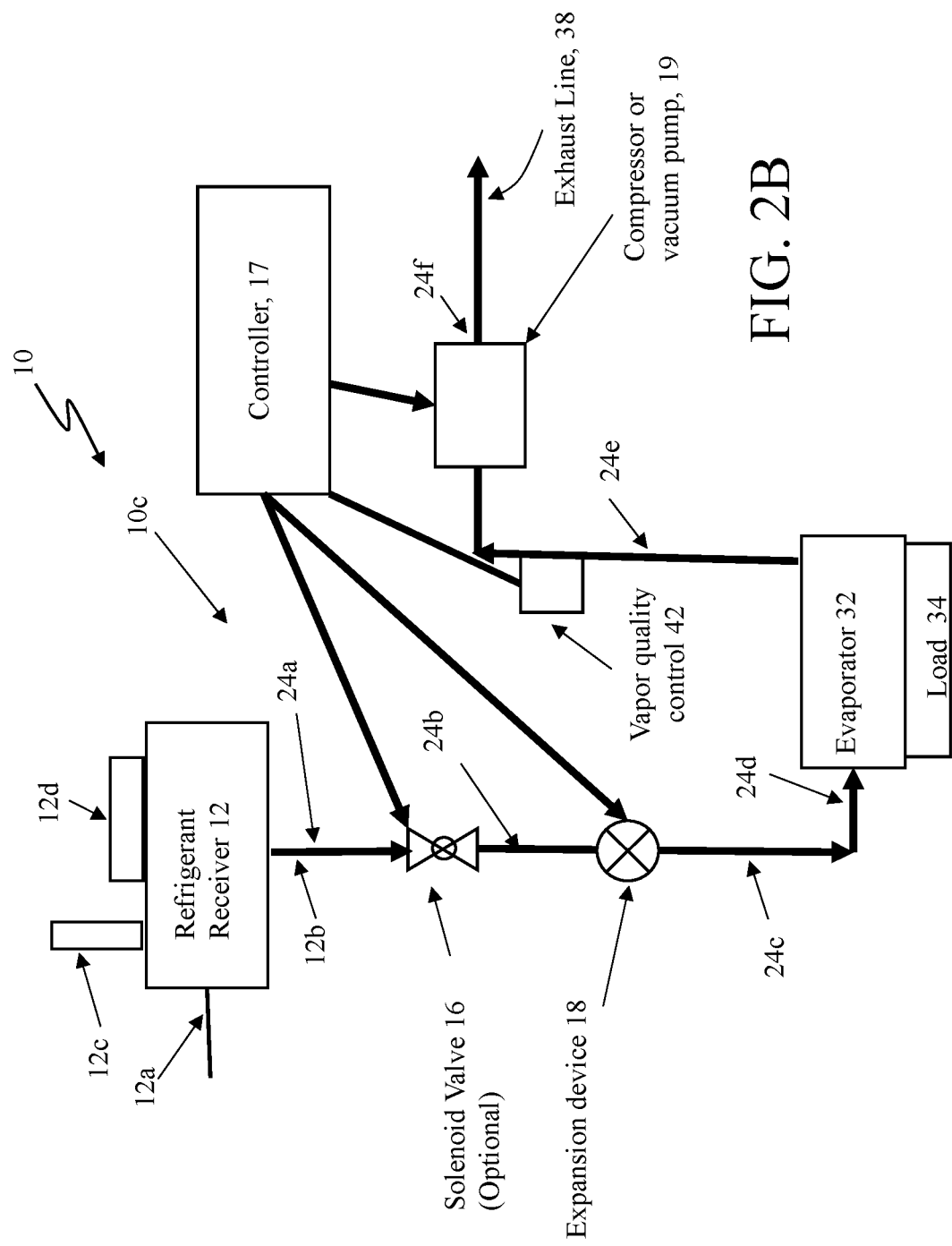

Referring now to FIG. 2B, OCRSCE 10c is shown to include the electronically controlled expansion device 18a. The expansion device 18a is operated with a sensor device 42 that measures superheat of refrigerant exiting from the evaporator 32. As in systems 10a and 10b (FIGS. 1, 2A), the compressor/vacuum pump 19 functions to control refrigerant fluid pressure upstream of the evaporator 32, and thus assists in controlled removal or exhaust of refrigerant vapor from the system 10c through conduit 24f that functions as the exhaust line 38 for system 10c. The compressor/vacuum pump 19 is configurable to control the temperature of heat load 34 as discussed above for system 10b. The vapor quality of the refrigerant fluid after passing through evaporator 32 can be controlled either directly or indirectly with respect to a vapor quality set point by, e.g., the sensor device and/or controller 17 controlling operation of the expansion valve 18.

Figure 2C:
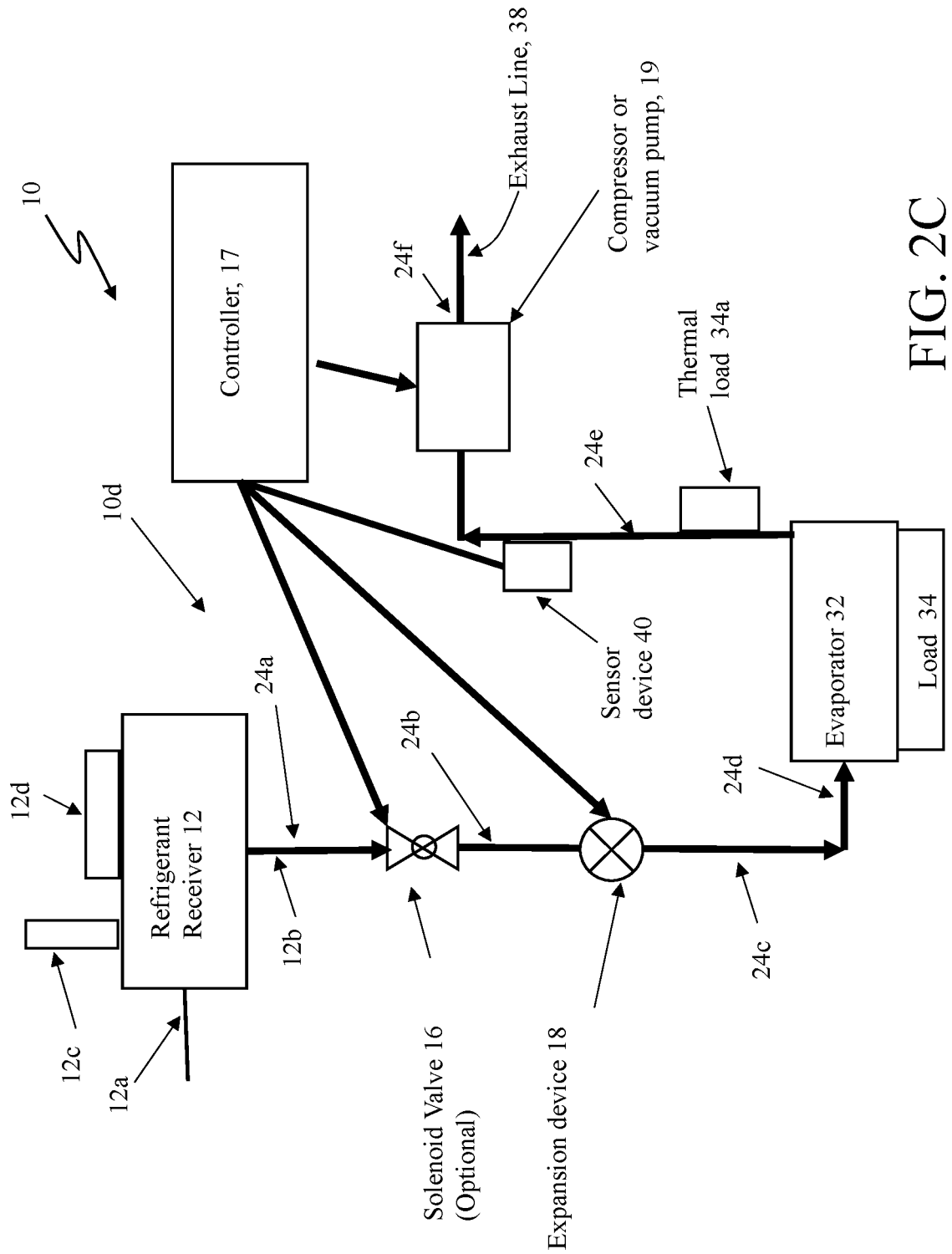

Referring now to FIG. 2C, OCRSCE 10d includes the electronically controlled expansion device 18a operated with the sensor device 40 that controls the expansion device 18 either directly or with the controller 17, as shown. The evaporator 32 operates in a two phase (liquid/gas) region of refrigerant phase. Also shown in FIG. 2C, is a second load 34a that operates in a superheated region with controlled superheat. The sensor controlled expansion device 18a and sensor 40 provide a mechanism to measure and control superheat at the exit of the second load 34a. As in systems 10a and 10b (FIGS. 1, 2A), the compressor/vacuum pump 19 functions to control refrigerant fluid pressure upstream of the evaporator 32, and thus assists in controlled removal or exhaust of refrigerant vapor from the system 10d through conduit 24f that functions as the exhaust line 38 for system 10d. The compressor/vacuum pump 19 is configurable to control the temperature of heat load 34 as discussed above for system 10b.

Figure 2D:
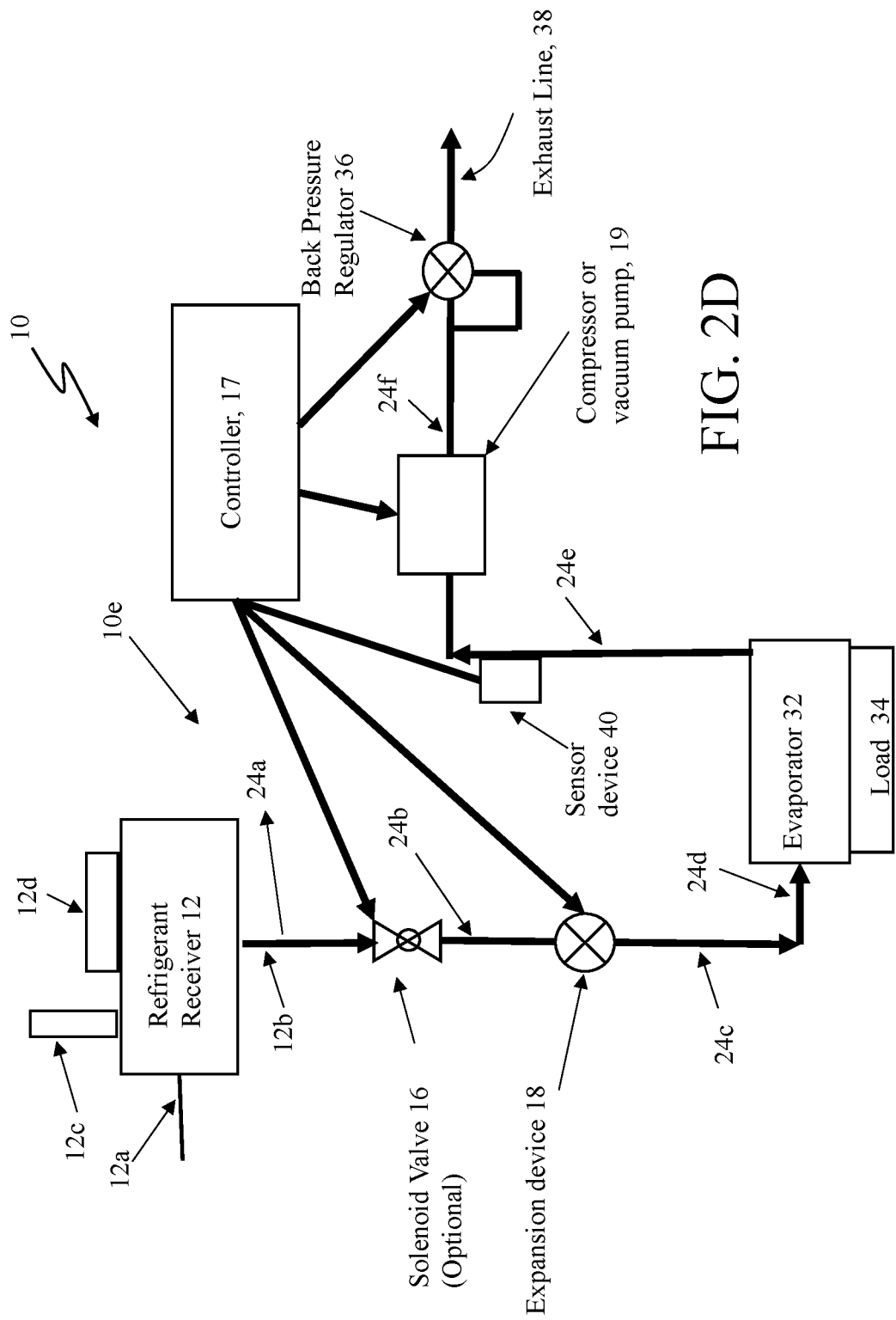

Referring now to FIG. 2D, OCRSCE 10e includes the electronically controlled expansion device 18a operated with the sensor device 40 that controls the expansion device 18 either directly or (by the controller 17, not shown) and a back pressure regulator 36 disposed in line with an output of the vacuum pump or compressor 19 via conduit 24f and the exhaust line 38. As in systems 10a and 10b (FIGS. 1, 2A), the compressor/vacuum pump 19 functions to control refrigerant fluid pressure upstream of the evaporator 32, and thus assists in controlled removal or exhaust of refrigerant vapor from the system 10e through conduit 24f that functions as the exhaust line 38 for system 10e. The compressor/vacuum pump 19 is configurable to control the temperature of heat load 34 as discussed above for system 10b. However, in the implementation of FIG. 2D, the back pressure regulator 36 also functions to control removal or exhaust of refrigerant vapor from the system 10e at the exhaust line 38 and thus can assist with and reduce the needed capacity (concomitant therewith size, weight and power consumption characteristics of the compressor/vacuum pump 19) to control the temperature of heat load 34.

Figure 2E:
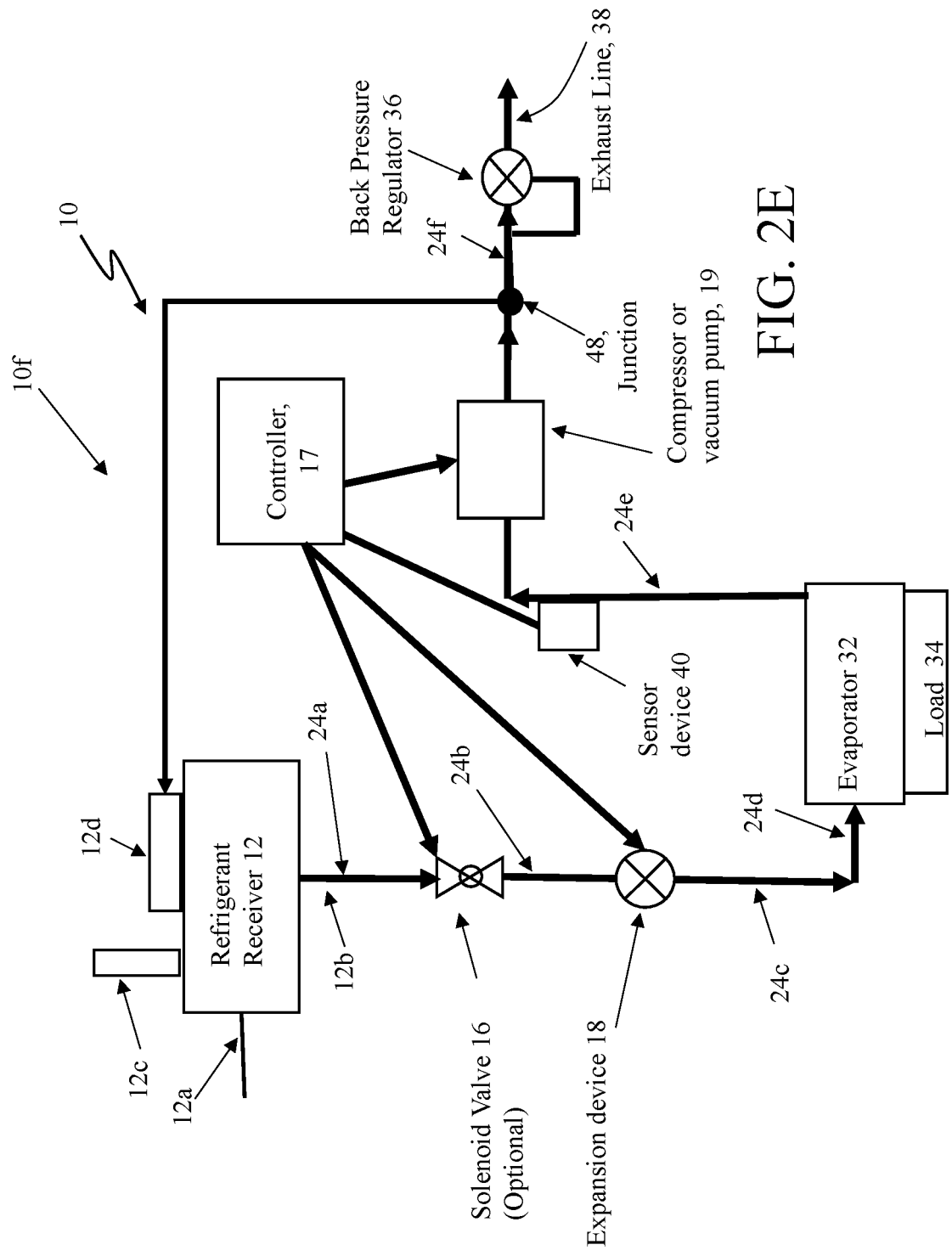

Referring now to FIG. 2E, OCRSCE 10f includes the electronically controlled expansion device 18a operated with the sensor device 40 that controls the expansion device 16 either directly or (by the controller 17) and the optional back pressure regulator 46 disposed in line with the output of the vacuum pump or compressor 19 and the exhaust line. Also included in FIG. 2E is a junction device 48 disposed between the back pressure regulator 36 and the output of the vacuum pump or compressor 19. The junction device 48 is located at a compressor/vacuum pump 19 outlet. The junction device 48 couples refrigerant discharge at the compressor/vacuum pump 19 outlet to an inlet to the receiver 12. Compressor refrigerant discharge is used to control pressure in the receiver 12 so that the pressure remains high enough to extend operation of the OCRSCE 16. As the amount of liquid refrigerant is consumed refrigerate pressure in the receiver is reduced. In this implementation, the back pressure regulator 36 when applied can maintain a relatively constant pressure in the receiver 12 during entire period of operation of the OCRSCE 10f.

The junction device 48 has an input port coupled to the vacuum pump or compressor 19, a first output port coupled to the back pressure regulator 46 and a second output port coupled to an input to the receiver 12. Compressor discharge is used to control pressure in the receiver 12 allowing for the evaporator and back pressure regulator to be fixed control devices.

In the embodiments of FIGS. 1, 2A-E, discussed above, control of superheat is required since most implementations of the compressor/vacuum pump 19, usually do not allow for or tolerate the presence of liquid at the inlet of the compressor/vacuum pump 19.

Figure 2F:
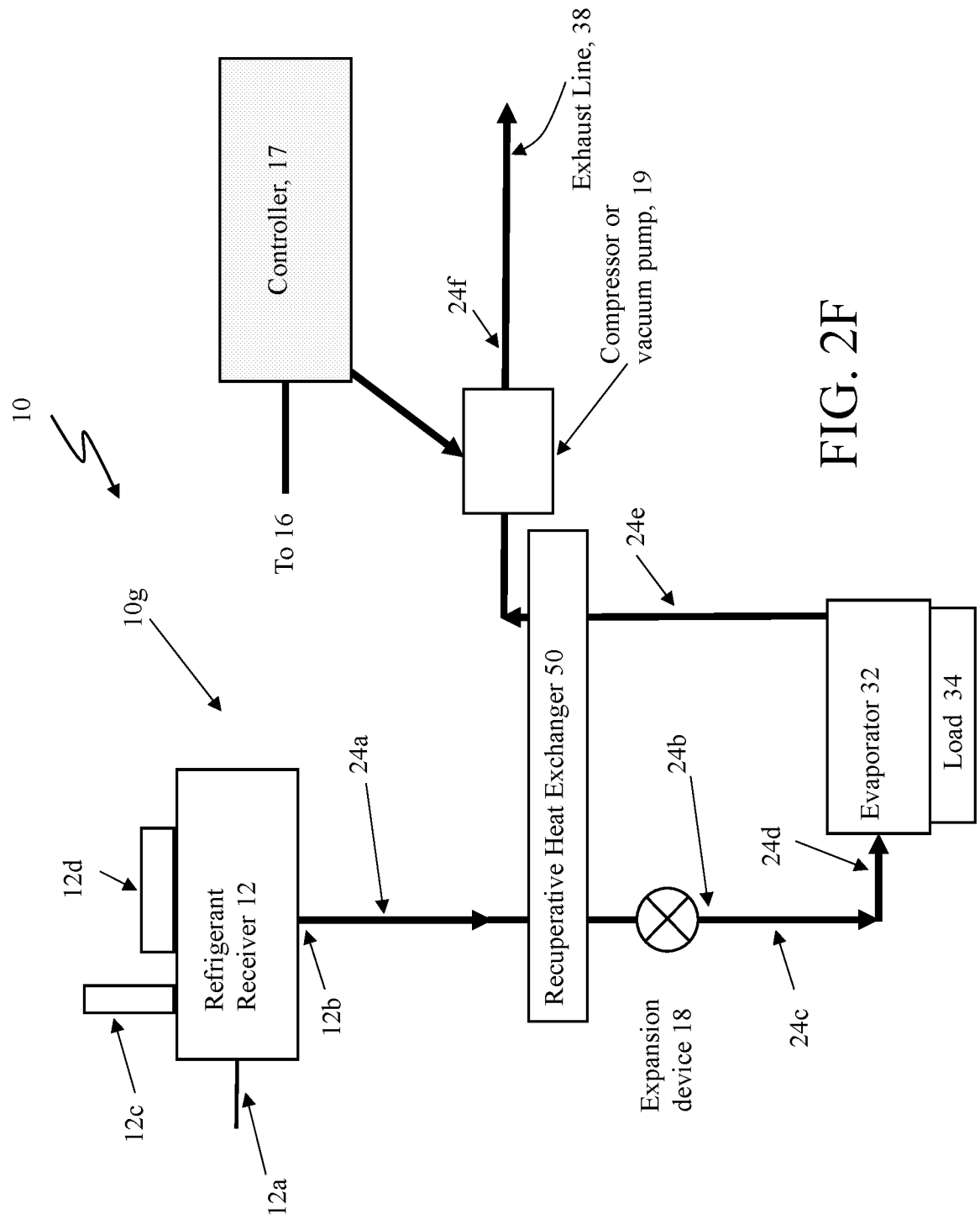

Referring now to FIG. 2F, this embodiment allows for operation of the evaporator 32 at a vapor quality of "1" or less than "1" at the evaporator exit by the use of a recuperative heat exchanger 50 that evaporates any remaining refrigerant liquid prior to the refrigerant fluid being fed to the inlet of the compressor/vacuum pump 19. OCRSCE 10g includes the electronically controlled expansion device 18a operated with the sensor device 40 that controls the expansion device 16 either directly or (by the controller 17) and the recuperative heat exchanger 50. The recuperative heat exchanger 50 is used for transferring heat energy from the refrigerant fluid emerging from evaporator 32 to refrigerant fluid upstream from control device 18. Inclusion of the recuperative heat exchanger 50 thus can reduce mass flow rate demand, and also allows for operation of the evaporator 32 within threshold of vapor quality, as mentioned.

In this implementation of FIG. 2F, a back pressure regulator (not shown) is optional, but if applied, the back pressure regulator can maintain a relatively constant pressure in the receiver 12 during entire period of operation of the OCRSCE 10g.

The discussion below regarding vapor quality presumes that the recuperative heat exchanger 50 is configured to generate sufficient superheat.

The vapor quality of the refrigerant fluid after passing through evaporator 32 can be controlled either directly or indirectly with respect to a vapor quality set point by, e.g., the controller 17. The evaporator 32 may be configured to maintain exit vapor quality below the critical vapor quality defined as "1." Vapor quality is the ratio of mass of vapor to mass of liquid+mass of vapor and is generally kept in a range of approximately 0.5 to almost 1.0; more specifically 0.6 to 0.95; more specifically 0.75 to 0.9; more specifically 0.8 to 0.9 or more specifically about 0.8 to 0.85. "Vapor quality" is defined as mass of vapor/total mass (vapor+ liquid). In this sense, vapor quality cannot exceed "1" or be equal to a value less than "0."

In practice, vapor quality may be expressed as "equilibrium thermodynamic quality" that is calculated as follows:

$$X=(h-h')/(h''-h'),$$

where h is specific enthalpy, specific entropy or specific volume, h' is of saturated liquid and "is of saturated vapor. In this case X can be mathematically below 0 or above 1, unless the calculation process is forced to operate differently. Either approach is acceptable.

During operation of system 10, cooling can be initiated by a variety of different mechanisms. In some embodiments, for example, system 10 includes a temperature sensor attached to load 34 (as will be discussed subsequently). When the temperature of load 34 exceeds a certain temperature set point (i.e., threshold value), the controller 17 connected to the temperature sensor can initiate cooling of load 34. Alternatively, in certain embodiments, system 10 operates essentially continuously—provided that the refrigerant fluid pressure within receiver 12 is sufficient—to cool load 34. As soon as receiver 12 is charged with refrigerant fluid, refrigerant fluid is ready to be directed into evaporator 32 to cool load 34. In general, cooling is initiated when a user of the system or the heat load issues a cooling demand.

System Cooling Operations

Upon initiation of a cooling operation, refrigerant fluid from receiver 12 is discharged from outlet 12b, through optional valve 18 if present, and is transported through conduit 24a to control device 18, which directly or indirectly controls vapor quality (or superheat) at the evaporator outlet. In the following discussion, control device 18 is implemented as an expansion valve. However, it should be understood that more generally, control device 18 can be implemented as any component or device that performs the functional steps described below and provides for vapor quality control (or superheat) at the evaporator outlet.

Once inside the expansion valve 18, the refrigerant fluid undergoes constant enthalpy expansion from an initial pressure $p_r$ (i.e., the receiver pressure) to an evaporation pressure $p_e$ at the outlet of the expansion valve. In general, the evaporation pressure pc depends on a variety of factors, e.g., the desired temperature set point value (i.e., the target temperature) at which load 34 is to be maintained and the heat input generated by the heat load 34. Set points are discussed below.

The initial pressure $p_r$ in the receiver tends to be in equilibrium with the surrounding temperature and is different for different refrigerants. The pressure pc in the evaporator depends on the evaporating temperature, which is lower than the heat load temperature and is defined during design of the system. The system is operational as long as the receiver-to-evaporator pressure difference $(p_r-p_e)$ is sufficient to drive adequate refrigerant fluid flow through the expansion device 18. After undergoing constant enthalpy expansion in the expansion device 18 (or valve 18), the liquid refrigerant fluid is converted to a mixture of liquid and vapor phases at the temperature of the fluid and at the evaporation pressure $p_e$. The two-phase refrigerant fluid mixture is transported via conduit 24b to evaporator 32.

When the two-phase mixture of refrigerant fluid is directed into evaporator 32, the liquid phase absorbs heat from load 34, driving a phase transition of the liquid refrigerant fluid into the vapor phase. For the embodiments of FIGS. 1, 2A-2E, the phase transition should be to a complete vapor phase, as it is not desirable to have liquid at inlets to the compressor/vacuum pump 19.

For the embodiment of FIG. 2F, the phase transition need not be to a complete vapor phase, that is, the evaporator can operate with a vapor quality of less than 1, as it is permitted to have liquid at the outlet of the evaporator 34, provided that the recuperative heat exchanger 50 is used to evaporate any remaining refrigerant liquid prior to the refrigerant fluid being fed to the inlet of the compressor/vacuum pump 19. Because this phase transition occurs at (nominally) constant temperature, the temperature of the refrigerant fluid mixture within evaporator 32 remains unchanged, provided at least some liquid refrigerant fluid remains in evaporator 32 to absorb heat.

Further, the constant temperature of the refrigerant fluid mixture within evaporator 32 can be controlled by adjusting the pressure pc of the refrigerant fluid, since adjustment of $p_e$ changes the boiling temperature of the refrigerant fluid. Thus, by regulating the refrigerant fluid pressure pc upstream from evaporator 32 (e.g., using compressor/vacuum pump 19), the temperature of the refrigerant fluid within evaporator 32 (and, nominally, the temperature of heat load 34) can be controlled to match a specific temperature set-point value for heat load 34, ensuring that load 34 is maintained at, or very near, a target temperature.

The pressure drop across the evaporator 32 causes drop of the temperature of the refrigerant mixture (which is the evaporating temperature), but still the evaporator 32 can be configured to maintain the heat load temperature within the set tolerances.

In some embodiments, for example, the evaporation pressure of the refrigerant fluid can be adjusted by the compressor/vacuum pump 19 to ensure that the temperature of heat load 34 is maintained to within ±5 degrees C. (e.g., to within ±4 degrees C., to within ±3 degrees C., to within ±2 degrees C., to within ±1 degree C.) of the temperature set point value for load 34.

As discussed above, within evaporator 32, a portion of the liquid refrigerant in the two-phase refrigerant fluid mixture is converted to refrigerant vapor by undergoing a phase change. As a result, the refrigerant fluid mixture that emerges from evaporator 32 has a higher vapor quality (i.e., the fraction of the vapor phase that exists in refrigerant fluid mixture) than the refrigerant fluid mixture that enters evaporator 32.

As the refrigerant fluid mixture emerges from evaporator 32, a portion of the refrigerant fluid can optionally be used to cool one or more additional heat loads. Typically, for example, the refrigerant fluid that emerges from evaporator 32 is nearly all in the vapor phase. The refrigerant fluid vapor (or, more precisely, high vapor quality fluid vapor) can be directed into a heat exchanger (not shown) coupled to another heat load, and can absorb heat from the additional heat load during propagation through the heat exchanger. Examples of systems in which the refrigerant fluid emerging from evaporator 32 is used to cool additional heat loads will be discussed in more detail subsequently.

The refrigerant fluid emerging from evaporator 32 is transported through conduit 24e to compressor/vacuum pump 19, (or to one side of the recuperative heat exchanger 50 in FIG. 2F) which directly or indirectly controls the upstream pressure, that is, the evaporating pressure $p_e$ in the system 10. After passing through compressor/vacuum pump 19, the refrigerant fluid is discharged as exhaust through conduit 24f, which functions as the exhaust line 38 for the system 10. Refrigerant fluid discharge can occur directly into the environment surrounding system 10. Alternatively, in some embodiments, the refrigerant fluid can be further processed; various features and aspects of such processing are discussed in further detail below.

It should be noted that the foregoing steps, while discussed sequentially for purposes of clarity, occur simultaneously and continuously during cooling operations. In other words during operation, refrigerant fluid is continuously being discharged from receiver 12, undergoing continuous expansion in control device 18, flowing continuously through evaporator 32 and compressor/vacuum pump 19, being discharged from system 10, while heat load 34 is being cooled.

During operation of system 10, as refrigerant fluid is drawn from receiver 12 and used to cool heat load 34, the receiver pressure $p_r$ falls. If the refrigerant fluid pressure $p_r$ in receiver 12 is reduced to a value that is too low, the pressure differential $p_r$-$p_e$ may not be adequate to drive sufficient refrigerant fluid mass flow to provide adequate cooling of heat load 34. Accordingly, when the refrigerant fluid pressure $p_r$ in receiver 12 is reduced to a value that is sufficiently low, the capacity of system 10 to maintain a particular temperature set point value for load 34 may be compromised. Therefore, the pressure in the receiver or pressure drop across the expansion valve (or any related refrigerant fluid pressure or pressure drop in system 10) can be an indicator of the remaining operational time. An appropriate warning signal can be issued (e.g., by the controller 17) to indicate that, in a certain period of time, the system may no longer be able to maintain adequate cooling performance; operation of the system can even be halted if the refrigerant fluid pressure in receiver 12 reaches the low-end threshold value.

It should be noted that while in FIG. 1 only a single receiver 12 is shown, in some embodiments, system 10 can include multiple receivers to allow for operation of the system over an extended time period. Each of the multiple receivers can supply refrigerant fluid to the system to extend to total operating time period. Some embodiments may include plurality of evaporators connected in parallel, which may or may not be accompanied by a plurality of expansion valves and plurality of evaporators.

III. System Operational Control

As discussed in the previous section, by adjusting the pressure pc of the refrigerant fluid, the temperature at which the liquid refrigerant phase undergoes vaporization within evaporator 32 can be controlled. Thus, in general, the temperature of heat load 34 can be controlled by a device or component of system 10 that regulates the pressure of the refrigerant fluid within evaporator 32. Typically, compressor/vacuum pump 19 adjusts the upstream refrigerant fluid pressure in system 10. Accordingly, compressor/vacuum pump 19 is generally configured to control the temperature of heat load 34, and can be adjusted (by changing a pumping rate) to selectively change a temperature set point value (i.e., a target temperature) for heat load 34.

Other important system operating parameters are the superheat and the vapor quality of the refrigerant fluid emerging from evaporator 32, as also discussed above. Vapor quality, as mentioned, is a number from 0 to 1, represents the fraction of the refrigerant fluid that is in the vapor phase.

In the embodiment in FIG. 2F, which can operate in the two phase region, because heat absorbed from load 34 is used to drive a constant-temperature evaporation of liquid refrigerant to form refrigerant vapor in evaporator 32, it is generally important to ensure that, for a particular volume of refrigerant fluid propagating through evaporator 32, at least some of the refrigerant fluid remains in liquid form right up to the point at which the exit aperture of evaporator 32 is reached to allow continued heat absorption from load 34 without causing a temperature increase of the refrigerant fluid. However, if the fluid is fully converted to the vapor phase after propagating only partially through evaporator 32, further heat absorption by the (now vapor-phase) refrigerant fluid within evaporator 32 will lead to a temperature increase of the refrigerant fluid and heat load 34. On the other hand, liquid-phase refrigerant fluid that emerges from evaporator 32 represents unused heat-absorbing capacity, in that the liquid refrigerant fluid did not absorb sufficient heat from load 34 to undergo a phase change. To ensure that system 10 operates efficiently, the amount of unused heat-absorbing capacity should remain relatively small.

In addition, the boiling heat transfer coefficient that characterizes the effectiveness of heat transfer from load 34 to the refrigerant fluid is typically very sensitive to vapor quality. When the vapor quality increases from zero to a certain value, called a critical vapor quality, the heat transfer coefficient increases. In general, the critical vapor quality and heat transfer coefficient values vary widely for different refrigerant fluids, and heat and mass fluxes. For all such refrigerant fluids and operating conditions, the systems and methods disclosed herein control the vapor quality at the outlet of the evaporator such that the vapor quality approaches the threshold of the critical vapor quality.

When the vapor quality exceeds the critical vapor quality, the heat transfer coefficient is abruptly reduced to a very low value, causing dry-out within evaporator 32. In this region of operation, the two-phase mixture behaves as superheated vapor.

The embodiments of FIGS. 1, 2A-2E, operate with controlled superheat at the evaporator exit. That is, the embodiments of FIGS. 1, 2A-2E are configured to operate such that vapor quality is at 1, at the evaporator exit, so that refrigerant liquid is not fed to the inlet of the compressor/vacuum pump 19.

To make maximum use of the heat-absorbing capacity of the two-phase refrigerant fluid mixture, the vapor quality of the refrigerant fluid emerging from evaporator 32 (in the implementation of FIG. 2F) should nominally be nearly equal to the critical vapor quality, but (in the implementations of FIG. 1, 2A-2E) should be equal to the critical vapor quality, i.e., completely in the vapor phase.

Accordingly, to both efficiently use the heat-absorbing capacity of the two-phase refrigerant fluid mixture and also ensure that the temperature of heat load 34 remains approximately constant at the phase transition temperature of the refrigerant fluid in evaporator 32, the systems and methods of FIGS. 1, 2A-2F are generally configured to adjust the vapor quality of the refrigerant fluid emerging from evaporator 32 to a value that is less than (of FIG. 2F) or equal to (FIGS. 1, 2A-2E) the critical vapor quality.

Another important operating consideration for system 10 is the mass flow rate of refrigerant fluid within the system. The evaporator can be configured to provide minimal mass flow rate controlling maximal vapor quality, which is the critical vapor quality. By minimizing the mass flow rate of the refrigerant fluid according to the cooling requirements for heat load 34, system 10 operates efficiently. Each reduction in the mass flow rate of the refrigerant fluid (while maintaining the same temperature set point value for heat load 34) means that the charge of refrigerant fluid added to reservoir 12 initially lasts longer, providing further operating time for system 10.

Within evaporator 32, the vapor quality of a given quantity of refrigerant fluid varies from the evaporator inlet (where vapor quality is lowest) to the evaporator outlet (where vapor quality is highest). Nonetheless, to realize the lowest possible mass flow rate of the refrigerant fluid within the system, the effective vapor quality of the refrigerant fluid within evaporator 32—even when accounting for variations that occur within evaporator 32—should match the critical vapor quality as closely as possible according to the considerations mentioned above.

In summary, to ensure that the system operates efficiently and the mass flow rate of the refrigerant fluid is relatively low, and at the same time the temperature of heat load 34 is maintained within a relatively small tolerance, system 10 adjusts the vapor quality of the refrigerant fluid emerging from evaporator 32 to a value such that an effective vapor quality within evaporator 32 matches, or nearly matches, the critical vapor quality.

In system 10, control device 18 is generally configured to control the vapor quality of the refrigerant fluid emerging from evaporator 32. As an example, when control device 18 is implemented as an expansion valve, the expansion valve regulates the mass flow rate of the refrigerant fluid through the valve. In turn, for a given set of operating conditions (e.g., ambient temperature, initial pressure in the receiver, temperature set point value for heat load 34, heat load 34), the vapor quality determines mass flow rate of the refrigerant fluid emerging from evaporator 32.

Control device 18 typically controls the vapor quality of the refrigerant fluid emerging from evaporator 32 in response to information about at least one thermodynamic quantity that is either directly or indirectly related to the vapor quality. Compressor/vacuum pump 19 is configured to control a temperature of the heat load 34 (via upstream refrigerant fluid pressure adjustments) in response to information about at least one thermodynamic quantity that is directly or indirectly related to the temperature of heat load 34. The one or more thermodynamic quantities upon which adjustment of control device 18 is based may be different from the one or more thermodynamic quantities upon which adjustment of compressor/vacuum pump 19 is based.

In general, a wide variety of different measurement and control strategies can be implemented in system 10 to achieve the control objectives discussed above. These strategies are presented below. Generally, control device 18 is connected to a first measurement device and compressor/vacuum pump 19 is connected to a second measurement device. The first and second measurement devices provide information about the thermodynamic quantities upon which adjustments of the first and second control devices are based. The first and second measurement devices can be implemented in many different ways, depending upon the nature of the first and second control devices. In addition, in the implementations of FIGS. 2A-2E sensor device 40 can measure thermodynamic quantities that can be used to determine, by the controller 17, superheat at the outlet of the evaporator 32, and controller 17, in turn generates control signals to control operation of the expansion device 18, and as appropriate the compressor/vacuum pump 19 and back pressure regulator 36.

IV. Thermal Management Systems with Open-Circuit Refrigeration Systems with Compressor Exhaust and Ejector Boost Assist Referring now to FIG. 3, an alternative thermal management system 50 includes an open-circuit refrigeration system with compressor-assisted exhaust and ejector boost assist (OCRSCAEE) 50a that has a refrigerant fluid flow path 55a. The addition of an ejector allows recirculation of liquid non-evaporated in the evaporator operating within the threshold of critical vapor quality.

Also discussed below will be an OCRSCAEE system configuration that is one of several open-circuit refrigeration with ejector system configurations that include two receivers, but which otherwise parallel OCRSCAEE configurations 50a-50g.

Figure 3:
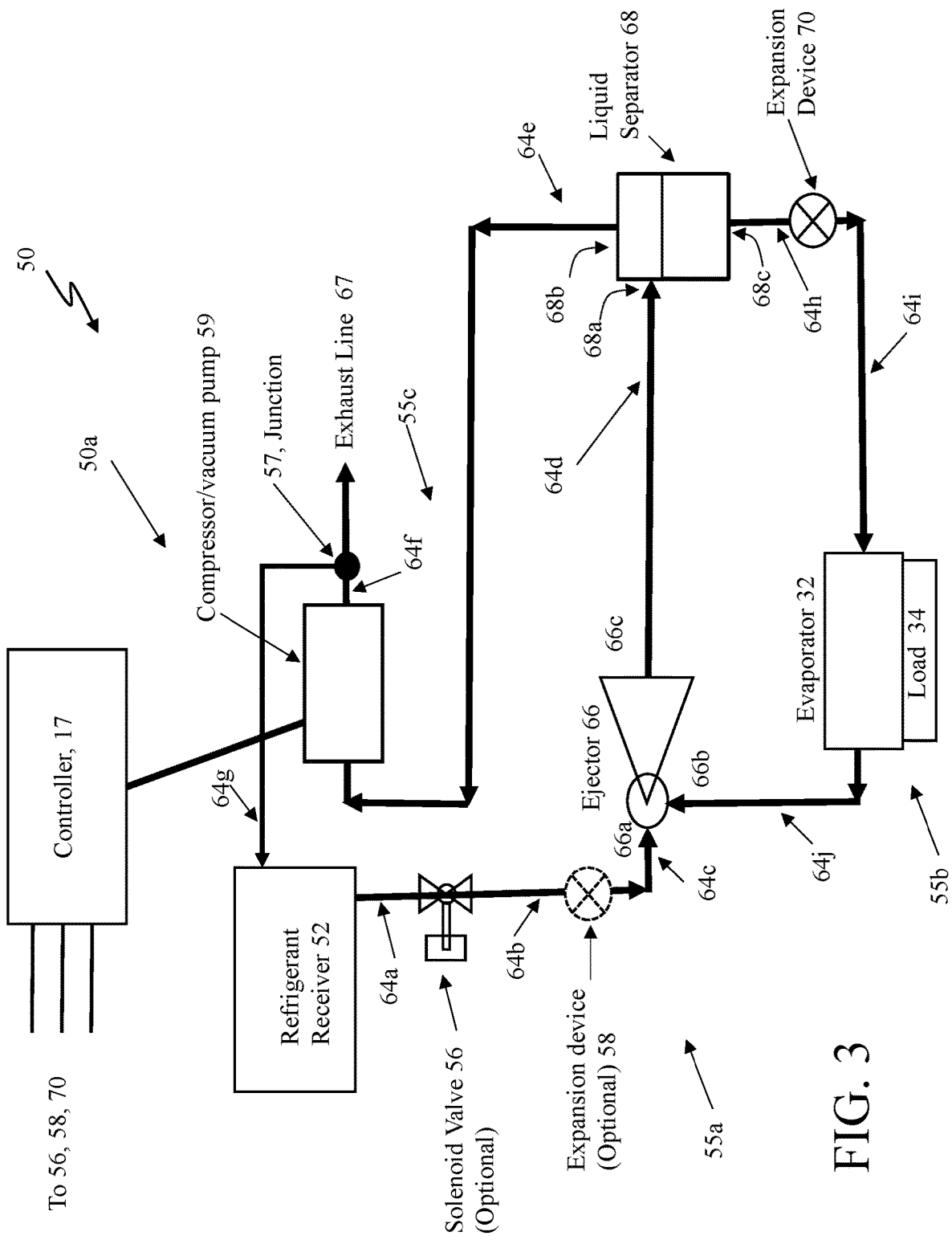
FIG. 3 is a schematic diagram of another example of a thermal management system that includes an alternative open-circuit refrigeration system with an exhaust compressor or vacuum pump and an ejector.

In FIG. 3, the OCRSCAEE 50a includes a compressor or a vacuum pump 59 (functionally similar to the compressor or the vacuum pump 19 of FIGS. 1, 2A-2F). OCRSCAEE 50a is one of several open-circuit refrigeration with ejector system configurations 50a-50g that will be discussed herein.

OCRSCAEE 50a includes a receiver 52 that receives and is configured to store refrigerant, an optional solenoid valve 56 and an optional control device 56, e.g., an expansion device 58. The liquid refrigerant in the receiver 52 can be maintained in two-phase or (if high pressure is maintained in the receiver by the compressor) in a subcooled state (e.g., as a liquid existing at a temperature below its normal boiling point temperature) even at high ambient and liquid refrigerant temperatures. Both, either or neither of the solenoid control valve 56 and the optional expansion device 58 are used (i.e., or not used) in each of the embodiments of an OCRSCAEE, as will be described in FIGS. 3, and 5A-5F.

The OCRSCAEE 50a also includes an ejector 66 and a liquid separator 68. The ejector 66 has a primary inlet or high pressure inlet 66a that is coupled to the refrigerant receiver 52 (either directly or through the optional solenoid control valve 56 and/or optional control device 58). In OCRSCAEE 50a outlet 66c of the ejector 66 is coupled to an inlet 68a of the liquid separator 68. The ejector 66 also has a secondary inlet or low pressure inlet 66b. The liquid separator 68 in addition to the inlet 68a, has a first outlet (vapor side outlet) 68b and a second outlet 68c (liquid side outlet). The first outlet 68b of the liquid separator 68 is coupled to an inlet (not referenced) of the compressor/vacuum pump 59 that has an outlet (not referenced) that feeds an exhaust line 67.

The OCRSCAEE 50a also includes an optional expansion device 70 and an evaporator 32 (similar or the same as the evaporator 32 of FIGS. 1, 2A-2F). The evaporator 32 is coupled to secondary inlet of the ejector 66 and the second outlet 68c (liquid side outlet) of the liquid separator 68.

The thermal management system 50 includes the heat load 34 (similar or the same as the load of FIGS. 1-2F) that is coupled to OCRSCAEE 50a in thermal communication with the evaporator 32.

The evaporator 32 is configured to extract heat from the heat load 34 that is in contact with the evaporator 32. Conduits 64a-64j couple the various aforementioned items, as shown. OCRSCAEE 50a in some embodiments also includes a controller 17 that produces control signals to control operation of the various ones of devices 56, 58, 70, etc. as needed, as well as compressor/vacuum pump 59. Controller 17 is similar to controller 17 of FIG. 1.

The OCRSCAEE 50a can be viewed as including three circuits. A first circuit 55a being the refrigerant flow path 55a that includes the receiver 52 and two downstream circuits 55b and 55c that are downstream from the liquid separator 68. Downstream circuit 55b carries liquid from the liquid separator 68 and includes the expansion device 70 that feeds the evaporator 32. The downstream circuit 55c includes the compressor/vacuum pump 59, and which exhausts vapor via the exhaust line 67. Receiver 52 is typically implemented as an insulated vessel that stores refrigerant fluid, at relatively high pressures. The control device 58 is configurable to control a flow of the refrigerant from the receiver 52 to ejector 66. The control device 58 can be an expansion valve.

In some implementations, the OCRSCAEE 50a includes a junction 57 between the compressor/vacuum pump 59 and the exhaust line 67. (Optionally, a back pressure regulator, not shown could also be included as in FIG. 2E). The junction 57 is interposed to divert a portion of compressed gas from the compressor/vacuum pump 59 back to the receiver 52 to maintain high pressure in the receiver 52 and to maintain the liquid refrigerant in the receiver in a sub-cooled state.

In some embodiments, refrigerant flow through the OCRSCAEE 50a is controlled either solely by the ejector 66 and compressor/vacuum pump 59 or by those components aided by either one or all of the solenoid valve 56 and expansion control device (e.g., expansion valve) 58, depending on requirements of the application, e.g., ranges of mass flow rates, cooling requirements, receiver capacity, ambient temperatures, heat load, etc. While both solenoid valve 56 and expansion control device 58 are optionally, in some implementation either or both would be used and would function as a flow control device(s) to control refrigerant flow into the primary inlet 66a of the ejector 66.

In some embodiments expansion device 58 is integrated with the ejector 66. In OCRSCAEE 50a (as well as the other embodiments discussed below) the expansion control device 58 may be required under some circumstances where there are or can be significant changes in, e.g., an ambient temperature, which might impose additional control requirements on the OCRSCAEE 50a.

In general, the valve 56 is implemented as a solenoid control valve 56 or any one or more of a variety of different mechanical and/or electronic devices. A solenoid valve includes a solenoid that uses an electric current to generate a magnetic field to control a mechanism to regulate an opening in a valve to control fluid flow. The valve 56 is configurable to stop refrigerant flow as an on/off valve.

The compressor/vacuum pump 59 at the vapor side outlet 68b of the liquid separator 68 generally functions to control the vapor pressure upstream of the compressor/vacuum pump 59 and hence temperature of the heat load 34. In OCRSCAEE 50a, the compressor/vacuum pump 59 controls the refrigerant fluid vapor pressure from the liquid separator 68, and indirectly controls evaporating pressure/temperature and hence heat load temperature. In general, compressor/vacuum pump 59 can be implemented using a variety of different techniques, as discussed above for compressor/vacuum pump 19.

For device 58 a mechanical expansion valve or an electrically controlled expansion valve could be used, as discussed above for expansion control device 18 (FIG. 1). The expansion valve 70 can be an electrically controlled expansion valve, similar to electrically controlled expansion control device 18a discussed above.

In some embodiments discussed below, the controller 17 can be used with sensors to calculate a value of superheat for the expanded refrigerant fluid based on pressure and temperature measurements at the liquid separator exit. The controller 17 can generate control signals to control electrical expansion valves, as discussed above for device 18a (FIG. 2A). Some loads require maintaining thermal contact between heat load 34 and evaporator 32 with the refrigerant being in the two-phase region (of a phase diagram for the refrigerant) and, therefore, the expansion device or valve 70 maintains a proper vapor quality at the evaporator exit. Alternatively, a sensor communicating with the controller 17 may monitor pressure in the refrigerant receiver 52, as well as a pressure differential across the expansion valve 56, a pressure drop across the evaporator 32, a liquid level in the liquid separator 68, and power input into electrically actuated heat loads, or a combination of the above.

Examples of suitable commercially available expansion valves that can function as device 70 include, but are not limited to, thermostatic expansion valves available from the Sporlan Division of Parker Hannifin Corporation (Washington, MO) and from Danfoss (Syddanmark, Denmark).

In FIG. 3, the evaporator 32 has an outlet that is coupled, via conduit 64j to the secondary inlet 66b (low-pressure inlet) of the ejector 66. The evaporator 32 has an inlet that is coupled via conduit 64i to an outlet of the expansion device 70. The expansion device 70 and conduit 64h and 64i, thus couple the inlet of the evaporator 32 to the liquid side outlet 68c of the liquid separator 68. In this configuration, the ejector 66 acts as a "pump," that may assist in reducing pumping demand by the compressor/vacuum pump 59. The ejector 66 assists in "pumping" a secondary fluid flow, e.g., liquid/vapor from the evaporator 32, by using energy of the primary refrigerant flow from the refrigerant receiver 52. The use of the ejector 66 can significantly reduce the size or pumping capacity needed for a given cooling demand and as a result reduce the amount of power consumed by the compressor/vacuum pump 59.

Figure 4:
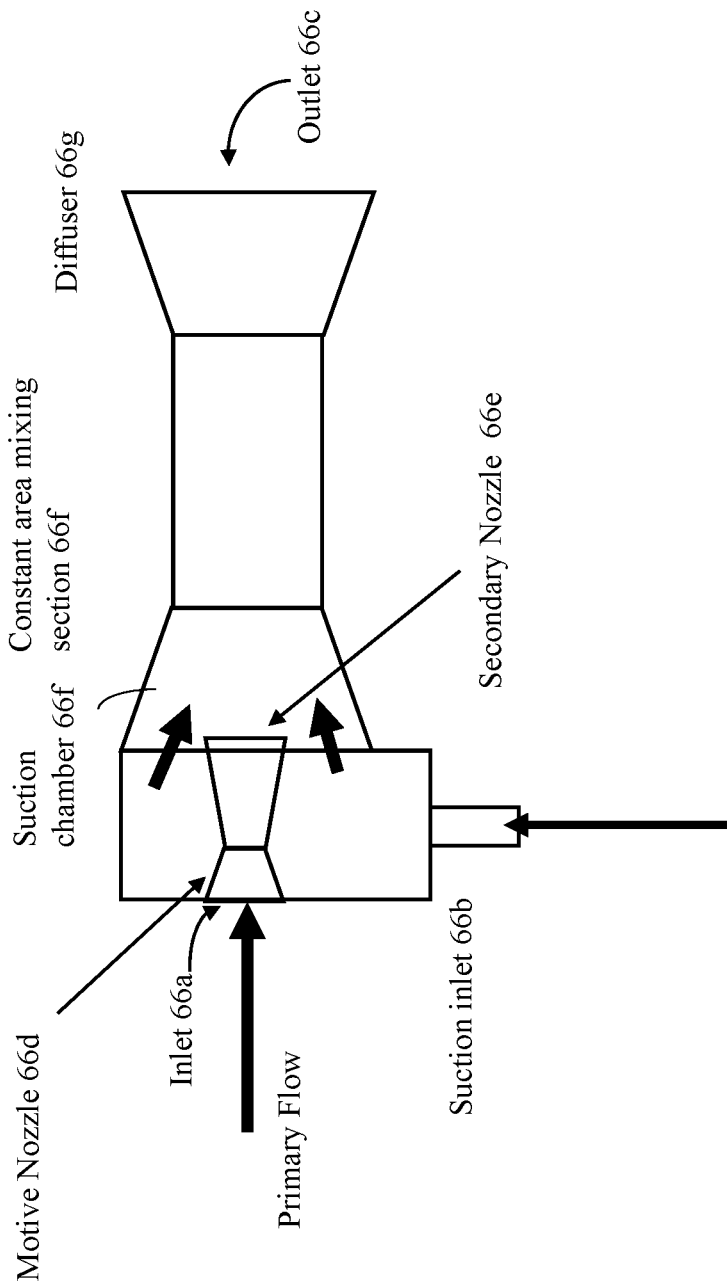
FIG. 4 is a schematic diagram of an ejector.

Ejector 66 operation is discussed in FIG. 4. The evaporator 32 can be implemented as discussed above and as will be further discussed below.

Referring now also to FIG. 4, a typical configuration for the ejector 66 is shown. This exemplary ejector 66 includes the primary inlet 66a, secondary or suction inlet 66b and the outlet 66c. The primary inlet feeds a motive nozzle 66d, the secondary or suction inlet 66b feeds secondary nozzle(s) 66e that are coupled to a suction chamber 66f. A mixing chamber 66g of a constant area receives the primary flow of refrigerant and secondary flow of refrigerant and mixes these flows. A diffuser 66h diffuses the flow to deliver an expanded flow at the outlet 66c.

In one embodiment, the ejector 66 is passively controlled by built-in flow control. Also, the OCRSCAEE 50a may employ the optional flow control device(s) 56, 58 upstream of the ejector 66.

Liquid refrigerant from the refrigerant receiver is the primary flow. In the motive nozzle 66d potential energy of the primary flow at the inlet 66a is converted into kinetic energy reducing the potential energy (the established static pressure) of the primary flow. The secondary flow at the inlet 66b from the outlet of the evaporator 32 has a pressure that is higher than an established static pressure in the suction chamber 66f, and thus the secondary flow is entrained through the suction inlet (secondary inlet 66b) and the secondary nozzle(s) 66f internal to the ejector 66. The two streams (primary flow and secondary flow) mix together in the mixing section 66f. In the diffuser section 66g, the kinetic energy of the mixed streams is converted into potential energy elevating the pressure of the mixed flow liquid/vapor refrigerant that leaves the ejector outlet 66c and is fed to the liquid separator 68.

In the context of open-circuit refrigeration systems, the use of the ejector 66 allows for recirculation of liquid refrigerant captured by the liquid separator 68 to increase the efficiency of the system 50. That is, by allowing for some recirculation of refrigerant, but without the need for a compressor or a condenser, as in a closed cycle refrigeration system, this recirculation reduces the required amount of refrigerant needed for a given amount of cooling over a given period of operation. The ejector 66 also can reduce the power requirements of the compressor/vacuum pump 59.

The system including the evaporator 32 may be configured to maintain exit vapor quality below the critical vapor quality defined as "1", as discussed above.

Referring back to FIG. 3, the OCRSCAEE 50a operates as follows. The refrigerant from the receiver 52 (primary flow) is fed to the primary inlet of the ejector 66 and expands at a constant entropy in the ejector 66 (in ideal case; in reality the nozzle is characterized by the isentropic efficiency of the ejector) and turns into a two-phase (gas/liquid) state. The refrigerant in the two-phase state from the ejector 66 enters the liquid separator 68, with liquid exiting the liquid separator at outlet 68c (liquid side outlet) and vapor exiting the separator 68 at outlet 68b the (vapor side outlet) depending on separation efficiency. The liquid stream exiting at outlet 68c enters and is expanded in the expansion device 70 into a liquid/vapor stream that enters the evaporator 32. The expansion device 70 is configured to maintain suitable vapor quality at the evaporator exit (or a superheat if this is acceptable to operate the heat load) and related recirculation rate.

The evaporator 32 provides cooling duty and discharges the refrigerant in a two-phase state or a superheated state into the secondary inlet 66b of the ejector 66. The ejector 66 entrains the refrigerant flow exiting the evaporator 32 and mixes it in the mixing section of the ejector with the primary flow from the receiver 54. Vapor exits from the vapor side outlet 68b of the liquid separator 68 is drawn to the exhaust line 67 by the compressor/vacuum pump 59 and is exhausted by the exhaust line 67. The compressor/vacuum pump 59 regulates the pressure upstream of the compressor/vacuum pump 59 so as to maintain upstream refrigerant fluid pressure in OCRSCAEE 50a and thus indirectly control temperature of a heat load 34.

FIGS. 5A-5G discussed below are alterative open-circuit refrigeration systems with ejector booster assist and compressor (OCRSCAEE) configurations.

Figure 5A:
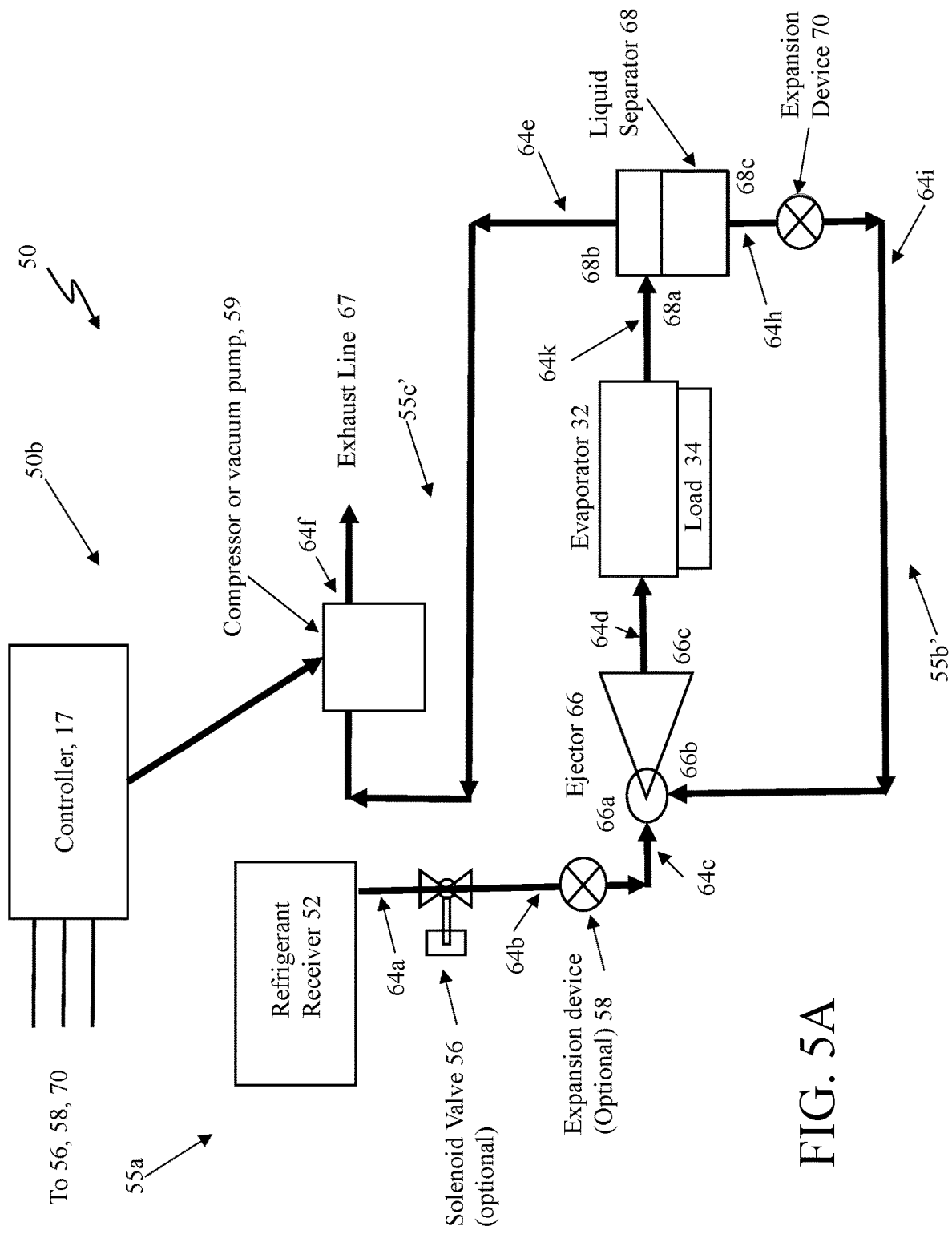
FIGS. 5A-5F are schematic diagrams of other examples of a thermal management system that includes alternative open-circuit refrigeration systems with an exhaust compressor or vacuum pump and an ejector.

Referring now to FIG. 5A, the system 50 includes an alternative open-circuit refrigeration system (OCRSCAEE) 50b. OCRSCAEE 50b includes the receiver 52, optionally, the solenoid control valve 56 and/or optionally the expansion control device 58, as discussed above. OCRSCAEE 50b also includes the ejector 66 having the primary inlet 66a that is coupled to receiver 52 directly (or through the control device 58 and solenoid control valve 56, if used) via conduit 64a, 64b, and the ejector has the outlet 66c.

In OCRSCAEE 50b, the evaporator 32 inlet is coupled to the outlet 66c of the ejector 66, via conduit 64c, and the evaporator outlet is coupled to the inlet 68a of the liquid separator 68, via conduit 64k. The heat load 34 is coupled to the evaporator 32. The evaporator 32 is configured to extract heat from heat load 34 that is in contact with the evaporator 32. In OCRSCAEE 50b, the expansion device 70 is coupled between the liquid outlet 68c of the liquid separator 68 and the suction or secondary inlet 66b of the ejector 66.

The second outlet (vapor side outlet) of the liquid separator 68 is coupled to compressor/vacuum pump 59 and is exhausted by the exhaust line 67. The compressor/vacuum pump 59 regulates the pressure upstream of the compressor/vacuum pump 59 so as to maintain upstream refrigerant fluid pressure in OCRSCAEE 50a and indirectly control temperature of the heat load 34. Conduits 64a-64f, 64h, 64i and 64k couple the various aforementioned items as shown. With OCRSCAEE 50b, the recirculation rate is equal to the vapor quality at the evaporator exit. The expansion device 70 is optional but when used, is a fixed orifice device. The control valve 58 or other control device that is built in the motive nozzle of the ejector provides active control of the thermodynamic parameters of refrigerant state at the evaporator exit.

The OCRSCAEE 50b operates as follows. The liquid refrigerant from the receiver 52 is fed to the ejector 66 and expands at a constant entropy in the ejector 66 (in an ideal case; in reality the nozzle is characterized by the ejector isentropic efficiency), and turns into a two-phase (gas/liquid) state. The refrigerant in the two-phase state enters the evaporator 32 that provides cooling duty and discharges the refrigerant in a two-phase state at an exit vapor quality (fraction of vapor to liquid) below a unit vapor quality ("1"). The discharged refrigerant is fed to the inlet of the liquid separator 68, where the liquid separator 68 separates the discharge refrigerant with only or substantially only liquid exiting the liquid separator at outlet 68c (liquid side outlet) and only or substantially only vapor exiting the separator 68 at outlet 68b the (vapor side outlet). The vapor side may contain some liquid droplets since the liquid separator 68 has a separation efficiency below a "unit" separation. The liquid stream exiting at outlet 68c enters and is expanded in the optional expansion device 70, if used, into a liquid/vapor stream that enters the suction or secondary inlet of the ejector 66. The ejector 66 entrains the refrigerant flow exiting the expansion valve by the refrigerant from the receiver 54.

In OCRSCAEE 50b, by placing the evaporator 32 between the outlet of the ejector 66 and the inlet of the liquid separator 68, OCRSCAEE 50b avoids the necessity of having liquid refrigerant pass through the liquid separator 29 during the initial charging of the evaporator 32 with the liquid refrigerant, in contrast with the OCRSCAEE 50a (FIG. 3). The ejector "pumping" capacity of liquid is higher than the pumping capacity of vapor, therefore the recirculation rate may be increased and the requirements for the precise control of the vapor quality at the evaporator exit, ease. At the same time liquid trapped in the liquid separator 68 may be wasted after the OCRSCAEE shuts down.

The OCRSCAEE 50b can also be viewed as including three circuits, the first circuit 55a being the refrigerant flow path as in FIG. 3 and two circuits 55b' and 55c. Circuit 55b' however is upstream from the liquid separator 68 and carries vapor/liquid from the evaporator 32 to the inlet to the liquid separator 68. The downstream circuit 55c exhausts vapor from liquid separator 68 via the compressor/vacuum pump 59 to the exhaust line 67.

When a fixed orifice device is not used, the expansion valve 58 can be an electrically controlled expansion valve. Typical electrical expansion valves include an orifice, a moving seat, a motor or actuator that changes the position of the seat with respect to the orifice, the controller 17 (see FIG. 15), and sensors. The sensors may monitor vapor quality at the evaporator exit, pressure in the refrigerant receiver 52, pressure differential across the expansion valve 58, pressure drop across the evaporator 32, liquid level in the liquid separator 68, power input into electrically actuated heat loads or a combination of the above.

Examples of suitable commercially available expansion valves that can function as device 70 include, but are not limited to, thermostatic expansion valves available from the Sporlan Division of Parker Hannifin Corporation (Washington, MO) and from Danfoss (Syddanmark, Denmark). Also, the expansion valve 58 can be integrated into the motive nozzle of the ejector.

Figure 5B:
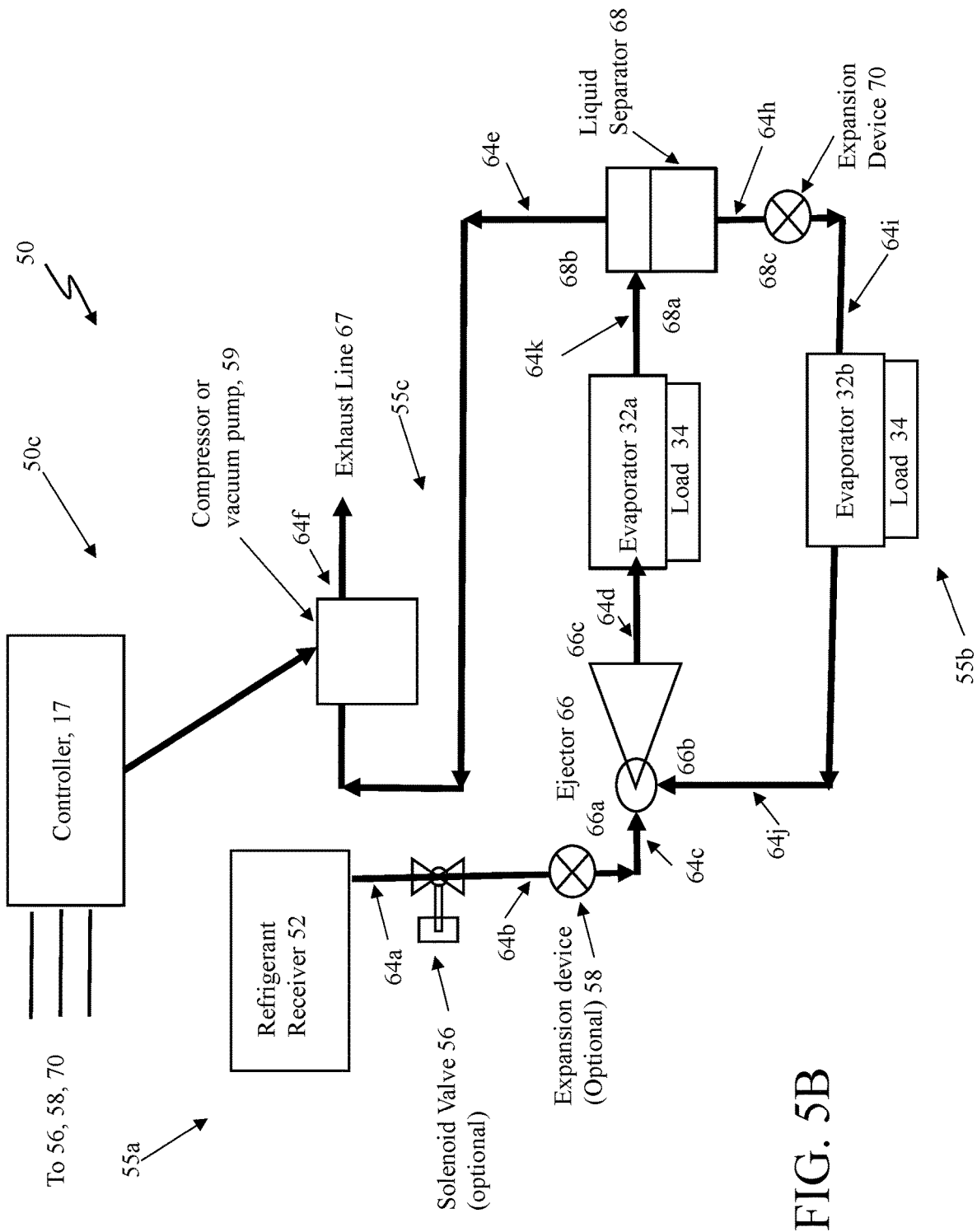

Referring now to FIG. 5B, the system 10 includes another alternative open-circuit refrigeration system (OCRSCAEE) 50c. OCRSCAEE 50c includes the receiver 52 and the optional expansion valve 58 and optional solenoid control valve 56, coupled to inlet 66a of the ejector 66, and the liquid separator 68. The OCRSCAEE 50c includes the expansion device 70 coupled to the liquid side outlet 68c of the liquid separator 68. The second outlet 68b (vapor side outlet) of the liquid separator 68 is coupled, via conduit 64e, 64f and the compressor/vacuum pump 59 to the exhaust line 67.

The OCRSCAEE 50c also includes a first evaporator 32a. A heat load 34a is coupled to the evaporator 32a. The evaporator 32a is configured to extract heat from heat load 34a that is in contact with the evaporator 32a. The evaporator 32a is coupled to the outlet 66c of the ejector 66 and the inlet 68a of the liquid separator 68. The OCRSCAEE 50c also includes a second evaporator 32b having an inlet coupled to the outlet of the expansion device 70, and the second evaporator 32b has an outlet coupled to the suction inlet 66b of the ejector 66. A heat load 34b is coupled to the evaporator 32b. The evaporator 32b is configured to extract heat from heat load 34b that is in contact with the evaporator 32b. Conduits 64a-64f, 64h-64k couple the various aforementioned items, as shown.

The cooling capacity of the OCRSCAEE 50a is sensitive to recirculation rate; also, this configuration can operate with loads that allow for operation in superheat regions. OCRSCAEE 50a reduces compression ratio requirements for the compressor 59 and reduces compressor power and compressor size and weight requirements relative to a conventional closed-circuit refrigeration system. The OCRSCAEE 50b system is not sensitive to recirculation rate, which may be beneficial when the heat loads may significantly reduce recirculation rate. An operating advantage of the OCRSCAEE 50c is that by placing evaporators 32a, 32b at both the outlet 66c and the secondary inlet 66b of the ejector 66, it is possible to run the evaporators 32a, 32b combining the features of the configurations mentioned above.

The OCRSCAEE 50c can also be viewed as including three circuits. The first circuit 55a being the refrigerant flow path as in FIG. 1 and two circuits 55b'' and 55c. Circuit 55b'' being upstream and downstream from the liquid separator 68, carrying liquid from the liquid outlet of the liquid separator 68 and carrying vapor/liquid from the evaporator 32 into the inlet of the liquid separator 68. The downstream circuit 55c exhausts vapor via the compressor/vacuum pump 59 to the exhaust line 67.

Figure 5C:
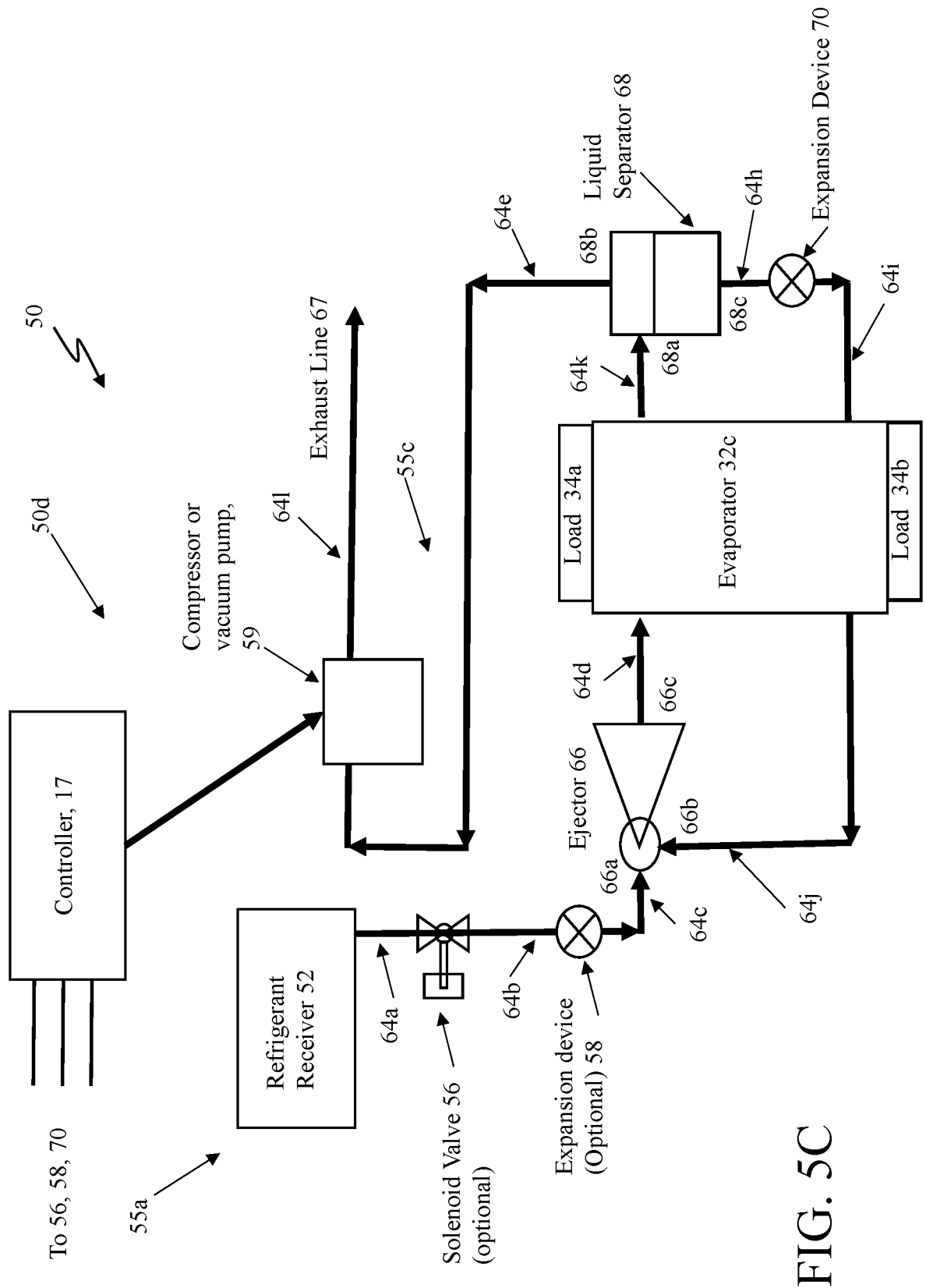

Referring now to FIG. 5C, the system 10 can include another alternative open-circuit refrigeration system (OCRSCAEE) 50d. OCRSCAEE 50d includes the receiver 12, (optional valve 58 and optional solenoid control valve 56), ejector 66, and liquid separator 68, as discussed above. The OCRSCAEE 50d includes the expansion device 70 coupled to the liquid side outlet 68c of the liquid separator 68.

The OCRSCAEE 50d also includes a single evaporator 32c that is attached downstream from and upstream of the ejector 66. A first heat load 34a is coupled to the evaporator 32c. The evaporator 32c is configured to extract heat from the first load 34a that is in contact with the evaporator 32c. A second heat load 34b is also coupled to the evaporator 32c. The evaporator 32c is configured to extract heat from the second load 34a that is in contact with the evaporator 32c. The evaporator 32c has a first inlet that is coupled, via conduit 64d, to the outlet 66c of the ejector 66 and also has a first outlet that is coupled, via conduit 64k, to the inlet 68a of the liquid separator 68. The evaporator 32c has a second inlet that is coupled, via conduit 64i, to the outlet of the expansion device 70 and has a second outlet that is coupled, via conduit 64j, to the suction inlet 66b of the ejector 66. The second outlet 68b (vapor side outlet) of the liquid separator 68 is coupled, via conduit 64e, 64l, and the compressor/vacuum pump 59 to the exhaust line 67. Conduits 64a-64f, 64h-64l couple the various aforementioned items, as shown.

In this embodiment, the single evaporator 32c is attached downstream from and upstream of the ejector 66 and requires a single evaporator in comparison with the configuration of FIG. 4 having the two evaporators 32a, 32b (FIG. 4). The OCRSCAEE 50d can also be viewed as including the three circuits 55a, 55b'' and 55c as described in FIG. 5B.

Figure 5D:
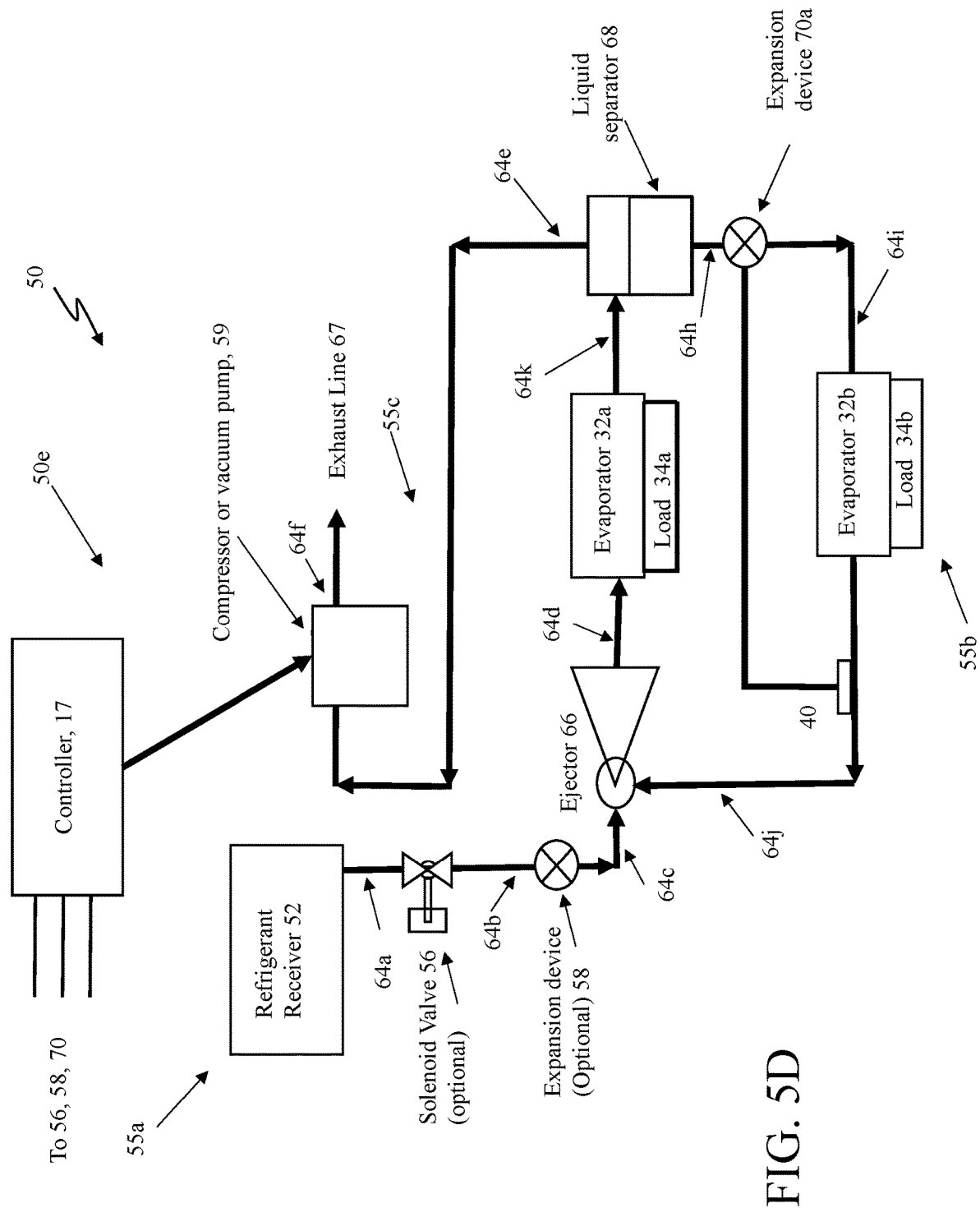

Referring now to FIG. 5D, the system 10 includes an alternative open-circuit refrigeration system (OCRSCAEE) 50e. OCRSCAEE 50e includes the receiver 52, (optional valve 58 and optional solenoid control valve 56), ejector 66, liquid separator 68, and the evaporators 32a, 32b, as discussed in FIG. 5B. The evaporators 32a, 32b have the first heat load 34a and the second heat load coupled to the evaporators 32a, 32b respectively, with the evaporators 32a, 32b configured to extract heat from the loads 34a, 34b in contact with the evaporators.

In this embodiment, the OCRSCAEE 50*e* also includes an expansion device 70*a*. The expansion device 70*a* is a sensor controlled expansion device, such as an electrically controlled expansion valve. The evaporators 32*a*, 32*b* operate in two phase (liquid/gas) and superheated region with controlled superheat. The controllable expansion device 70*a* is coupled to the liquid side outlet 68*c* of the separator 68 and the evaporator 32 having a control port that is fed from a sensor 40. The sensor controlled expansion device 70*a* and sensor 40 provide a mechanism to measure and control superheat at the evaporator exit. The second outlet 68*b* (vapor side outlet) of the liquid separator 68 is coupled via the compressor/vacuum pump 59 to the exhaust line 67. The OCRSCAEE 50*e* can also be viewed as including the three circuits 55*a*, 55*b*" and 55*c* as described in FIG. 5B. Conduits 64*a*-64*f*, 64*h*-64*k* couple the various aforementioned items, as shown.

In FIG. 5D, the vapor quality of the refrigerant fluid after passing through evaporator 32*a* can be controlled either directly or indirectly with respect to a vapor quality set point by the controller 17. In some embodiments, as shown in FIGS. 5D, the system 10 includes a sensor 40 that provides a measurement of superheat, and indirectly, vapor quality. For example, in FIG. 5D, sensor 40 is a combination of temperature and pressure sensors that measure the refrigerant fluid superheat downstream from the heat load, and transmits the measurements to the controller (not shown). The controller adjusts the expansion valve device 70 based on the measured superheat relative to a superheat set point value. By doing so, controller indirectly adjusts the vapor quality of the refrigerant fluid emerging from evaporator 32.

Figure 5E:
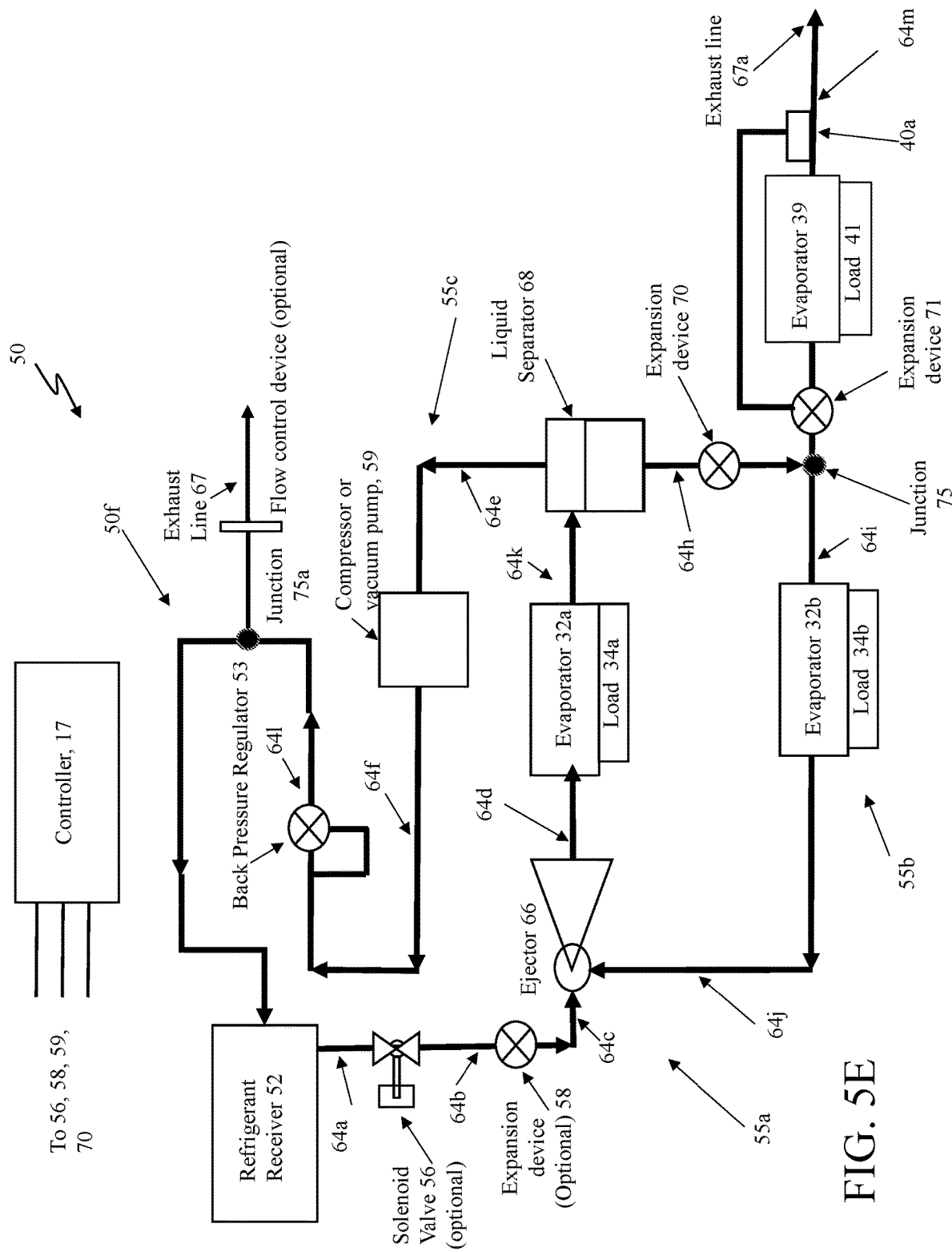

Referring now to FIG. 5E, the system 10 includes an alternative open-circuit refrigeration system (OCRSCAEE) 50*f*. OCRSCAEE 50*f* includes the receiver 52, optional expansion device 58 and optional solenoid control valve 56, ejector 66, liquid separator 68, expansion device 70 and the evaporators 32*a*, 32*b*, as discussed in FIG. 5B, as well as, a second expansion device 71 and a third evaporator 39 coupled to a third load 41. The evaporators 32*a*, 32*b* have the first heat load 34*a* and the second heat load 34*b* coupled to the evaporators 32*a*, 32*b* respectively, with the evaporators 32*a*, 32*b* configured to extract heat from the loads 34*a*, 34*b* in contact with the evaporators. The evaporator 39 is configured to extract heat from the load 41 in contact with the evaporator 39. An inlet of the evaporator 39 is coupled to an outlet of the expansion device 71, that is coupled to a port of a junction device 75. The other ports of the junction device 75 are coupled to the outlet of expansion valve 70 and an inlet to the evaporator 32*b*.

The second outlet 68*b* (vapor side outlet) of the liquid separator 68 is coupled via the compressor/vacuum pump 59 and a back pressure regulator 53 to the exhaust line 67 that may include an and junction 75*a* and optional flow control device that when included splits exhausted vapor into an inlet to the receiver 52 and out the exhaust line. (If the junction 75*a* and optional flow control device are not included, the exhaust is feed into the receiver inlet.) An outlet of the evaporator is coupled to exhaust line 67*a*, and a sensor 40*a* that measures a thermodynamic property of the refrigerant flow and generates a signal (either directly or via the controller 17) to control expansion device 71 to control superheat.

However, rather than the liquid separator vapor outlet being coupled to exhaust refrigerant vapor, as discussed above (FIGS. 3, 5A-5D), the liquid separator vapor outlet 28*b* can be coupled via junction 75*a* to the inlet to the refrigerant receiver 52 and the exhaust line 67, such that discharged vapor from the compressor 59 feeds the receiver 52 (in this instance the receiver containing a refrigerant that is under pressure, e.g., ammonia) and also some or none of the vapor can be exhausted via the exhaust line 67. In this embodiment there need not be any exhaust (from the compressor circuit, e.g., compressor and liquid separator vapor side) and obviates the need for a nitrogen (gas) receiver (discussed below). Pressure can be regulated by the use of the optional flow control device that will regulate the amount of vapor that is exhausted at line 67. The compressor is configured to maintain high pressure in the gas refrigerant (ammonia) receiver 52. The (OCRSCAEE) 50*f* will be configured to maintain vapor quality at the evaporator exit and amount of liquid in the liquid separator sufficient to operate the second and third evaporators.

The compressor/vacuum pump 59 and the back pressure regulator 53 control vapor pressure upstream of the compressor/vacuum pump 59. Conduits 64*a*-64*f*, 64*i*-64*m* couple the various aforementioned items, as shown with the conduit 64*m* coupling the evaporator 39 outlet to the second exhaust line 67*a*. Controller 17 can be included to control operation of, e.g., devices 56, 58, 59, 70 and 71, etc., for instance.

The evaporators 32*a*, 32*b* operate in two phase (liquid/gas) and the third evaporator 33 operates in superheated region with controlled superheat. OCRSCAEE 50*f* includes the controllable expansion device 71 that has an inlet attached to the outlet of expansion valve 70 and has an outlet attached to the evaporator 39. The expansion valve 71 has a control port that is fed from a sensor 40*a*. The sensor 40*a* controls the expansion valve 71 and provides a mechanism to measure and control superheat. The OCRSCAEE 50*f* can also be viewed as including the three circuits 55*a*, 55*b*" and 55*c* as described in FIG. 5B.

In FIGS. 5D, 5E, the vapor quality of the refrigerant fluid after passing through evaporator 32*a* can be controlled either directly or indirectly with respect to a vapor quality set point by the controller 17. In some embodiments, as shown in FIGS. 5D, 5E, the system 10 includes a sensor 40 or 40*a* that provides a measurement of superheat, and indirectly, vapor quality. For example, in FIG. 5D, sensor 40 is a combination of temperature and pressure sensors that measure the refrigerant fluid superheat downstream from the heat load, and transmits the measurements to the controller (not shown). The controller adjusts the expansion valve device 70 based on the measured superheat relative to a superheat set point value. By doing so, controller indirectly adjusts the vapor quality of the refrigerant fluid emerging from evaporator 32.

Figure 5F:
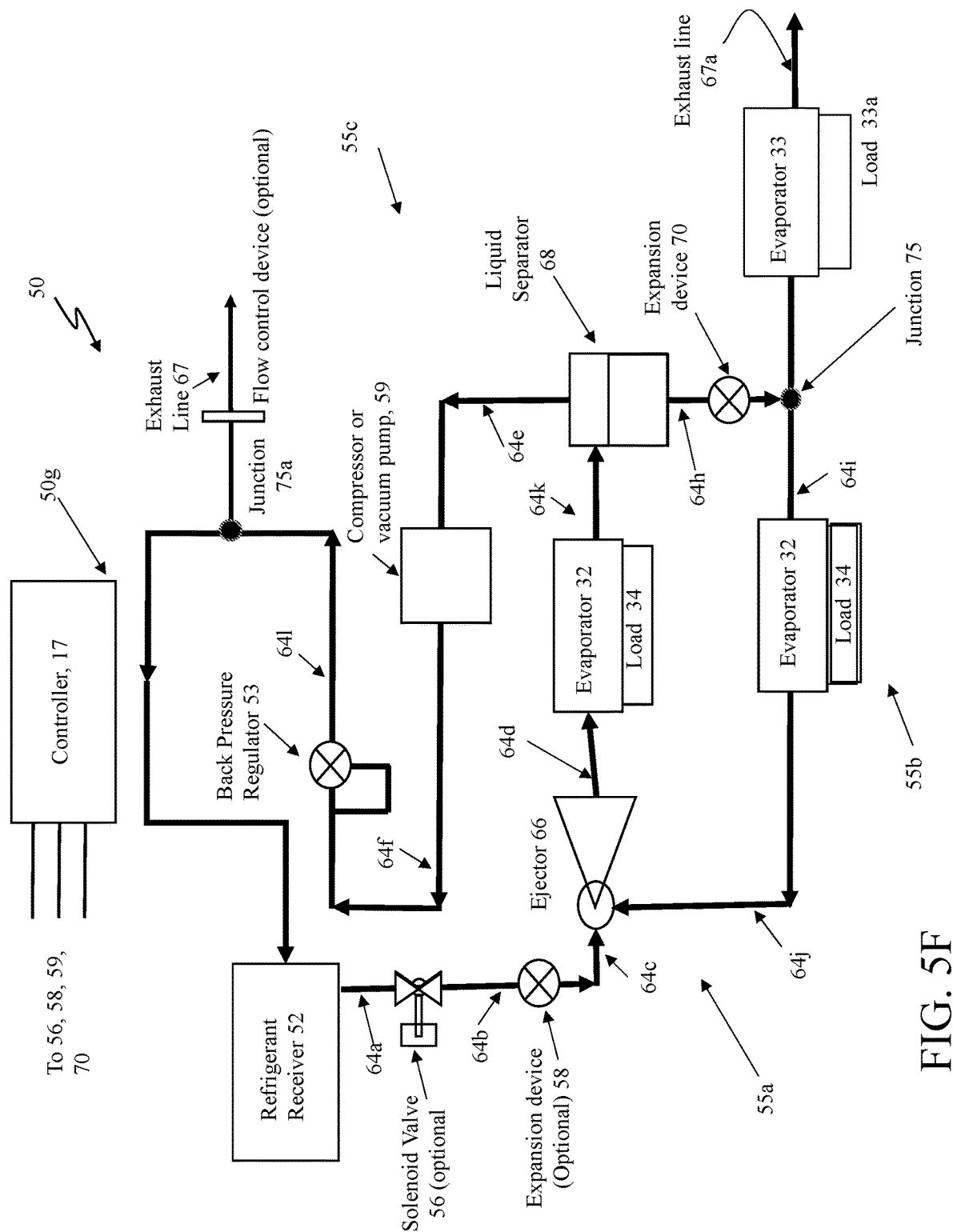

Referring now to FIG. 5F, the system 10 includes another alternative open-circuit refrigeration system (OCRSCAEE) 50*g*. OCRSCAEE 50*g* includes the receiver 52, (optional expansion valve 58 and optional solenoid control valve 56), ejector 66, liquid separator 68, the expansion device 70 and the evaporators 32*a*, 32*b*, 33, and heat load 34*a*, 34*b* and 33*a*, as discussed in FIG. 5E, (but without the expansion valve 71 of FIG. 5E). In this embodiment the OCRSCAEE 50*g* includes the third evaporator 39 that shares the same expansion valve, i.e., expansion valve 70, as the evaporators 32*a*, 32*b* via junction 75. The evaporators 32*a*, 32*b* operate in two phase (liquid/gas) and evaporator 39 operates in superheated region with controlled superheat.

The second outlet 68*b* (vapor side outlet) of the liquid separator 68 is coupled via the compressor/vacuum pump 59 and a back pressure regulator 53 to the exhaust line 67 that may include an and junction 75*a* and optional flow control device that when included splits exhausted vapor into an inlet to the receiver 52 and out the exhaust line. (If the junction 75a and optional flow control device are not included, the exhaust is feed into the receiver inlet.)

However, rather than the liquid separator vapor outlet being coupled to exhaust refrigerant vapor, as discussed above (FIGS. 3, 5A-5D), the liquid separator vapor outlet 28b can be coupled via junction 75a to the inlet to the refrigerant receiver 52 and the exhaust line 67, such that discharged vapor from the compressor 59 feeds the receiver 52 (in this instance the receiver containing a refrigerant that is under pressure, e.g., ammonia) and also some or none of the vapor can be exhausted via the exhaust line 67. In this embodiment there need not be any exhaust (from the compressor circuit, e.g., compressor and liquid separator vapor side) and obviates the need for a nitrogen (gas) receiver (discussed below). The compressor/vacuum pump 59 is configured to maintain high pressure in the gas refrigerant (ammonia) receiver 52. The (OCRSCAEE) 50g will be configured to maintain vapor quality at the evaporator exit and amount of liquid in the liquid separator sufficient to operate the second and third evaporators.

The compressor/vacuum pump 59 and the back pressure regulator 53 control vapor pressure upstream of the compressor/vacuum pump 59. In OCRSCAEP 50g, the compressor/vacuum pump 59 is a control device that controls the vapor pressure from the liquid separator 68 and indirectly controls evaporating pressure/temperature. The back pressure regulator 53 regulates fluid pressure upstream from the regulator, i.e., regulates the pressure at the outlet pump at the inlet of the regulator 53 according to a set pressure point value to provide an additional degree of control of exhaust pressure at the exhaust line 67.

Conduits 64a-64f, 64h-64l couple the various aforementioned items, as shown. Additional conduits (not referenced) couple the evaporator 33 to a second exhaust line 67a and second back pressure regulator. The OCRSCAEE 50g can also be viewed as including the three circuits 55a, 55b" and 55c, as described in FIG. 5. Controller 17 can be included to control operation of, e.g., devices 56, 58, 59, 53, 59 and 70, for instance.

V. Thermal Management Systems with Open-circuit Refrigeration Systems with Compressor Exhaust and Compressor Boost Assist Referring now to FIG. 6, an alternative thermal management system 110 includes an open-circuit refrigeration system with compressor-assisted exhaust and pump boost assist (OCRSCAEP) 110a that has a refrigerant fluid flow path 115a. The addition of a pump allows recirculation of non-evaporated refrigerant liquid in the evaporator 32 operating within the threshold of critical vapor quality.

Figure 6:
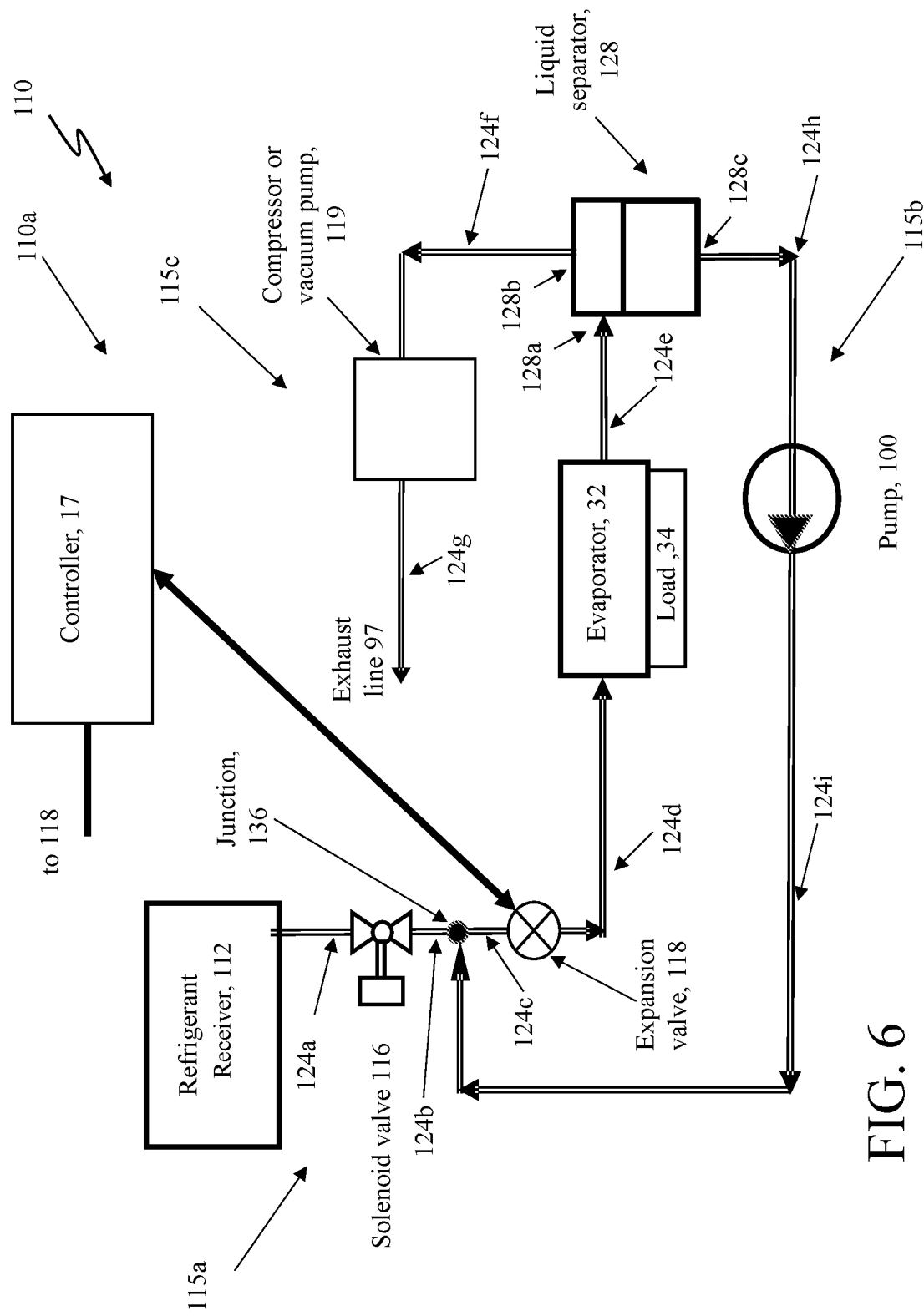
FIG. 6 is a schematic diagram of another example of a thermal management system that includes an open-circuit refrigeration system with exhaust compressor or vacuum pump and pump for liquid recirculation, useful for controlling vapor pressure in a refrigerant receiver.

In FIG. 6, embodiment 110a of the OCRSCAEP is one of several open-circuit refrigeration systems with vacuum pump/compressor and pump 110a-110f system configurations that will be discussed herein and includes a compressor or a vacuum pump 59 (functionally similar to the compressor or the vacuum pump arrangements 19 and 59 of FIGS. 1, 2A-2F, 3 and 5A-5f). OCRSCAEP 110a is one of several open-circuit refrigeration vacuum assist with pump system configurations 110a-110g that will be discussed herein.

OCRSCAEP 110a includes a receiver 112 that is configured to store liquid refrigerant, i.e., subcooled liquid refrigerant. OCRSCAEP 110a also includes an optional first control device, e.g., an optional solenoid control valve 116, and an optional control device, e. g., an expansion valve 118. OCRSCAEP 110a includes a junction device 136 that has first and second ports configured as inlets, and a third port configured as an outlet. A first one of the inlets of the junction device 136 is coupled to an outlet of the receiver 112 and the second one of the inlets of the junction device 136 is coupled to an outlet of a pump 100. An inlet of the optional solenoid control valve 116 (if used) is coupled to the outlet of the receiver 112. Otherwise, the outlet of receiver is coupled directly to the one of the inlets of the junction device 136 and the outlet of the junction device 136 feeds an inlet of the second control device, e. g., the expansion valve 118 (if used) or, if nether solenoid control valve 116 nor the expansion valve 118 is used, the outlet of the junction device 136 is coupled to an inlet of an evaporator 32. When the expansion valve 118 is used, the outlet of the junction device 136 is coupled to the inlet of the expansion valve 118 and the outlet of the expansion device is coupled to the inlet of the evaporator 32, as shown.

OCRSCAEP 110a in some embodiments also includes a controller 17 that produces control signals to control operation of the various ones of valves 116, 118, etc., pump 100, and compressor/vacuum pump 59, as needed. Controller 17 is described in FIG. 15.

Referring momentarily to FIGS. 6A-6D that show details of the junction device 136 and alternative locations for the junction device 136.

Figure 6B:
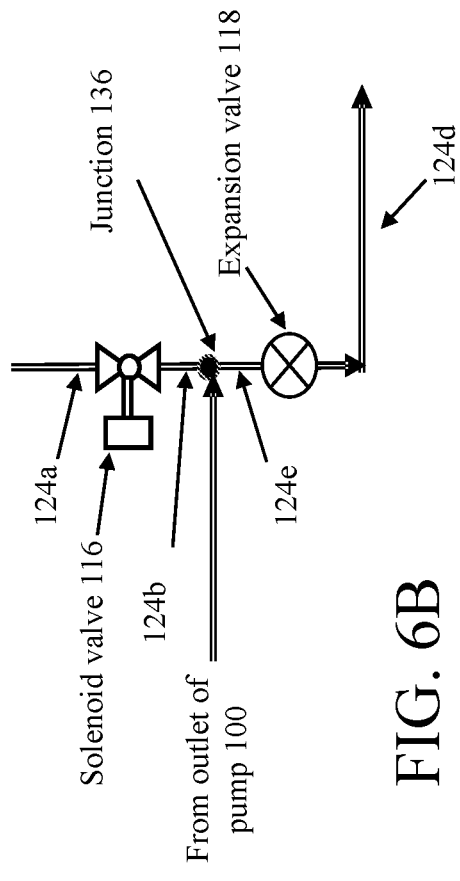
FIGS. 6A-6C are schematic diagrams of examples of a junction and arrangements of the junction in open-circuit refrigeration system configurations of FIG. 6.
Figure 6C:
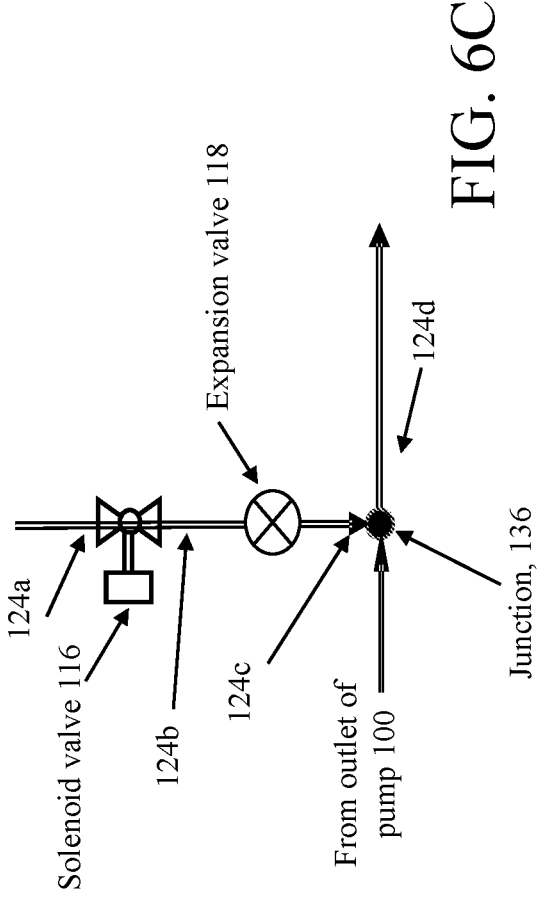
Figure 6A:
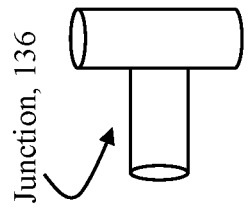

FIG. 6A shows a diagrammatical view of the junction device 136 having at least three ports any of which could be inlets or outlets. Generally, in the configurations below two of the ports would be inlets and one would be an outlet and refrigerant flows from the two ports acting as inlets would be combined and exit the outlet.

FIG. 6B shows the location for the junction device 136, as set out in FIG. 6, having one of the inlets and the outlet interposed between solenoid valve 116 and expansion valve 118, and having its other inlet coupled to the outlet of the evaporator 32.

FIG. 6C shows another alternative location for the junction device 136 having one of the inlets and the outlet interposed between the outlet of the expansion valve 118 and the evaporator 32 (FIG. 2) or liquid separator 28 (FIG. 3) and having its other inlet coupled to the outlet of the evaporator 32.

Any of the configurations that will be discussed below in FIGS. 7A to 7E can have the junction device 136 placed in the various locations shown in FIGS. 6B or 6C. If both of the optional solenoid control valve 116 and optional expansion valve 118 are not included, then all of the locations for the junction device 136 are, in essence, the same provided that there are no other intervening functional devices between the outlet of the receiver 112 and the inlet (that is in the refrigerant flow path 115a) of the junction device 136.

Returning to FIG. 6, the OCRSCAEP 110a also includes an evaporator 32 that has an inlet coupled to an outlet of the expansion valve 118. The evaporator 32 also has an outlet coupled to an inlet 128a of a liquid separator 128. The liquid separator 128 in addition to the inlet 128a, has a first outlet (vapor side outlet) 128b and a second outlet 128c (liquid side outlet). The first outlet 128b of the liquid separator 128 is coupled to an inlet (not referenced) of third control device, such as a compressor or vacuum pump 119 that controls a vapor pressure in the evaporator 32. The compressor or vacuum pump 119 has an outlet (not referenced) that feeds an exhaust line 27. The second outlet of the liquid separator 128 is coupled to an inlet of a pump 100. An output of the pump 100 is coupled to the second input of the junction device 136. In the liquid separator 128 only or substantially only liquid exits the liquid separator at outlet 128c (liquid side outlet) and only or substantially only vapor exits the separator 128 at outlet 128b the (vapor side outlet). Conduits 124a-124k couple the various aforementioned items, as shown.

The OCRSCAEP 110a can be viewed as including three circuits. A first circuit 115a being the refrigerant flow path 115a that includes the receiver 112 and two downstream circuits 115b and 115c that are downstream from the liquid separator 128. Downstream circuit 115b carries liquid from the liquid separator 128 via the pump 100, which liquid is pumped back into the evaporator 32 indirectly via the junction device 136 and the downstream circuit 115c that includes the back pressure regulator 29, which exhausts vapor via the exhaust line 27. Receiver 112 is typically implemented as an insulated vessel.

The compressor/vacuum pump 119 at the vapor side outlet 128b of the liquid separator 128 generally functions to control the vapor pressure upstream of the compressor or vacuum pump 119. In OCRSCAEP 110a, compressor or vacuum pump 119 is a control device that controls the vapor pressure from the liquid separator 128 and indirectly controls evaporating pressure/temperature. Various types of pumps can be used for compressor/vacuum pump 119. The compressor or vacuum pump 119 handles vapor and regulates fluid pressure upstream from the regulator, i.e., regulates the pressure at the inlet to the regulator 29 according to a set pressure point value.

Various types of pumps can be used for pump 100. Exemplary types include gear, centrifugal, rotary vane, types. When choosing a pump, the pump should be capable to withstand the expected fluid flows, including criteria such as temperature ranges for the fluids, and materials of the pump should be compatible with the properties of the fluid. A subcooled refrigerant can be provided at the pump 100 outlet to avoid cavitation. To do that a certain liquid level in the liquid separator 128 may provide hydrostatic pressure corresponding to that sub-cooling.

The evaporator 32 can be implemented in a variety of ways as discussed above and as will be further discussed below.

In FIG. 6, the evaporator 32 is coupled to the inlet 128a of the liquid separator 128 and to an outlet of the expansion device 116. The liquid refrigerant from the refrigerant receiver 112 mixes with an amount of pumped refrigerant from the pump 100, and expands at a constant enthalpy in the expansion device 116. The expansion device 116 turns the liquid into a two-phase mixture. The two-phase mixture stream enters the evaporator 32. The evaporator 32 absorbs heat from the heat load. A liquid/vapor refrigerant flow from the evaporator enters the liquid separator 128. The liquid stream exiting the liquid separator 128 is pumped by the pump 100 back into the expansion device 118 via the junction device 136. In this configuration, the pump 100 indirectly pumps a secondary refrigerant fluid flow, e.g., a recirculation liquid refrigerant flow from the evaporator 32, via the liquid separator 128, back via the expansion device 118 into the evaporator 32.

If the junction 136 is upstream of the expansion device 118, in some cases the pump 100 may return a portion of the liquid refrigerant from the liquid separator 128, effectively back to the receiver 14 (via the junction device 136) so long as the remaining liquid column in the liquid separator remains sufficiently high to permit substantially cavitation-free operation of the pump 100.

The evaporator 32 may be configured to maintain exit vapor quality below the so called "critical vapor quality" defined as "1", as discussed above. Any vapor that may be included in the refrigerant stream will be discharged at the vapor phase outlet of the liquid separator 128. Refrigerant vapor exits from the vapor side outlet 128b of the liquid separator 128 and is exhausted by the exhaust line 97. The compressor or vacuum pump 119, regulates the pressure upstream of the evaporator 32, so as to maintain upstream refrigerant fluid pressure in the OCRSCAEP 110a.

As mentioned above, the OCRSCAEP 110a of FIG. 6, is one of several alternative system architectures that have a liquid separator 128, compressor/vacuum pump 119 and liquid pump 100 as part of the OCRSCAEP cooling system.

Figure 7A:
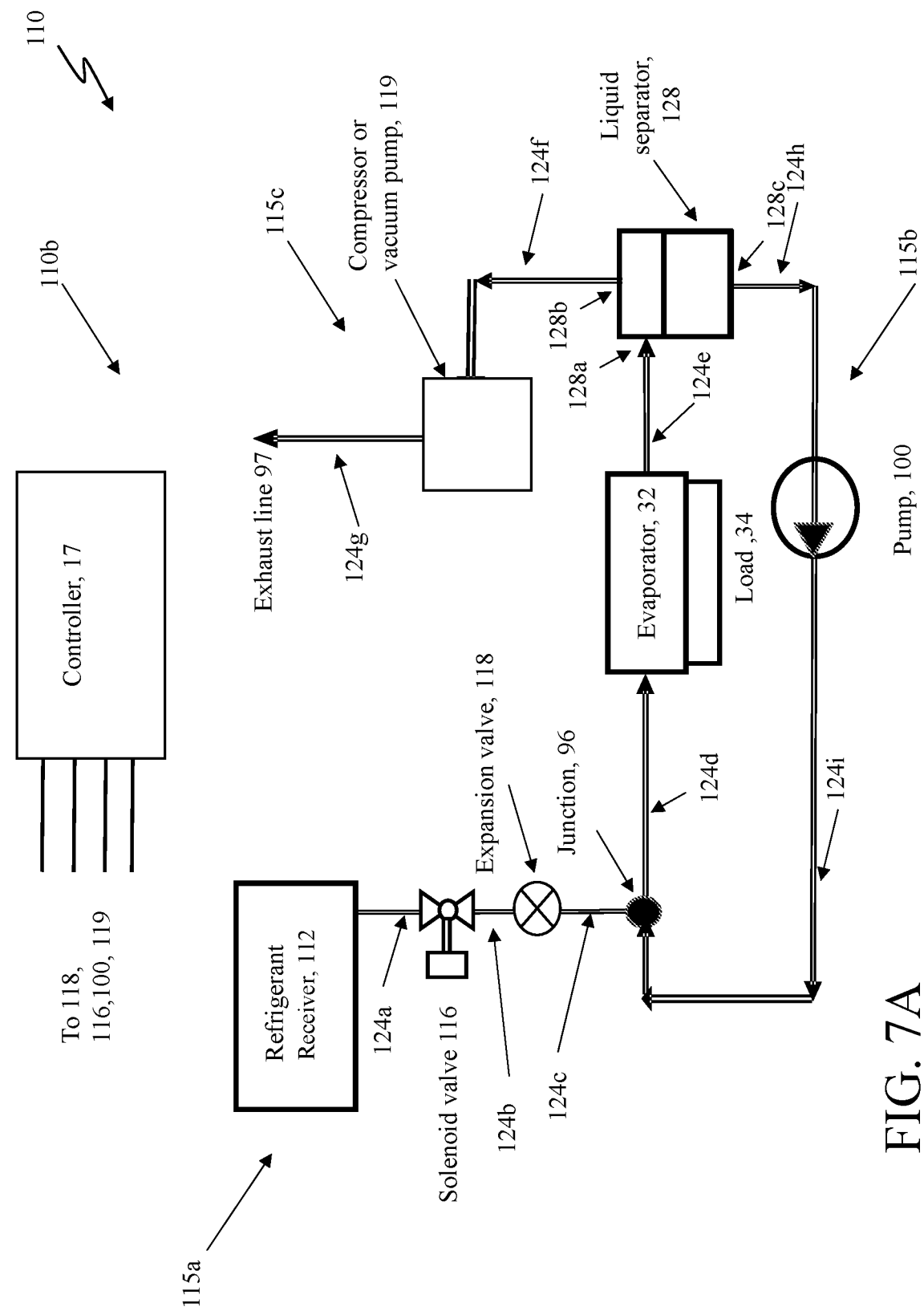
FIGS. 7A-7F are schematic diagrams of other examples of a thermal management system that includes alternative open-circuit refrigeration systems with exhaust compressor or vacuum and pump.

Referring now to FIG. 7A, an alternative open-circuit refrigeration system with pump (OCRSCAEP) 110b configuration is shown. OCRSCAEP 110b includes receiver 112, (optional solenoid control valve 116, optional expansion valve 118), evaporator 32, liquid separator 128, pump 100, and compressor/vacuum pump 119 coupled to the exhaust line 97, as discussed above. OCRSCAEP 110b also includes the junction device 136. The junction device 136 has one port as an inlet coupled to the outlet of the pump 100, and a second port as an outlet coupled to the inlet to the evaporator, but in OCRSCAEP 110b, the junction device 136 has the third port functioning as a second inlet coupled to the output of the expansion valve 118. Conduits 124a-124i couple the various aforementioned items as shown.

In OCRSCAEP 110b, the pumped liquid from the pump 100 is fed directly into the inlet to the evaporator 32 along with the primary refrigerant flow from the expansion valve 118. These liquid refrigerant steams from the refrigerant receiver and the pump are mixed downstream from the expansion valve 118.

The heat load 34 is coupled to the evaporator 32. The evaporator 32 is configured to extract heat from heat load 34 that is in contact with the evaporator 32 and to control the vapor quality at the outlet of the evaporator.

The OCRSCAEP 110b can also be viewed as including three circuits. The first circuit 115a being the refrigerant flow path and the two circuits 115b and 115c as in FIG. 1.

The OCRSCAEP 110b operates as follows. The liquid refrigerant from the receiver 112 is fed to the expansion valve 118 and expands at a constant enthalpy in the expansion valve 118 turning into a two-phase (gas/liquid) mixture. This two-phase liquid/vapor refrigerant stream and the pumped liquid refrigerant stream from the pump 100, enters the evaporator 32 that provides cooling duty, and discharges the refrigerant in a two-phase state at a relatively high exit vapor quality (fraction of vapor to liquid, as discussed above). The discharged refrigerant is fed to the inlet of the liquid separator 128, where the liquid separator 128 separates the discharge refrigerant with only or substantially only liquid exiting the liquid separator at outlet 128c (liquid side outlet) and only or substantially only vapor exiting the separator 128 at outlet 128b the (vapor side outlet). The liquid stream exiting at outlet 128c enters and is pumped by the pump 100 into the second inlet of the junction. Vapor from the vapor side of the liquid separator 128 is fed to the compressor or vacuum pump 119 to the exhaust line.

OCRSCAEP 110b provides an operational advantage over the embodiment of OCRSCAEP 110a (FIG. 6) since the pump 100 can operate across a reduced pressure differential (pressure difference between inlet and outlet of the pump 100). In the context of open-circuit refrigeration systems, the use of the pump 100 allows for some recirculation of liquid refrigerant from the liquid separator 128 to enable operation at reduced vapor quality at the evaporator 32 outlet, that also avoids discharging remaining liquid out of the system at less than the separation efficiency of the liquid separator 128 allows. That is, by allowing for some recirculation of liquid phase refrigerant, but without the need for a compressor and condenser, as in a closed cycle refrigeration system, this recirculation reduces the required amount of refrigerant needed for a given amount of cooling over a given period of operation relative to open-circuit systems without recirculation, while also potentially reducing, size, power and weight characteristics relative to closed-circuit systems.

The configuration above reduces the vapor quality at the evaporator 32 inlet and thus may improve refrigerant distribution (of the two phase mixture) in the evaporator 32.

Figure 7B:
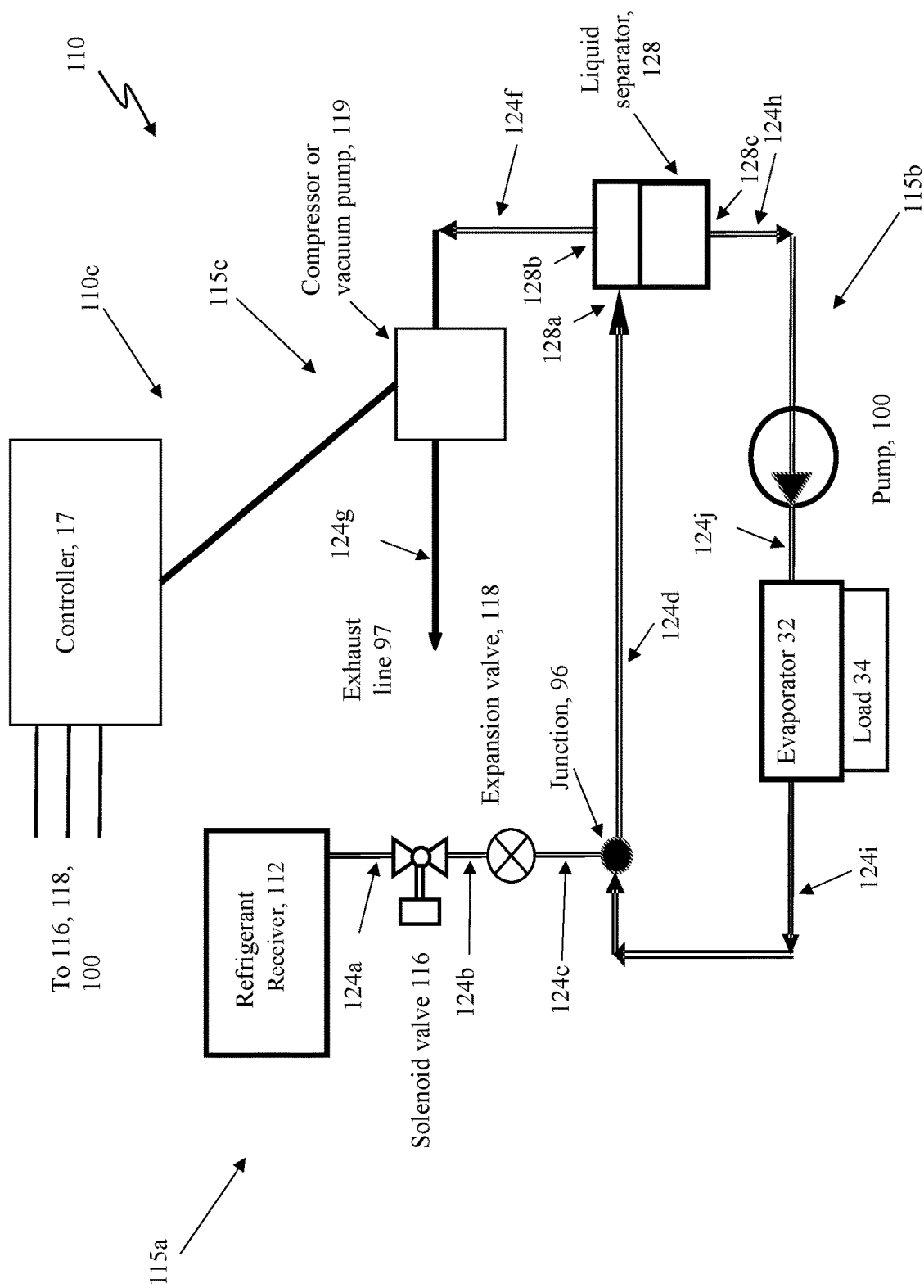

During start-up both OCRSCAEP 110*a* and OCRSCAEP 110*b* (FIGS. 6, 7A) need to charge the evaporator 32 with liquid refrigerant. However, in both OCRSCAEP 110*a* and OCRSCAEP 110*b*, by placing the evaporator 32 between the outlet of the expansion device and the inlet of the liquid separator, these configurations avoid the necessity of having liquid refrigerant first pass through the liquid separator 128 during the initial charging of the evaporator 32 with the liquid refrigerant, in contrast with the OCRSCAEP 110*c* (FIG. 7B). At the same time, liquid refrigerant that is trapped in the liquid separator 128 may be wasted after the OCRS-CAEP 110*b* shuts down.

Referring now to FIG. 7B, the system 10 includes another alternative open-circuit refrigeration system with pump (OCRSCAEP) 110*c*. OCRSCAEP 110*c* includes the receiver 112, the compressor or vacuum pump 119 and the second receiver 14 as discussed for FIG. 6. OCRSCAEP 110*c* also includes solenoid control valve 116, expansion valve, 118, liquid separator 128, pump 100, and compressor/vacuum pump 119, coupled to the exhaust line 97, as discussed above.

OCRSCAEP 110*c* also includes the junction device 136 and evaporator 32. The junction device 136 has one port as an inlet coupled to the outlet of the expansion valve 118, a second port as an outlet coupled to the inlet 128*a* of the liquid separator 128 and has a third port as a second inlet coupled to the evaporator 32. Outlets 128*b* and 128*c* of the liquid separator are coupled as discussed above. OCRS-CAEP 110*c* has the inlet to the evaporator 32 coupled to the output of the pump 100 and has the outlet coupled to the second inlet of the junction device 136. A heat load 34 is coupled to the evaporator 32. The evaporator 32 is configured to extract heat from heat load 34 that is in contact with the evaporator 32. Conduits 24*a*-24*m* couple the various aforementioned items as shown.

Vapor quality downstream from the expansion valve 118 is higher than the vapor quality downstream from the pump 100. An operating advantage of the OCRSCAEP 110*c* is that by placing the evaporator 32 downstream from the pump 100 better refrigerant distribution is provided with this component configuration since liquid refrigerant enters the evaporator 32 rather than a liquid/vapor stream.

The OCRSCAEP 110*c* can also be viewed as including three circuits, the first circuit 115*a* being the refrigerant flow path and the other two being the circuits 115*b* and 115*c*, as in FIG. 1.

Evaporators of the configurations 110*a*-110*b* (FIGS. 6 and 7A) operate below a vapor quality of 1. These architectures are not very sensitive to the pumping flow capacity and do not need a precise flow control, i.e., a constant speed pump configured to meet highest load requirements can be employed for pump 100.

The evaporator 32 of the configuration in FIG. 7B may allow a superheat. The configuration of FIG. 7B may be sensitive to the pumping flow capacity. If the evaporator of FIG. 7B is configured to strictly maintain vapor quality at the evaporator exit, vapor quality control may be provided by a variable speed pump (not shown) controlled by the controller 17 (FIG. 15) acting on a value of vapor quality that is sensed downstream from the evaporator 32. If the evaporator 32 of FIG. 7B, is configured to operate in the range extended into the superheated region and the pump 100, the superheat control may be provided by a variable speed pump and a controller acting on pressure and temperatures sensed downstream from the evaporator.

Figure 7C:
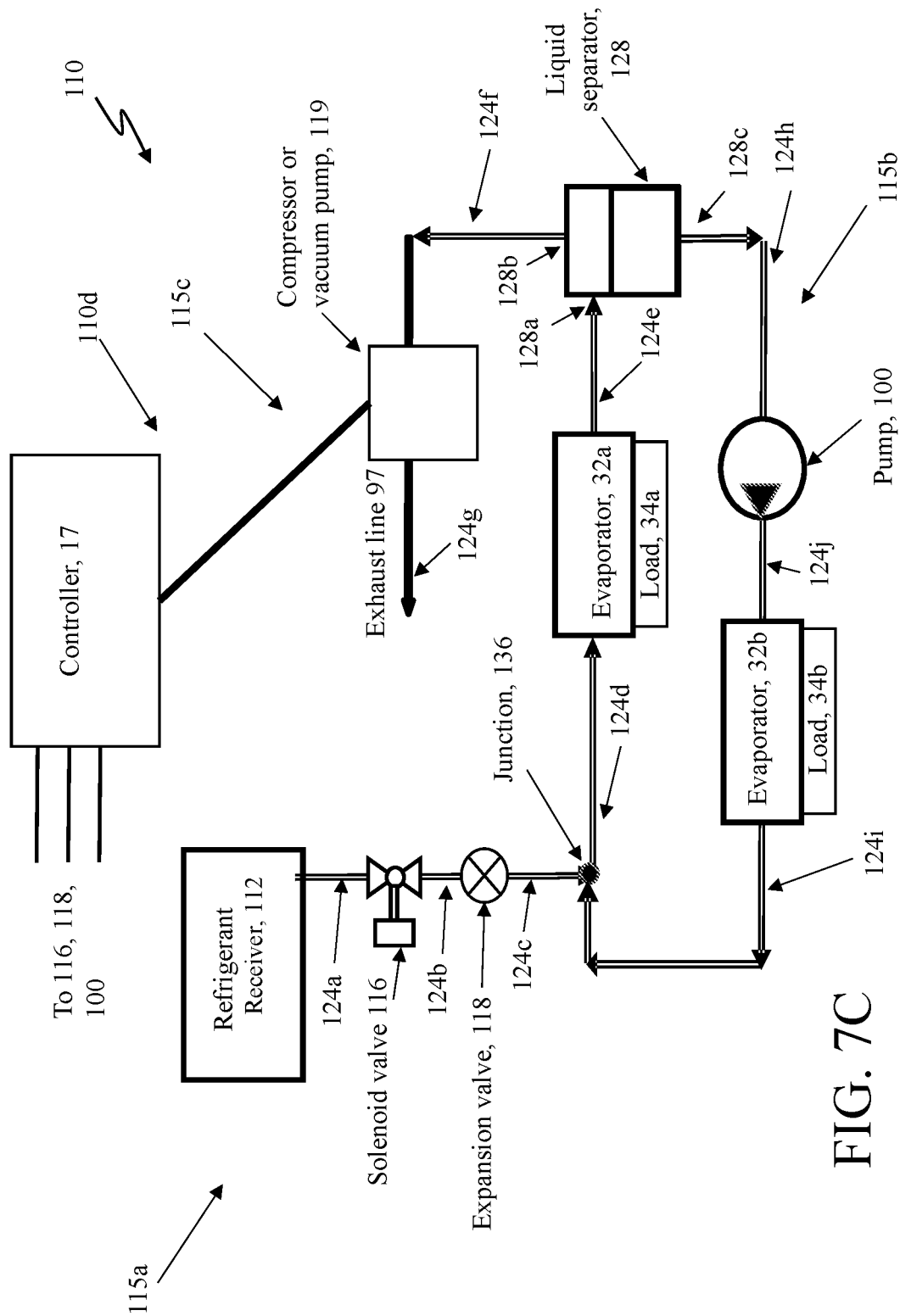

Referring now to FIG. 7C, the system 10 can include another alternative open-circuit refrigeration system with pump (OCRSCAEP) 110*d*. OCRSCAEP 110*d* includes the receiver 112, optional solenoid control valve 116, optional expansion valve 118, pump 100, liquid separator 128, and compressor or vacuum pump 119, coupled to the exhaust line 97, as discussed above. OCRSCAEP 110*d* also includes the junction device 136, a first evaporator 32*a* and a second evaporator 32*b* (or can be a single evaporator as in FIG. 5C). The junction device 136 has a first port as an inlet coupled to the outlet of the expansion valve 118. The junction device 136 has a second port as an outlet coupled to an inlet of the first evaporator 32*a*, with the first evaporator 32*a* having an outlet coupled to the inlet of the liquid separator 128, and the junction device 136 has a third port as a second inlet coupled to an outlet of the evaporator 32*b* with the evaporator 32*b* having an inlet that is coupled to the outlet of the pump 100. A heat load 34*a* is coupled to the evaporator 32*a* and a heat load 34*b* is coupled to the evaporator 32*b*. The evaporators 32*a*, 32*b* are configured to extract heat from the respective loads 34*a*, 34*b* that are in contact with the corresponding evaporators 32*a*, 32*b*. Conduits 24*a*-24*k* couple the various aforementioned items as shown.

An operating advantage of the OCRSCAEP 110*d* is that by placing evaporators 32*a*, 32*b* at both the outlet and the second inlet of the junction device 136, it is possible to combine loads which require operation in two-phase region and which allows operation with a superheat.

The OCRSCAEP 110*d* can also be viewed as including three circuits, the first circuit 115*a* being the refrigerant flow path as in FIG. 1 and two circuits 115*b''* and 115*c*. Circuit 115*b''* being upstream and downstream from the liquid separator 128, carries liquid from the liquid outlet of the liquid separator 128 and carrying vapor/liquid from the evaporator 32*a* into the inlet of the liquid separator 128. The downstream circuit 115*c* exhausts vapor via the back pressure regulator 29 to the exhaust line 27.

Figure 7D:
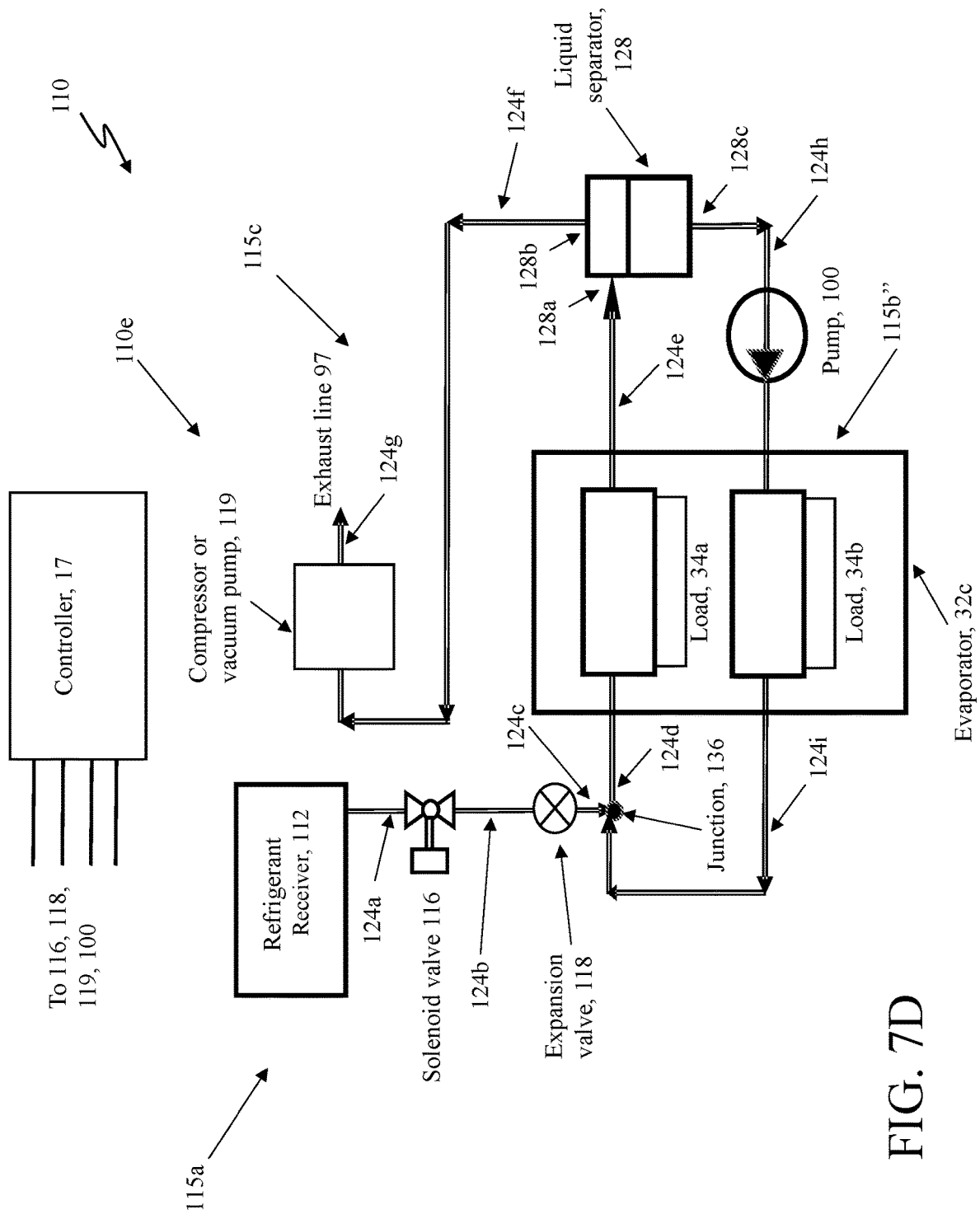

Referring now to FIG. 7D, the system 10 can include another alternative open-circuit refrigeration system with pump (OCRSCAEP) 110*e*. OCRSCAEP 110*e* includes the receiver 112, the optional expansion valve 118, and optional solenoid control valve 116, pump 100, liquid separator 128, and compressor or vacuum pump 119, coupled to the exhaust line 97, as discussed above.

The OCRSCAEP 110*e* also includes a single evaporator 32*c* that is attached downstream from and upstream of the junction device 136. A first heat load 34*a* is coupled to the evaporator 32*c*. The evaporator 32*c* is configured to extract heat from the first load 34*a* that is in contact with the evaporator 32*c*. A second heat load 34*b* is also coupled to the evaporator 32*c*. The evaporator 32*c* is configured to extract heat from the second load 34*a* that is in contact with the evaporator 32*c*. The evaporator 32*c* has a first inlet that is coupled to the outlet 136*c* of the junction device 136 and a first outlet that is coupled to the inlet 128*a* of the liquid separator 128. The evaporator 32*c* has a second inlet that is coupled to the outlet of the pump 100 and has a second outlet that is coupled to the inlet 136*b* of the junction device 136. The second outlet 128*b* (liquid side outlet) of the liquid separator 128 is coupled via the compressor or vacuum pump 119 to the exhaust line 97. Conduits 124a-124i couple the various aforementioned items, as shown.

In this embodiment, the single evaporator 32c is attached downstream from and upstream of the junction 136 and requires a single evaporator in comparison with the configuration of FIG. 7C having the two evaporators 32a, 32b. The OCRSCAEP 110e can also be viewed as including the three circuits 115a, 115b'' and 115c as described in FIG. 4.

Figure 7E:
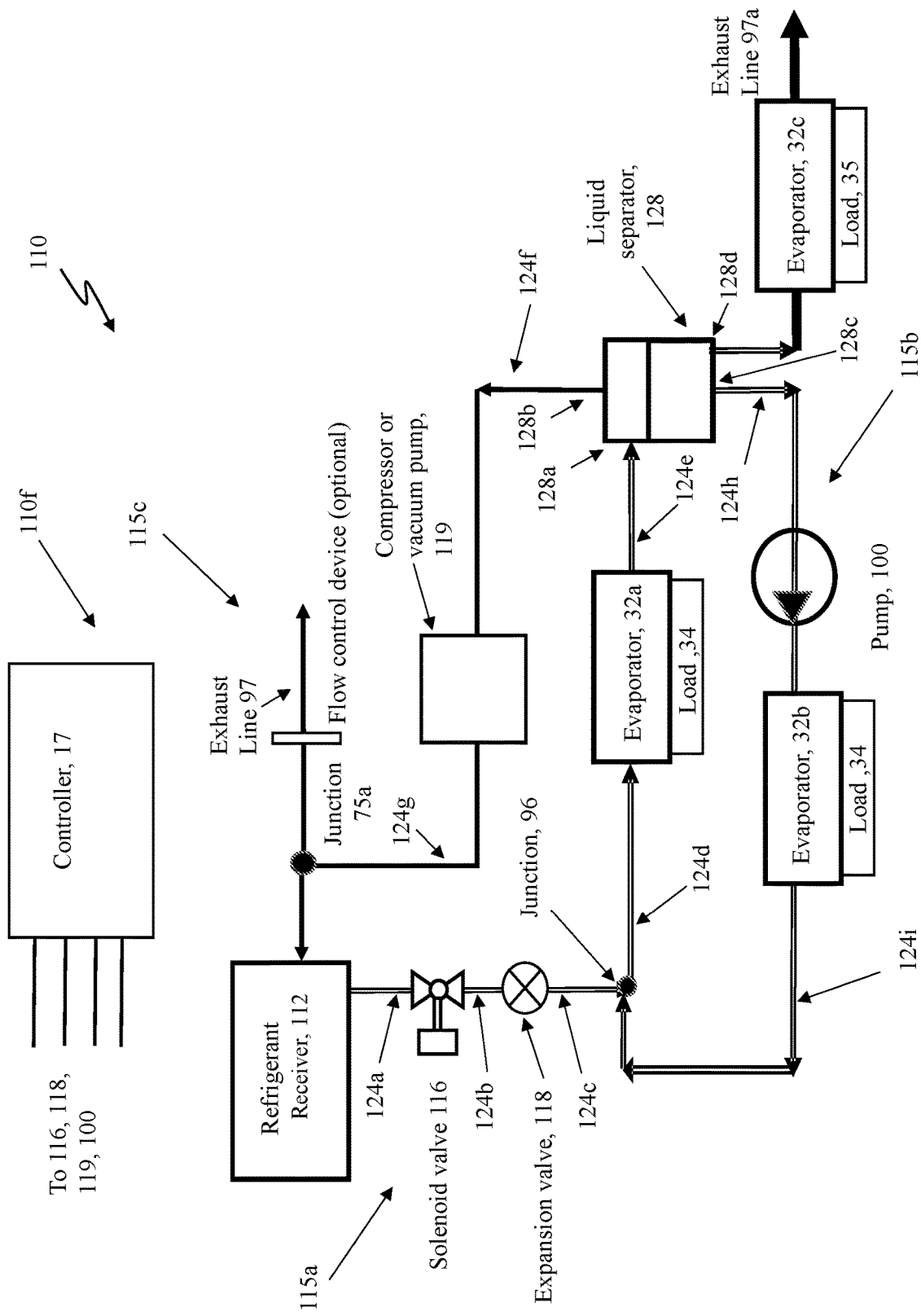

Referring now to FIG. 7E, the system 10 includes an alternative open-circuit refrigeration system with pump (OCRSCAEP) 110f. OCRSCAEP 110f includes the receiver 112, optional expansion valve 118, optional solenoid control valve 116, pump 100, liquid separator 128, and compressor or vacuum pump 119 coupled to the exhaust line 97. However, rather than the outlet of the compressor being coupled to the exhaust line 97 to exhaust refrigerant vapor, as discussed above, the outlet of the compressor is coupled via (optional) junction 75a to an inlet to the refrigerant receiver 112 and to an optional flow control device, such that discharge from the compressor/vacuum pump 119 feeds the receiver 112 (in this instance the receiver containing a refrigerant that is under pressure, e.g., ammonia) and can be optionally exhausted. In this embodiment there need not be any exhaust (from the compressor circuit, e.g., compressor and liquid separator vapor side) that may obviate a need for a nitrogen (gas) receiver (discussed below). The compressor or vacuum pump 119 is configured to maintain high pressure in the gas refrigerant (ammonia) receiver 112. The (OCRSCAEP) 110f will be configured to maintain vapor quality at the evaporator exit and amount of liquid in the liquid separator sufficient to operate the second evaporator. The OCRSCAEP 110f also includes the evaporators 32a, 32b (or can be a single evaporator as in FIG. 7D).

In this embodiment, the OCRSCAEP 110f also has the liquid separator 128 configured to have a second outlet 128d (such a function could be provided with another junction device). The second outlet 128d diverts a portion of the liquid exiting the liquid separator 128 into a third evaporator 32c that is in thermal contact with a heat load 35 and which extracts heat from the heat load 35 and exhausts vapor from a second vapor exhaust line 97a.

An operating advantage of the OCRSCAEP 110f is that by placing evaporators 32a, 32b at both the outlet and the second inlet of the junction device 136, it is possible to run the evaporators 32a, 32b with changing refrigerant rates through the junction device 136 to change at different temperatures or change recirculating rates. By using the evaporators 32a, 32b, the configuration reduces vapor quality at the outlet of the evaporator 32b and thus increases circulation rate, as the pump 100 would be 'pumping' less vapor and more liquid. That is, with OCRSCAEP 110d the evaporator 32b is downstream from the pump 100 and better refrigerant distribution could be provided with this component configuration since liquid refrigerant enters the evaporator 32b rather than a liquid/vapor stream as could be for the evaporator 32a.

In addition, some heat loads that may be cooled by an evaporator in the superheated phase region, at the same time do not need to actively control superheat. The open-circuit refrigeration system 110f employs the additional evaporator circuit 33, with an evaporator cooling heat loads in two-phase and superheated regions. The exhaust lines may or may not be combined. The third evaporator 33 can be fed a portion of the liquid refrigerant and operate in superheated region without the need for active superheat control.

The OCRSCAEP 110f can also be viewed as including the three circuits 115a, 115b'' as described above, a third circuit 115c' (modified "exhaust" having the feedback to the receiver 112) and a fourth circuit 15d being the evaporator 33 and exhaust line 27a. Controller 17 can be included to control operation of, e.g., devices 116, 118, 100, and 119, for instance.

Figure 7F:
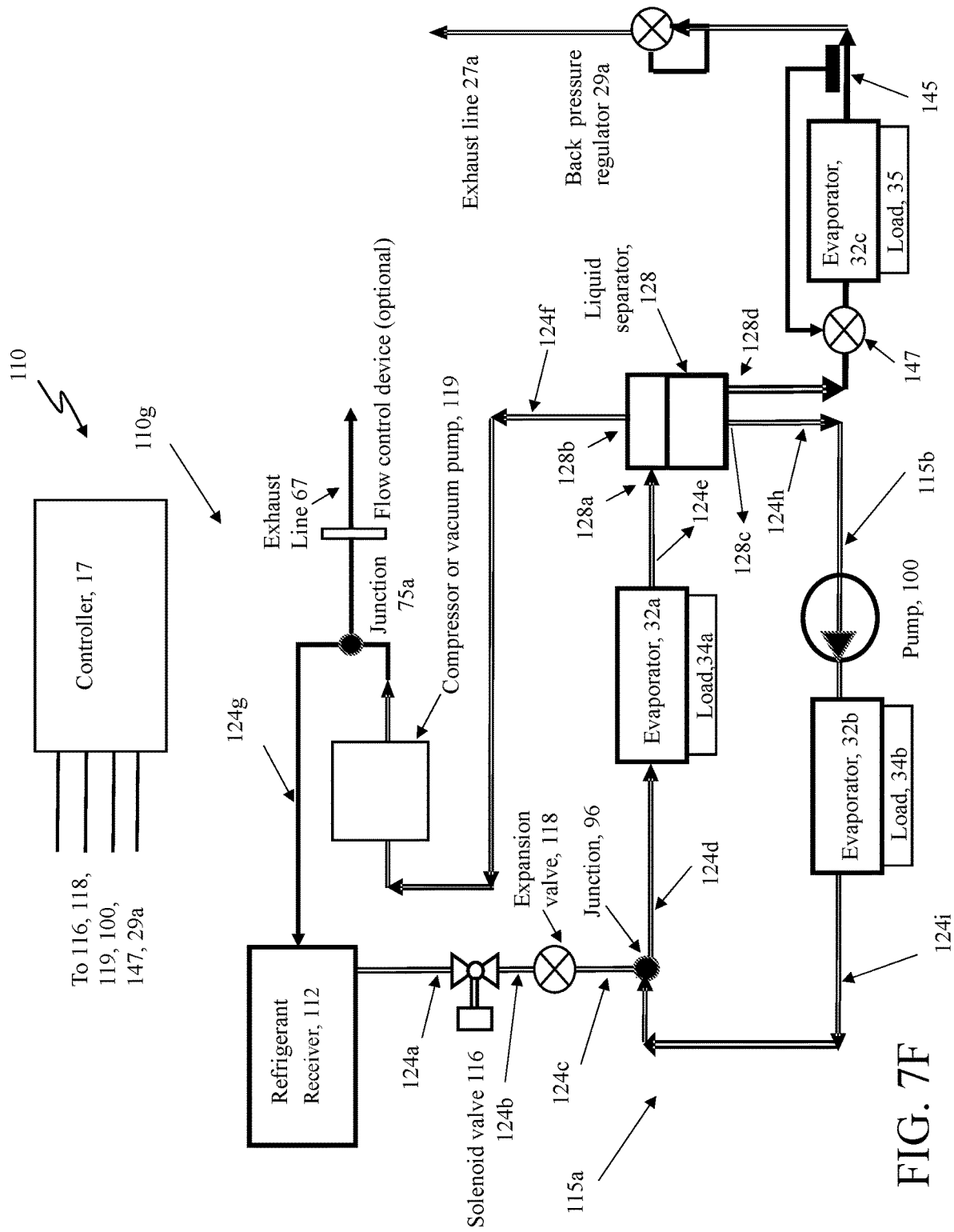

Referring now to FIG. 7F, the system 10 includes an alternative open-circuit refrigeration system with pump (OCRSCAEP) 110g. OCRSCAEP 110g includes the refrigerant receiver 112, optional expansion valve 118 and solenoid control valve 116, the pump 100, the liquid separator 128, and the compressor/vacuum pump 119 coupled to the exhaust line 97. As with FIG. 7E, However, rather than the outlet of the compressor being coupled to the exhaust line 97 to exhaust refrigerant vapor, as discussed above, the outlet of the compressor is coupled via (optional) junction 75a to an inlet to the refrigerant receiver 112 and to an optional flow control device, such that discharge from the compressor/vacuum pump 119 feeds the receiver 112 (in this instance the receiver containing a refrigerant that is under pressure, e.g., ammonia) and can be optionally exhausted However, rather than the outlet of the compressor being coupled to the exhaust line 97 to exhaust refrigerant vapor, as discussed above, the outlet of the compressor is coupled via (optional) junction 75a to an inlet to the refrigerant receiver 112 and to an optional flow control device, such that discharge from the compressor/vacuum pump 119 feeds the receiver 112 (in this instance the receiver containing a refrigerant that is under pressure, e.g., ammonia) and can be optionally exhausted. In this embodiment there need not be any exhaust (from the compressor circuit, e.g., compressor and liquid separator vapor side 128b) and thus may obviate or reduce the need for a nitrogen (gas) receiver (discussed below). The OCRSCAEP 110g also includes the evaporators 32a, 32b (or can be a single evaporator as in FIG. 7D). The compressor 119 is configured to maintain high pressure in the gas refrigerant (ammonia) receiver 112. The (OCRSCAEP) 110g can be configured to maintain vapor quality at the evaporator exit and amount of liquid in the liquid separator 128 sufficient to operate the second evaporator 32b.

In this embodiment, the OCRSCAEP 110g also has the liquid separator 128 configured to have the second outlet 128d (such a function could be provided with another junction device). The second outlet 128d diverts a portion of the liquid exiting the liquid separator 128 into the third evaporator 32c that is in thermal contact with the heat load 35, and which extracts heat from the heat load 35, and exhausts vapor from a second vapor exhaust line 97a.

OCRSCAEP 110g also includes a second expansion device 147 having an inlet coupled to the second outlet of the liquid separator 128 and having an outlet coupled to the inlet to the third evaporator 32c. OCRSCAEP 110g also includes a sensor device 145. The expansion valve 147 has a control port that is fed from the sensor 145 or controller 17, which control the expansion valve 147 and provide a mechanism to measure and control superheat. The sensor 145 is disposed approximate to the outlet of the evaporator 32c and provides a measurement of superheat, and indirectly, vapor quality. For example, sensor 145 is a combination of temperature and pressure sensors that measure the refrigerant fluid superheat downstream from the heat load, and transmits the measurements to the controller 17. The controller 17 produces control signals to adjust the expansion valve device 147 based on the measured superheat relative to a superheat set point value in response to signal(s) from the sensor 145. By doing so, controller indirectly adjusts the vapor quality of the refrigerant fluid emerging from evaporator 33. Conduits 24a-24m couple the various aforementioned items, as shown. The evaporators 32a, 32b operate in two phase (liquid/gas) and the third evaporator 32c operates in superheated region with controlled superheat.

The OCRSCAEP 110g can also be viewed as including the three circuits 115 and 115b" and as described in FIG. 4, the third circuit 115c' (modified "exhaust" having the feedback to the receiver 112) and a fourth circuit 15d being the evaporator 33 and exhaust line 27a. Controller 17 can be included to control operation of, e.g., devices 116, 118, 100, 29a, 119 and 147, for instance.

VI. Thermal Management Systems with Open-circuit Refrigeration Systems with Compressor Exhaust and Pump Boost Assist with Gas induced compression of Refrigerant The system 10 can use a different family of open-circuit refrigeration systems. For example, each of the Open-circuit Refrigeration Systems with Compressor Exhaust (OCRSCE) configurations 10a-10g or the Open-circuit Refrigeration Systems with Compressor Exhaust and Ejector Boost Assist (OCRSCAEE) configurations 50a-50g or the Open-circuit Refrigeration Systems with Compressor Exhaust and Pump Boost Assist (OCRSCAEP) configurations 110a-110g can be further configured with a second receiver 14.

Figure 8:
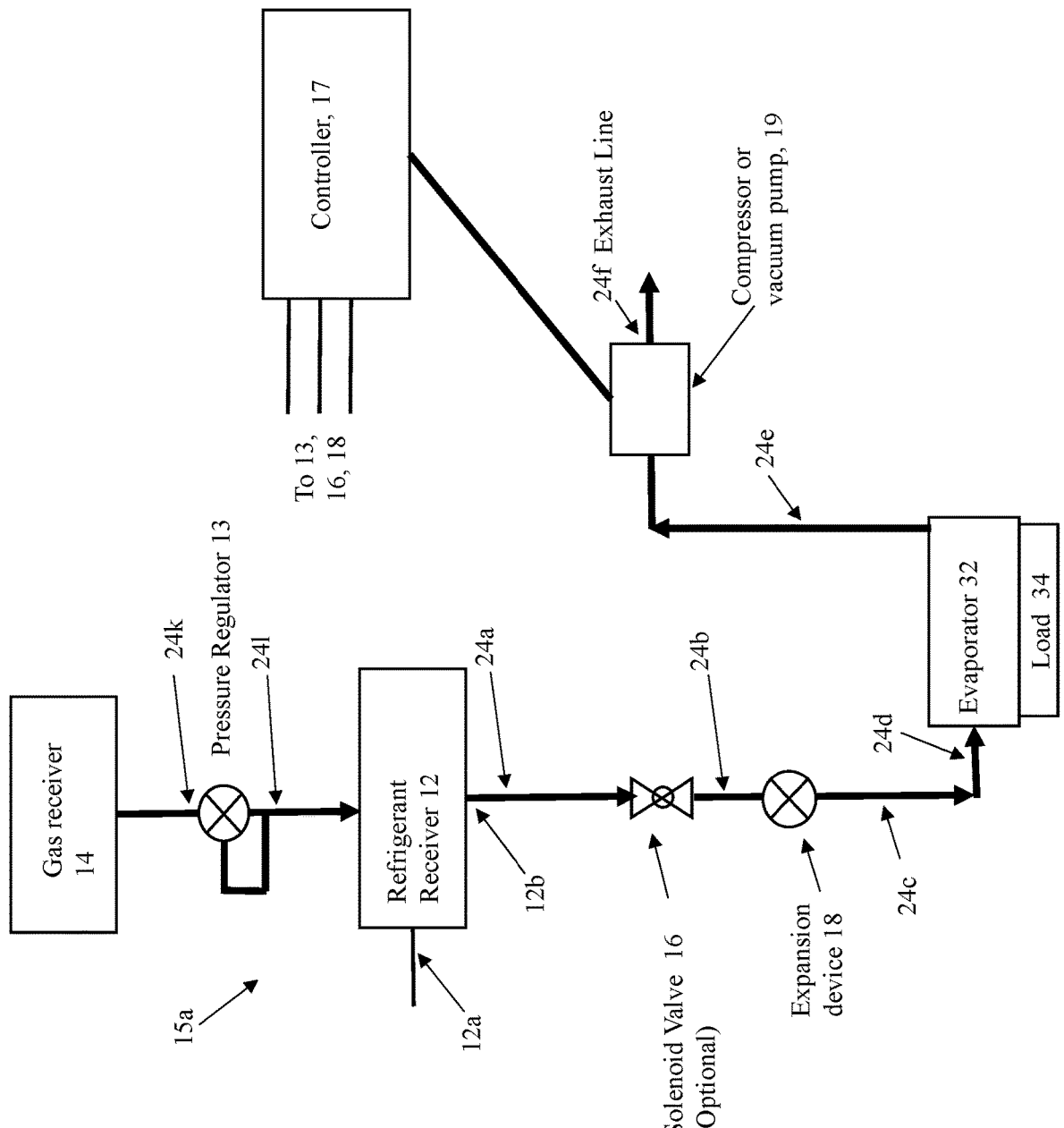
FIGS. 8, 8A are schematic diagram of another example of a thermal management system that includes alternative open-circuit refrigeration systems that have gas compression for receiver vapor pressure control.

Referring now to FIG. 8, using OCRSCE 10a (FIG. 1) as exemplary, an OCRSCE 10a' is shown with the features of OCRSCE 10a (FIG. 1) and with a second receiver 14 that stores a gas, and which is coupled, via conduit 24k to a control device 13 configurable to control a flow of gas from the second receiver 14, via conduit 24l to the first receiver 12 regulate pressure in and control refrigerant flow from the first receiver 12. This embodiment uses the compressor 19 (as in FIGS. 1, 2A-2F) that can maintain a required level of refrigerant pressure in the receiver 12, however, use of the compressor 19 does not preclude using the receiver 14 for also maintaining a required level of refrigerant pressure in the receiver 12.

The control device 13 can be a pressure regulator that regulates a pressure at an outlet of the pressure regulator 13. Pressure regulator 13 generally functions to control the gas pressure from gas receiver 14 that is upstream of the refrigerant receiver 12. Transporting a gas from the gas receiver 14 into the refrigerant receiver 12 through pressure regulator 13, either prior to or during transporting of the refrigerant fluid from the refrigerant receiver 12, functions to control the pressure in the refrigerant receiver 12 and the refrigerant fluid pressure upstream from the evaporator 32 (FIG. 1) especially when the optional valves 16 and 18 are not used.

Pressure regulator 13 would be used at the outlet of the receiver 14 to regulate the pressure in the refrigerant receiver 12. For example, the pressure regulator 13 could start in a closed position, and as refrigerant pressure in the receiver 12 drops the pressure regulator 13 can be controlled to start opening to allow gas from the receiver 14 to flow into the receiver 14 to substantially maintain a desired pressure in the receiver 12 and thus provide a certain sub-cooling of the refrigerant in the receiver 12, and a certain refrigerant mass flow rate through the expansion device 16, and evaporator 32, and, as a result, a desired cooling capacity for one or more heat loads 34.

In general, pressure regulator 13 can be implemented using a variety of different mechanical and electronic devices. Typically, for example, pressure regulator 13 can be implemented as a flow regulation device that will match an output pressure to a desired output pressure setting value. In general, a wide range of different mechanical and electrical/electronic devices can be used as pressure regulator 13. Typically, a mechanical pressure regulator includes a restricting element, a loading element, and a measuring element. The restricting element is a valve that can provide a variable restriction to the flow. The loading element, e.g., a weight, a spring, a piston actuator, etc., applies a needed force to the restricting element. The measuring element functions to determine when the inlet flow is equal to the outlet flow.

Considerations when the receiver 12 stores a refrigerant such as ammonia are discussed below.

Figure 8A:
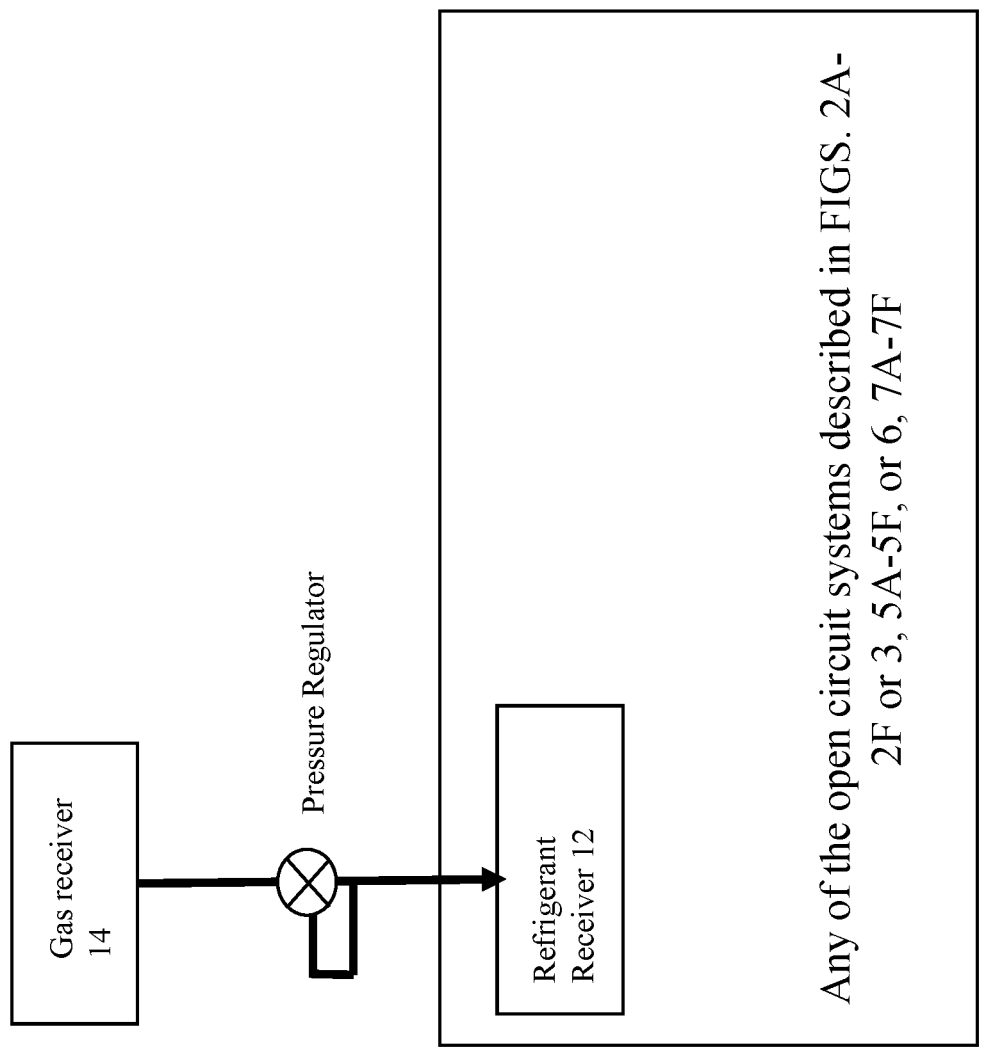

Referring now to FIG. 8A, while the second receiver 14 that stores the gas to regulate pressure in the first receiver 12 was described for the embodiment of FIG. 1, each of the embodiments described in FIGS. 2-3, 5A-7D) can use the gas receiver 14 to maintain pressure in the refrigerant receiver 12 (FIGS. 2A-2F) or 52 (FIGS. 3, 5A-5D) or 112 (FIGS. 6, 7A-7E). The embodiments discussed in FIGS. 5E-5F and 7E-7F generally would not need the second receiver 14, as the exhaust from the compressor or vacuum pump (59 or 119) is used to maintain vapor pressure in the respective receivers 52, 112.

For each of the configurations, the refrigerant flow is controlled either solely by the compressor/vacuum pump 29, 59 or 119 or the combination of the expansion device 18, 58, 118, and the compressor/vacuum pump 29, 59 or 119 or those components in combination with the other optional components. The control strategies of those controls depends on requirements of the application, e.g., ranges of mass flow rates, cooling requirements, receiver capacity, ambient temperatures, heat load, etc.

When ambient temperature is very low and, as a result, pressure in the receiver 12 is low and possibly insufficient to drive refrigerant fluid flow through any of the open-circuit refrigeration systems discussed above, the gas from the gas receiver 14 is used to compress the liquid refrigerant in the receiver 12. The gas pressure supplied by the gas receiver 14 compresses liquid refrigerant in the receiver 12 and maintains the liquid refrigerant in a sub-cooled state even at high ambient and liquid refrigerant temperatures.

Figure 9:
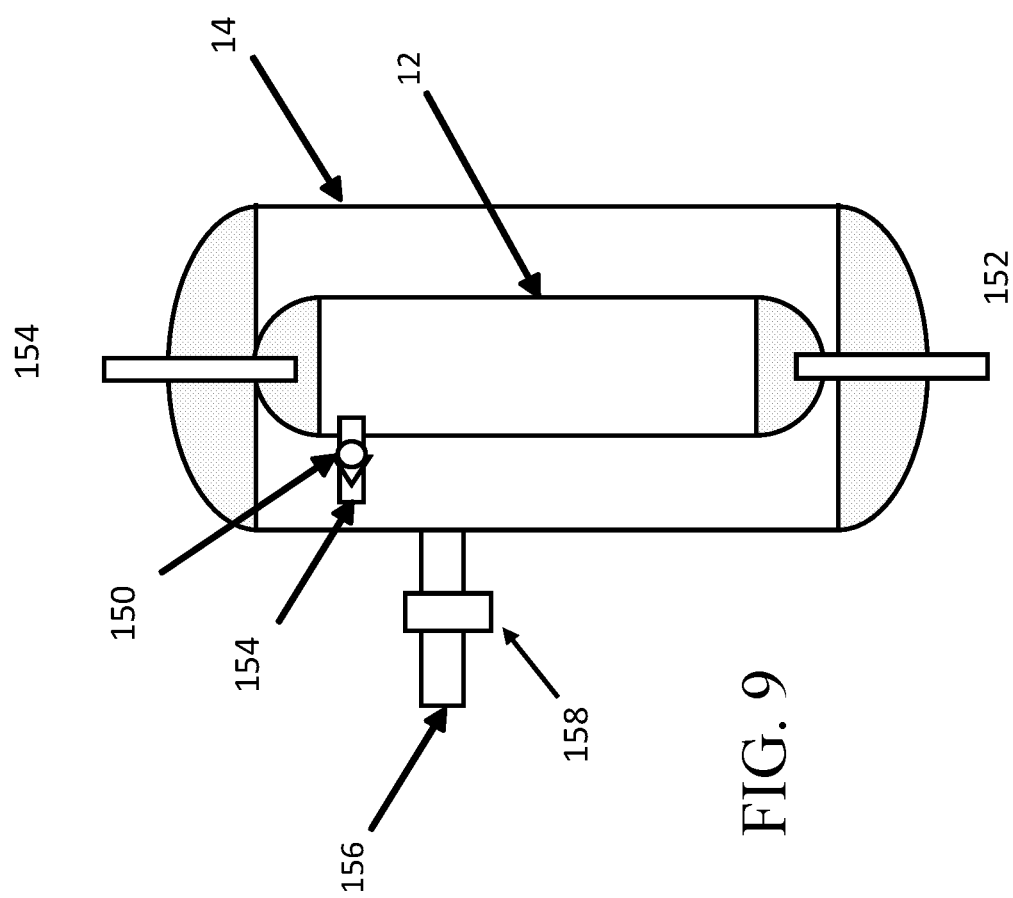
FIG. 9 is a schematic diagram of an example of a receiver for refrigerant fluid in a thermal management system.

Referring to FIG. 9, in some embodiments, refrigerant receiver 12 is positioned inside gas receiver 14, as shown. An example of a gas receiver 14 with an internal refrigerant receiver 12 has an exit port 160 that allows gas to exit gas receiver into the refrigerant receiver 12. and a check valve 150 positioned at the inlet of refrigerant receiver 12 ensure that gas flows into the refrigerant receiver 12 but refrigerant does not flow backward into gas receiver 14 from refrigerant receiver 12. Refrigerant fluid leaves refrigerant receiver 12 through outlet 152. Refrigerant receiver 12 is charged with refrigerant fluid through inlet 154, while gas receiver 14 is charged with gas through charging port 156. An optional pressure sensor 158 can be positioned in charging port 156.

In certain embodiments, a combined refrigerant and gas receiver (i.e., a single receiver, not shown) is charged with both refrigerant fluid and gas. Because the refrigerant fluid is entirely in a liquid phase, the refrigerant fluid rests on the bottom of the refrigerant receiver 12, while the gas occupies the portion of the internal volume above the liquid refrigerant fluid. During operation, the refrigerant fluid leaves through an outlet at the bottom of receiver, while the gas remains in receiver. In some embodiments the receiver is configured in such a way and initial gas charge is such that the gas pressure in the receiver will be always high enough to maintain the remaining refrigerant at the bottom in sub-cooled state. Otherwise, which is also an option, liquid refrigerant will evaporate; the gas will mix with evaporated vapor. The total pressure above the liquid phase will be equal to the sum of partial nitrogen pressure and partial vapor refrigerant pressure.

A variety of different gases can be introduced into gas receiver 14 to maintain the pressure in refrigerant receiver 12. In general, gases that are used are inert (or relatively inert) with respect to the refrigerant fluid. As an example, when a refrigerant fluid such as ammonia is used, suitable gases that can be introduced into gas receiver 14 include, but are not limited to, one or more of nitrogen, argon, xenon, and helium.

It should be appreciated that while any of the open-circuit systems discussed herein are shown with a single gas receiver 14 and single refrigerant receiver 12 more generally such systems can include any number of gas receivers and refrigerant receivers (and associated components, e.g., control devices, check valves, ports, and sensors) discussed above.

Refrigerants and Considerations for Choosing Configurations

As discussed above any two-phase refrigerant (liquid/gas phases) can be used. Of particular interest are water and ammonia.

Water's latent heat is significantly higher than the latent heat of ammonia. Therefore, water as the refrigerant provides an open-circuit refrigeration system (generally OCRS) having a significantly lower mass flow rate demand than, e.g., ammonia and thus the OCRS would require less water to complete a given task than that of ammonia. The density of water density is significantly higher than the density of liquid ammonia, and thus the receiver 12 could be configured to either occupy a much smaller volume or store significantly more refrigerant than a receiver storing ammonia, for a given task.

When any of the open-circuit refrigeration configurations use water as the refrigerant it is more likely that the use of the second (gas receiver 14) would not be necessary for most applications. When the receiver 12 uses water, the receiver 12 may be charged with the water at atmospheric pressure. During operation, the water is enthalpically expanded into a vacuum pressure corresponding to a desired evaporating temperature (e.g., 20° C.), cools the load, evaporates, and vapor is discharged by the vacuum pump or compressor 19 into ambient environment. If water applied to cool evaporating temperatures at 100° C. and higher the OCRS operating pressures are above atmospheric pressures.

Ammonia on the other hand under standard conditions of pressure and temperature is in a liquid or two-phase state. Thus, the receiver 12 typically will store ammonia at a saturated pressure corresponding to the surrounding temperature. Nitrogen (or other gases) under standard conditions of pressure and temperature is stored in a gaseous state. The gas receiver 14 serves to help elevate pressure in the ammonia receiver above saturation pressure and to maintain ammonia in a subcooled liquid state. The pressure in the receiver 12 storing ammonia will change during operation when there is no gas receiver 14 controlling the pressure, which complicates the control function of the expansion control device (expansion valve) 18 that will thus receive the refrigerant flow at a reducing pressure. The use of the gas receiver 14 can stabilize pressure in the receiver 12 during operation, by adjusting the expansion control device 18 (e.g., automatically or by controller 17) based on a measurement of the evaporation pressure (pe) of the refrigerant fluid and/or a measurement of the evaporation temperature of the refrigerant fluid. With expansion control device 18 adjusted in this manner, the compressor or vacuum pump 119 can be adjusted (e.g., automatically or by controller 17) based on measurements of one or more of the following system parameter values: the pressure drop across expansion control device 18, the pressure drop across evaporator 32, the refrigerant fluid pressure in receiver 12, the vapor quality of the refrigerant fluid emerging from evaporator 32 (or at another location in the system), the superheat value of the refrigerant fluid, and the temperature of heat load 34.

In certain embodiments, expansion control device 18 is adjusted (e.g., automatically or by controller 17) based on a measurement of the temperature of heat load 34. With expansion control device 18 adjusted in this manner, compressor vacuum pump 19 can be adjusted (e.g., automatically or by controller 17) based on measurements of one or more of the following system parameter values: the pressure drop across expansion control device 18, the pressure drop across evaporator 32, the refrigerant fluid pressure in receiver 12, the vapor quality of the refrigerant fluid emerging from evaporator 32 (or at another location in the system), the superheat value of the refrigerant fluid, and the evaporation pressure (pe) and/or evaporation temperature of the refrigerant fluid.

In some embodiments, controller 17 controls the compressor/vacuum pump 19 based on a measurement of the evaporation pressure pc of the refrigerant fluid downstream from expansion control device 18 (e.g., measured by sensor) and/or a measurement of the evaporation temperature of the refrigerant fluid (e.g., measured by sensor). With compressor vacuum/pump 19 adjusted based on this measurement, controller 17 can adjust expansion control device 18 based on measurements of one or more of the following system parameter values: the pressure drop $(p_r-p_e)$ across expansion control device 18, the pressure drop across evaporator 32, the refrigerant fluid pressure in receiver 12 $(p_r)$, the vapor quality of the refrigerant fluid emerging from evaporator 32 (or at another location in the system), the superheat value of the refrigerant fluid in the system, and the temperature of heat load 34.

In certain embodiments, controller 17 adjusts compressor/vacuum pump 19 based on a measurement of the temperature of heat load 34 (e.g., measured by a sensor). Controller 17 can also adjust expansion control device 18 based on measurements of one or more of the following system parameter values: the pressure drop $(p_r-p_e)$ across first control device 18, the pressure drop across evaporator 32, the refrigerant fluid pressure in receiver 12 $(p_r)$, the vapor quality of the refrigerant fluid emerging from evaporator 32 (or at another location in the system), the superheat value of the refrigerant fluid in the system, the evaporation pressure $(p_e)$ of the refrigerant fluid, and the evaporation temperature of the refrigerant fluid.

To adjust either control device 13 or compressor/vacuum pump 19 based on a particular value of a measured system parameter value, controller 17 compares the measured value to a set point value (or threshold value) for the system parameter, as will be discussed below.

A variety of different refrigerant fluids can be used in any of the OCRSCAEP configurations. For open-circuit refrigeration systems in general, emissions regulations and operating environments may limit the types of refrigerant fluids that can be used. For example, in certain embodiments, the refrigerant fluid can be ammonia having very large latent heat; after passing through the cooling circuit, vaporized ammonia that is captured at the vapor port of the liquid separator can be disposed of by incineration, by chemical treatment (i.e., neutralization), and/or by direct venting to the atmosphere. Any liquid captured in the liquid separator is recycled back into the OCRSCAEP (either directly or indirectly).

Since liquid refrigerant temperature is sensitive to ambient temperature, the density of liquid refrigerant changes even though the pressure in the receiver 12 remains the same. Also, the liquid refrigerant temperature impacts the vapor quality at the evaporator inlet. Therefore, the refrigerant mass and volume flow rates change and the control devices 13 and 18 can be used.

Figure 10:
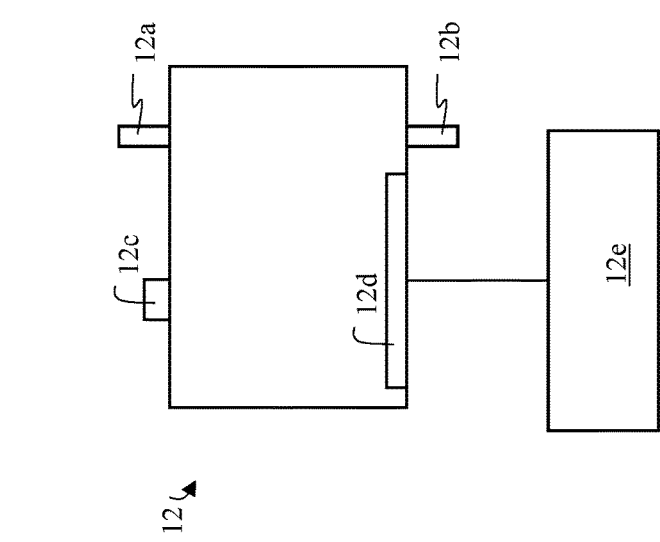
FIG. 10 is a schematic diagram of an example of a receiver for refrigerant fluid in the thermal management system.

FIG. 10 shows a schematic diagram of an example of receiver 12 (or receiver 14). Receiver 12 includes an inlet port 12a, an outlet port 12b, a pressure relief valve 12c, and a heater 12d. To charge receiver 12, refrigerant fluid is typically introduced into receiver 12 via inlet port 12a, and this can be done, for example, at service locations. Operating in the field the refrigerant exits receiver 12 through outlet port 12b that is connected to conduit 24a (FIG. 1). In case of emergency, if the fluid pressure within receiver 12 exceeds a pressure limit value, pressure relief valve 12c opens to allow a portion of the refrigerant fluid to escape through valve 12c to reduce the fluid pressure within receiver 12. For receiver 14 gas would be introduced.

When ambient temperature is very low and, as a result, pressure in the receiver 12 is low and insufficient to drive refrigerant fluid flow through the system, the gas from the gas receiver 14 is used to compress liquid refrigerant in the receiver 12. The gas pressure supplied by the gas receiver 114 compresses the liquid refrigerant in the receiver 12 and maintains the liquid refrigerant in a sub-cooled state even at high ambient and liquid refrigerant temperatures.

Figure 13:
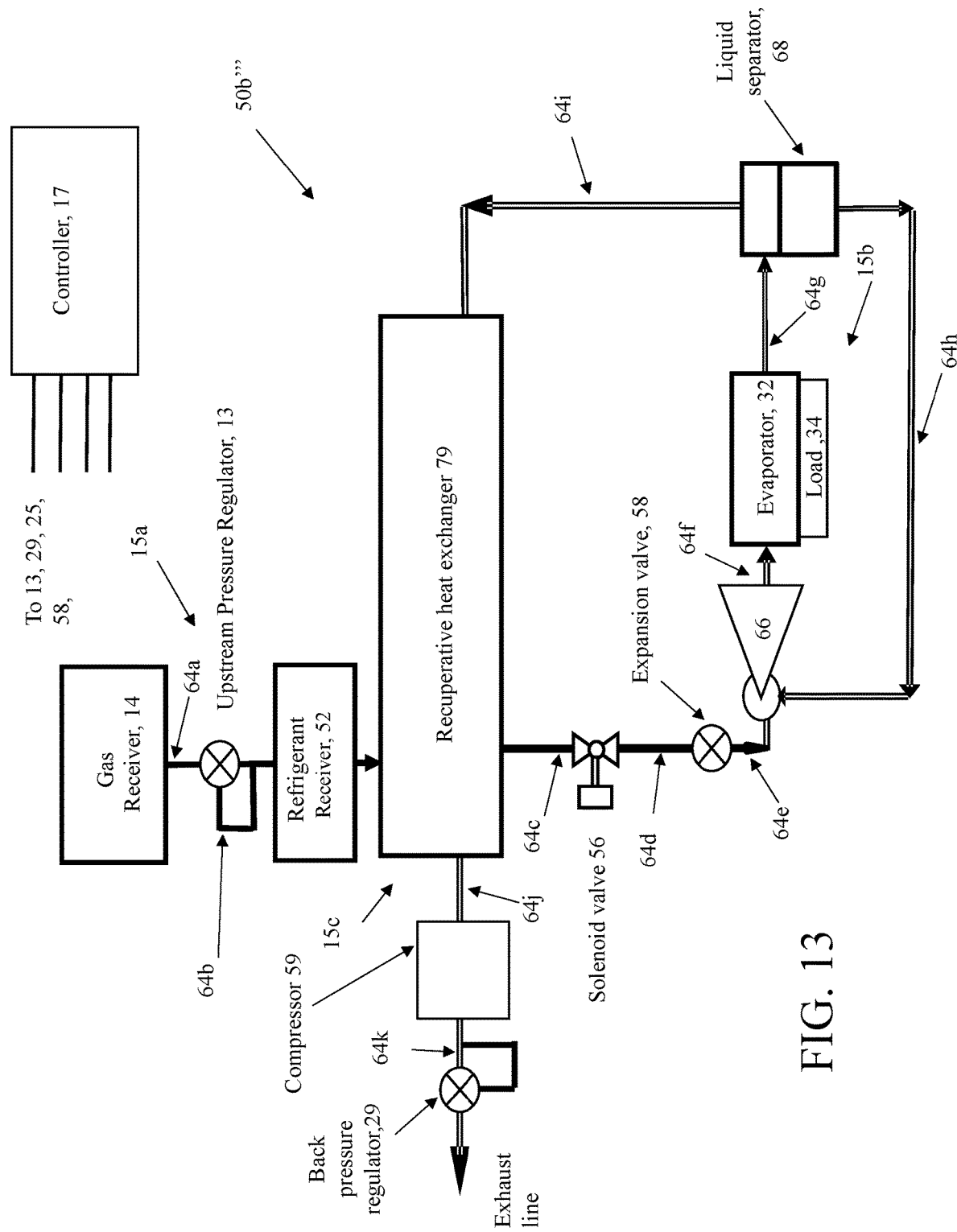
FIG. 13 is a schematic diagram of another example of a thermal management system that includes an alternative open-circuit refrigeration system with an exhaust compressor or vacuum pump, ejector and a recuperative heat exchanger.

A heater 12d can be used in those embodiments that do not include the gas receiver 14 to control vapor pressure of the liquid refrigerant in the receiver 12. The heater 12 is connected via a control line to a controller (FIG. 13). Heater 12d, which can be implemented as a resistive heating element (e.g., a strip heater) or any of a wide variety of different types of heating elements, can be activated by controller to heat the refrigerant fluid within receiver 12. Receiver 12 can also include insulation (not shown in FIG. 2) applied around the receiver to reduce thermal losses.

In general, receiver 12 can have a variety of different shapes. In some embodiments, for example, the receiver is cylindrical. Examples of other possible shapes include, but are not limited to, rectangular prismatic, cubic, and conical. In certain embodiments, receiver 12 can be oriented such that outlet port 12b is positioned at the bottom of the receiver. In this manner, the liquid portion of the refrigerant fluid within receiver 12 is discharged first through outlet port 12b, prior to discharge of refrigerant vapor. In certain embodiments, the refrigerant fluid can be an ammonia-based mixture that includes ammonia and one or more other substances. For example, mixtures can include one or more additives that facilitate ammonia absorption or ammonia burning.

More generally, any fluid can be used as a refrigerant in the open-circuit refrigeration systems disclosed herein, provided that the fluid is suitable for cooling heat load 34a (e.g., the fluid boils at an appropriate temperature) and, in embodiments where the refrigerant fluid is exhausted directly to the environment, regulations and other safety and operating considerations do not inhibit such discharge.

Evaporator

A variety of different evaporator types can be used in system 10. In general, any cold plate may function as the evaporator 32 of the open-circuit refrigeration systems disclosed herein. Evaporator 32 can accommodate any number of and types of refrigerant fluid channels (including mini/micro-channel tubes), blocks of printed circuit heat exchanging structures, or more generally, any heat exchanging structures that are used to transport single-phase or two-phase fluids. The evaporator 32 and/or components thereof, such as fluid transport channels, can be attached to the heat load mechanically, or can be welded, brazed, or bonded to the heat load in any manner.

Figure 11A:
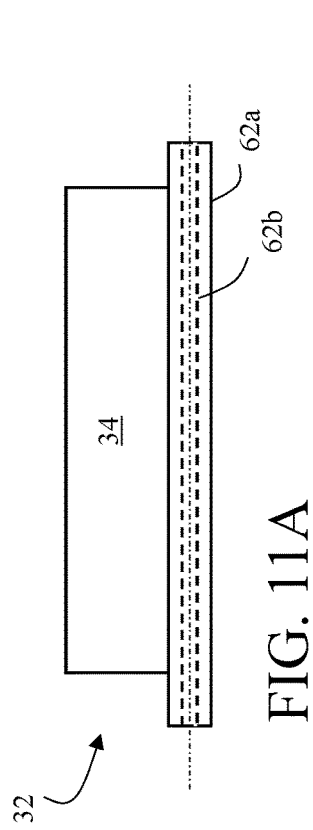
FIGS. 11A and 11B are schematic diagrams showing side and end views, respectively, of an example of the heat load that includes refrigerant fluid channels.
Figure 11B:
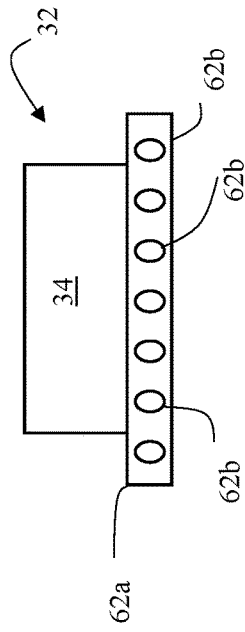

In some embodiments, evaporator 32 (or certain components thereof) can be fabricated as part of the heat load 34 or otherwise integrated into heat load 34. FIGS. 11A and 11B show side and end views, respectively, of a heat load 34 with one or more integrated refrigerant fluid channels 302. The portion of head lead 34 with the refrigerant fluid channel(s) 302 effectively functions as the evaporator 32 for the system.

In general, evaporator 32 functions as a heat exchanger, providing thermal contact between the refrigerant fluid and heat load 34 that is coupled to the any of the open-circuit refrigeration systems 10a-10g or 50a-50f or 110a-110f discussed above. Typically, evaporator 32 includes one or more flow channels extending internally between an inlet and an outlet of the evaporator, allowing refrigerant fluid to flow through the evaporator and absorb heat from heat load 34. A variety of different evaporators can be used. In general, any cold plate may function as the evaporator of the open-circuit refrigeration systems disclosed herein. Evaporator 32 can accommodate any number and type of refrigerant fluid channels (including mini/micro-channel tubes), blocks of printed circuit heat exchanging structures, or more generally, any heat exchanging structures that are used to transport single-phase or two-phase fluids. The evaporator 32 and/or components thereof, such as fluid transport channels, can be attached to the heat load mechanically, or can be welded, brazed, or bonded to the heat load in any manner. In some embodiments, evaporator 32 (or certain components thereof) can be fabricated as part of heat load 34 or otherwise integrated into the heat load 34.

The evaporator 32 can be implemented as plurality of evaporators connected in parallel and/or in series.

FIGS. 11A and 11B show side and end views, respectively, of a heat load 34 on a thermally conductive body 62a with one or more integrated refrigerant fluid channels 62b. The body 62a supporting the heat load 34, which has the refrigerant fluid channel(s) 62b effectively functions as the evaporator 32 for the system. The thermally conductive body 62a can be configured as a cold plate or as a heat exchanging element (such as a mini-channel heat exchanger). Alternatively, the heat loads 34 can be attached to both sides of the thermally conductive body.

During operation of system 10, cooling can be initiated by a variety of different mechanisms. In some embodiments, for example, system 10 includes a temperature sensor attached to load 34. When the temperature of load 34 exceeds a certain temperature set point (i.e., threshold value), the controller 17 (FIG. 15) connected to the temperature sensor can initiate cooling of load 34. Alternatively, in certain embodiments, system 10 operates essentially continuously—provided that the refrigerant fluid pressure within receiver 12 is sufficient—to cool load 34. As soon as receiver 12 is charged with refrigerant fluid, refrigerant fluid is ready to be directed into evaporator 32 to cool load 34. In general, cooling is initiated when a user of the system 10 or the heat load 34 issues a cooling demand.

Upon initiation of a cooling operation, refrigerant fluid from receiver 12 is discharged from the outlet of the receiver 12 and transported through the conduit 24a, through optional valve 16, if present, and is transported through conduit 24b to expansion control device 18, if present, which directly or indirectly controls vapor quality at the evaporator outlet.

In the following discussion, pertaining to FIG. 1, expansion control device 18 and solenoid valve 16 are not present and thus refrigerant fluid from receiver 12 enters the evaporator via conduit directly. The refrigerant fluid cools heat load 34 by having liquid refrigerant convert into a vapor with the vapor being exhausted from the exhaust line through action of the compressor/vacuum pump 19. The initial temperature in the receiver 12 tends to be in equilibrium with the surrounding temperature, and the initial temperature establishes an initial pressure that is different for different refrigerants. The pressure in the evaporator 32 depends on the evaporating temperature, which is lower than the heat load temperature, and is defined during design of the system 10.

In the following discussion, pertaining to FIG. 3, the control device 116 and the valve 118 are not present and thus refrigerant fluid from receiver 12 enters the evaporator 32 via conduit directly into the primary inlet of the ejector 66. Once inside the ejector 66, the refrigerant fluid undergoes constant enthalpy expansion from an initial pressure $p_r$ (i.e., the receiver pressure) to an evaporation pressure pc at the outlet of the ejector 66.

In general, the evaporation pressure pc depends on a variety of factors, most notably the desired temperature set point value (i.e., the target temperature) at which load 34 is to be maintained and the heat input generated by the heat load. The pressure in the evaporator 32 depends on the evaporating temperature, which is lower than the heat load temperature, and is defined during design of the system, as well as subsequent recirculation of refrigerant from the expansion valve 70, which is entrained by the primary flow. The system 10 is operational as long the receiver-to-evaporator pressure difference is sufficient to drive adequate refrigerant fluid flow through the ejector 66.

With any of the embodiments, the initial temperature in the receiver 12 (or 52, 112) tends to be in equilibrium with the surrounding temperature, and the initial temperature establishes an initial pressure that is different for different refrigerants.

Returning to FIG. 5A and presuming use of the gas receiver 14 (not actually shown in FIG. 5A), for operation with gas receiver 14, at some point the gas receiver 14 feeds gas via pressure regulator and conduits (not shown) into the refrigerant receiver 12 (or 52, 112 for the other embodiments). The gas flow can occur at activation of the OCRS-CAEP 50b or can occur at some point after activation of the OCRSCAEP 50b. Similar operational factors apply for OCRSCAEP 50a and OCRSCAEP's 50c-50g.

After undergoing expansion in the ejector 66, the liquid refrigerant fluid is converted to a mixture of liquid and vapor phases at the temperature of the fluid and evaporation pressure pc. The refrigerant fluid in the two-phase state is transported via conduit 24f to the liquid separator 68. Liquid from the liquid separator is fed to the expansion valve 70 is converted to a mixture of liquid and vapor phases at the temperature of the fluid and evaporation pressure pc.

When the refrigerant fluid in the two-phase state is directed into evaporator 32, the liquid phase absorbs heat from load 34, driving a phase transition of the liquid refrigerant fluid into the vapor phase. Because this phase transition occurs at (nominally) constant temperature, the temperature of the refrigerant fluid two-phase state within evaporator 32 remains unchanged, provided at least some liquid refrigerant fluid remains in evaporator 32 to absorb heat.

Further, the constant temperature of the refrigerant fluid in the two-phase state within evaporator 32 can be controlled by adjusting the pressure pc of the refrigerant fluid, since adjustment of $p_e$ changes the boiling temperature of the refrigerant fluid. Thus, by regulating the refrigerant fluid pressure pc upstream from evaporator 32 (e.g., using pressure regulator 13), the temperature of the refrigerant fluid within evaporator 32 (and, nominally, the temperature of heat load 34) can be controlled to match a specific temperature set-point value for load 34, ensuring that load 34 is maintained at, or very near, a target temperature. The pressure drop across the evaporator 32 causes a drop of the temperature of the refrigerant mixture (which is the evaporating temperature), but still the evaporator 32 can be configured to maintain the heat load temperature within the set tolerances.

In some embodiments, for example, the evaporation pressure of the refrigerant fluid can be adjusted by the compressor/vacuum pump 19 (or 59, 119) to ensure that the temperature of heat load 34 is maintained to within ±5 degrees C. (e.g., to within ±4 degrees C., to within ±3 degrees C., to within ±2 degrees C., to within ±1 degree C.) of the temperature set point value for load 34.

As discussed above for OCRSCAEE 50a, within evaporator 32, a portion of the liquid refrigerant is converted to refrigerant vapor by undergoing a phase change. As a result, the refrigerant fluid two-phase state that emerges from evaporator 32 has a higher vapor quality (i.e., the fraction of the vapor phase that exists in refrigerant fluid mixture) than the refrigerant fluid two-phase state that enters evaporator 32. As the refrigerant fluid two-phase state emerges from evaporator 32, the refrigerant fluid is directed into the secondary (low pressure) inlet of the ejector 66 and is entrained by the primary flow (from receiver 12) fed to the inlet 66a of the ejector 66.

The refrigerant fluid emerging from evaporator 32 is transported through conduit 24j to the compressor/vacuum pump 19 (or 59, 119), which directly or indirectly controls the upstream pressure, that is, the evaporating pressure pc in the system. After passing through the compressor/vacuum pump 19 (or 59, 119), the refrigerant fluid is discharged as exhaust through conduit, which functions as an exhaust line for system 10. Refrigerant fluid discharge can occur directly into the environment surrounding system 10. Alternatively, in some embodiments, the refrigerant fluid can be further processed; various features and aspects of such processing are discussed in further detail below.

It should be noted that the foregoing, while discussed sequentially for purposes of clarity, occurs simultaneously and continuously during cooling operations. In other words, gas from receiver 14 is continuously being discharged, as needed, into the receiver 12 and the refrigerant fluid is continuously being discharged from receiver 12, undergoing continuous expansion in ejector 66, continuously being separated into liquid and vapor phases in liquid separator 68, vapor is exhausted through the compressor/vacuum pump 19 (or 59, 119), while liquid is flowing through expansion valve 70 into evaporator 32 and from evaporator 32 into the low pressure inlet of the ejector 66, which flow is entrained by the primary flow. Refrigerant flows continuously through evaporator 32 while heat load 34 is being cooled.

During operation of system 10, as refrigerant fluid is drawn from receiver 12 and used to cool heat load 34, the receiver pressure $p_r$ falls. However, this pressure can be maintained by gas from gas receiver 14 (for embodiments 50a-50g). With either embodiments 50a-50g or 11a, if the refrigerant fluid pressure $p_r$ in receiver 12 is reduced to a value that is too low, the pressure differential $p_r$-$p_e$ may not be adequate to drive sufficient refrigerant fluid mass flow to provide adequate cooling of heat load 34. Accordingly, when the refrigerant fluid pressure $p_r$ in receiver 12 is reduced to a value that is sufficiently low, the capacity of system 10 to maintain a particular temperature set point value for load 34 may be compromised. Therefore, the pressure in the receiver or pressure drop across the expansion valve 70 (or any related refrigerant fluid pressure or pressure drop in system 10) can be an indicator of the remaining operational time. An appropriate warning signal can be issued (e.g., by the controller) to indicate that in certain periods of time, the system may no longer be able to maintain adequate cooling performance; operation of the system can even be halted if the refrigerant fluid pressure in receiver 12 reaches the low-end threshold value.

The refrigerant fluid that emerges from the vapor side 68b of the liquid separator 68 is all or nearly all in the vapor phase. As in OCRSCAEE 50f, 50g, the refrigerant fluid vapor (at a saturated or very high vapor quality fluid vapor, e.g., about 0.95 or higher) can be directed into a heat exchanger coupled to another heat load, and can absorb heat from the additional heat load during propagation through the heat exchanger to cool additional heat loads as discussed in more detail subsequently.

It should be noted that while in the figures only a single receiver 12 is shown, in some embodiments, system 10 can include multiple receivers 12 to allow for operation of the system 10 over an extended time period. Each of the multiple receivers 12 can supply refrigerant fluid to the system 10 to extend to total operating time period. Some embodiments may include plurality of evaporators connected in parallel, which may or may not be accompanied by plurality of expansion valves and plurality of evaporators.

VII. System Operational Control

As discussed in the previous section, by adjusting the pressure pc of the refrigerant fluid, the temperature at which the liquid refrigerant phase undergoes vaporization within evaporator 32 can be controlled. Thus, in general, the temperature of heat load 34 can be controlled by a device or component of system 10 that regulates the pressure of the refrigerant fluid within evaporator 32. Typically, compressor or vacuum pump 19 (or 59, 119) adjusts the upstream refrigerant fluid pressure in system 10. Accordingly, compressor or vacuum pump 19 is generally configured to control the temperature of heat load 34, and can be adjusted to selectively change a temperature set point value (i.e., a target temperature) for heat load 34.

Another system operating parameter is the vapor quality of the refrigerant fluid emerging from evaporator 32. Vapor quality is a number from 0 to 1 and represents the fraction of the refrigerant fluid that is in the vapor phase. Because heat absorbed from load 34 is used to drive a constant-temperature evaporation of liquid refrigerant to form refrigerant vapor in evaporator 32, it is generally important to ensure that, for a particular volume of refrigerant fluid propagating through evaporator 32, at least some of the refrigerant fluid remains in liquid form right up to the point at which the refrigerant exits the evaporator 32 to allow continued heat absorption from heat load 34 without causing a temperature increase of the refrigerant fluid. If the fluid is fully converted to the vapor phase after propagating only partially through evaporator 32, further heat absorption by the (now vapor-phase or two-phase with vapor quality above the critical one driving the evaporation process in the dry-out) refrigerant fluid within evaporator 32 will lead to a temperature increase of the refrigerant fluid and heat load 34.

On the other hand, liquid-phase refrigerant fluid that emerges from evaporator 32 represents unused heat-absorbing capacity, in that the liquid refrigerant fluid did not absorb sufficient heat from load 34 to undergo a phase change. To ensure that system 10 operates efficiently, the amount of unused heat-absorbing capacity should remain relatively small, and should be defined by the critical vapor quality.

In addition, the boiling heat transfer coefficient that characterizes the effectiveness of heat transfer from load 34 to the refrigerant fluid is typically very sensitive to vapor quality. Vapor quality is a thermodynamic property which is a ratio of mass of vapor to total mass of vapor+liquid. As mentioned above, the "critical vapor quality" is a vapor quality=1. When the vapor quality increases from zero towards the critical vapor quality, the heat transfer coefficient increases. However, when the vapor quality reaches the "critical vapor quality," the heat transfer coefficient is abruptly reduced to a very low value, causing dry out within evaporator 32. In this region of operation, the two-phase mixture behaves as superheated vapor.

In general, the critical vapor quality and heat transfer coefficient values vary widely for different refrigerant fluids, and heat and mass fluxes. For all such refrigerant fluids and operating conditions, the systems and methods disclosed herein control the vapor quality at the outlet of the evaporator such that the vapor quality approaches the threshold of the critical vapor quality.

To make maximum use of the heat-absorbing capacity of the two-phase refrigerant fluid state, the vapor quality of the refrigerant fluid emerging from evaporator 32 should nominally be equal to the critical vapor quality. Accordingly, to both efficiently use the heat-absorbing capacity of the two-phase refrigerant fluid and also ensure that the temperature of heat load 34 remains approximately constant at the phase transition temperature of the refrigerant fluid in evaporator 32, the systems and methods disclosed herein are generally configured to adjust the vapor quality of the refrigerant fluid emerging from evaporator 32 to a value that is less than or almost equal to the critical vapor quality.

Another operating consideration for system 10 is the mass flow rate of refrigerant fluid within the system. In open-circuit systems with recirculation of non-evaporated liquid, the mass flow rate is minimized as long as the system discharges at the highest possible vapor quality, which discharge is defined by liquid separator efficiency. Evaporator 32 can be configured to provide minimal mass flow rate controlling maximal vapor quality, which is the critical vapor quality. By minimizing the mass flow rate of the refrigerant fluid according to the cooling requirements for heat load 34, system 10 operates efficiently. Each reduction in the mass flow rate of the refrigerant fluid (while maintaining the same temperature set point value for heat load 34) means that the charge of refrigerant fluid added to receiver 12 initially lasts longer, providing further operating time for system 10.

Within evaporator 32, the vapor quality of a given quantity of refrigerant fluid varies from the evaporator inlet (where vapor quality is lowest) to the evaporator outlet (where vapor quality is highest). Nonetheless, to realize the lowest possible mass flow rate of the refrigerant fluid within the system, the effective vapor quality of the refrigerant fluid within evaporator 32—even when accounting for variations that occur within evaporator 32—should match the critical vapor quality as closely as possible.

In summary, to ensure that the system operates efficiently and the mass flow rate of the refrigerant fluid is relatively low, and at the same time the temperature of heat load 34 is maintained within a relatively small tolerance, system 10 adjusts the vapor quality of the refrigerant fluid emerging from evaporator 32 to a value such that an effective vapor quality within evaporator 32 matches, or nearly matches, the critical vapor quality.

System 10 is generally configured to control the heat load 34 temperature. In some embodiments that use the control device 70, that device 70 can control the vapor quality of the refrigerant fluid emerging from evaporator 32 in response to information about at least one thermodynamic quantity that is either directly or indirectly related to the vapor quality. Control device 29 typically adjusts the temperature of heat load 34 (via upstream refrigerant fluid pressure adjustments) in response to information about at least one thermodynamic quantity that is directly or indirectly related to the temperature of heat load 34. The one or more thermodynamic quantities upon which adjustment of control device 70 is based are different from the one or more thermodynamic quantities upon which adjustment of compressor vacuum pump 19 is based.

The evaporator 32 can be configured to maintain exit vapor quality below the critical vapor quality. That is, for a given set of requirements, e.g., mass flow rate of refrigerant, ambient operating conditions, set point temperature, heat load, desired vapor quality exiting the evaporator, etc., the physical configuration of the evaporate 32 is determined such that the desired vapor quality would be achieved or substantially achieved. This would entail determining a suitable size, e.g., length, width, shape and materials, of the evaporator given the expected operating conditions. Conventional thermodynamic principles can be used to design such an evaporator for a specific set of requirements. In such an instance where the evaporator 32 is configured to maintain exit vapor quality this could eliminate the need for another control device, e.g., at the input to the evaporator 32.

In general, a wide variety of different measurement and control strategies can be implemented in system 10 to achieve the control objectives discussed above. Generally, the control devices can be controlled by measuring a thermodynamic quantity upon which signals are produced to control and adjust the respective devices. The measurements can be implemented in various different ways, depending upon the nature of the devices and the design of the system. As an example, embodiments can optionally include mechanical devices that are controlled by electrical signals, e.g., solenoid controlled valves, regulators, etc. The signals can be produced by sensors and fed to the devices or can be processed by controllers to produce signals to control the devices. The devices can be purely mechanically controlled as well.

It should generally be understood that various control strategies, control devices, and measurement devices can be implemented in a variety of combinations in the systems disclosed herein. Thus, for example, any of the control devices can be implemented as mechanically-controlled devices. In addition, systems with mixed control in which one of the devices is a mechanically controlled device and others are electronically-adjustable devices can also be implemented, along with systems in which all of the control devices are electronically-adjustable devices that are controlled in response to signals measured by one or more sensors and or by sensor signals processed by controller (e.g., dedicated or general processor) circuits. In some embodiments, the systems disclosed herein can include sensors and/or measurement devices that measure various system properties and operating parameters, and transmit electrical signals corresponding to the measured information.

Figure 12:
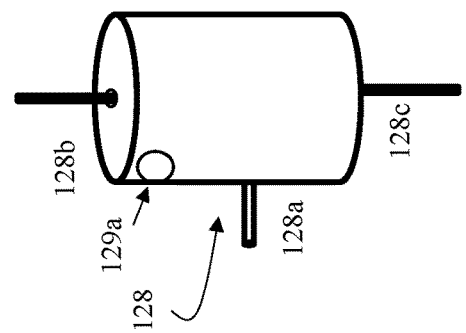

FIG. 12 depicts an configuration for the liquid separator 128, (implemented as a coalescing liquid separator or a flash drum for example), which has ports 128a-128c coupled to conduits (not referenced). Other conventional details such as membranes or meshes, etc. are not shown. Similar considerations can be used for the liquid separator 68 (FIGS. 3, 5A-5F).

FIGS. 12A-12C depict alternative configurations of the liquid separator 128 (implemented as a flash drum for example), which has ports 128a-128c coupled to conduits (not referenced), especially useful for the open-circuit refrigeration system with pump (OCRSCAEP) configurations.

In FIG. 12A, the pump 100 is located distal from the liquid separator port 128c. This configuration potentially presents the possibility of cavitation. To minimize the possibility of cavitation one of the configurations of FIGS. 12B or 12C can be used.

In FIG. 12B, the pump 100 is located distal from the liquid separator port 128c, but the height at which the inlet is located is higher than that of FIG. 12A. This would result in an increase in liquid pressure at the outlet 128c of the liquid separator 128 and concomitant therewith an increase in liquid pressure at the inlet of the pump 100. Increasing the pressure at the inlet to the pump should minimize possibility of cavitation.

Another strategy is presented in FIG. 12C, where the pump 100 is located proximate to or indeed, as shown, inside of the liquid separator port 128c. In addition although not shown the height at which the inlet is located can be adjusted to that of FIG. 12B, rather than the height of FIG. 12A as shown in FIG. 12C. This would result in an increase in liquid pressure at the inlet of the pump 100 further minimizing the possibility of cavitation.

Another alternative strategy that can be used for any of the configurations depicted involves the use of a sensor 129a that produces a signal that is a measure of the height of a column of liquid in the liquid separator. The signal is sent to the controller 17 that will be used to start the pump 100, once a sufficient height of liquid is contained by the liquid separator 128.

Another alternative strategy that can be used for any of the configurations depicted involves the use of a recuperative heat exchanger. The recuperative heat exchanger is an evaporator, which brings into thermal contact two refrigerant streams. In the above systems, a first of the streams is the liquid stream leaving the liquid separator. A second stream is the liquid refrigerant expanded to a pressure lower than the evaporator pressure in the evaporator 32 and evaporating the related evaporating temperature lower than the liquid temperature at the liquid separator exit. Thus, the liquid from the liquid separator exit is subcooled, rejecting thermal energy to the second side of the recuperative heat exchanger. The second side absorbs the rejected thermal energy due to evaporating and superheating of the second refrigerant stream.

Referring now to FIG. 13, the system 10 includes another alternative open-circuit refrigeration system with ejector configuration 50b''' that is similar to the open-circuit refrigeration system (OCRSCAEE) 50b of FIG. 2, including the receiver 52, but also including the gas receiver 14 and the pressure regulator 13, the solenoid control valve 58, expansion valve 56, evaporator 32, liquid separator 68, ejector 66 and compressor/vacuum pump 59 coupled to the exhaust line 27, as discussed above in FIG. 3. Conduits 64a-64k couple the various aforementioned items, as shown. Compressor/vacuum pump 59 is coupled between a recuperative heat exchanger 79 and a back pressure regulator 29.

The OCRSCAEP 50b''' also includes the recuperative heat exchanger 79 having two fluid paths. A first fluid path is between a first inlet and first outlet of the recuperative heat exchanger 79. The first fluid path has the first inlet of recuperative heat exchanger 79 coupled to the outlet of the receiver 12 and the first outlet of the recuperative heat exchanger 79 coupled to the inlet of the valve 58. A second fluid path is between a second inlet and second outlet of the recuperative heat exchanger 79. The second fluid path has the second inlet of recuperative heat exchanger 79 coupled to the vapor side outlet of the liquid separator 68 and the second outlet of the recuperative heat exchanger 79 is coupled to the inlet of the back pressure regulator 29.

In this configuration, the receiver 52 is integrated with the recuperative heat exchanger 100. The recuperative heat exchanger 79 provides thermal contact between the liquid refrigerant leaving the receiver 52 and the refrigerant vapor from the liquid separator 68. The use of the recuperative heat exchanger 79, at the outlet of the receiver 52 may further reduce liquid refrigerant mass flow rate demand from the receiver 52 by re-using the enthalpy of the exhaust vapor to precool the refrigerant liquid entering the evaporator that reduces the enthalpy of the refrigerant entering the evaporator and thus reduces mass flow rate demand and provides a relative increase in energy efficiency of the system 10.

The OCRSCAEP 50b''' with the recuperative heat exchanger 79 can be used with at least the embodiments 50a, 50c-50d or 11a (and corresponding analogs).

Figure 13A:
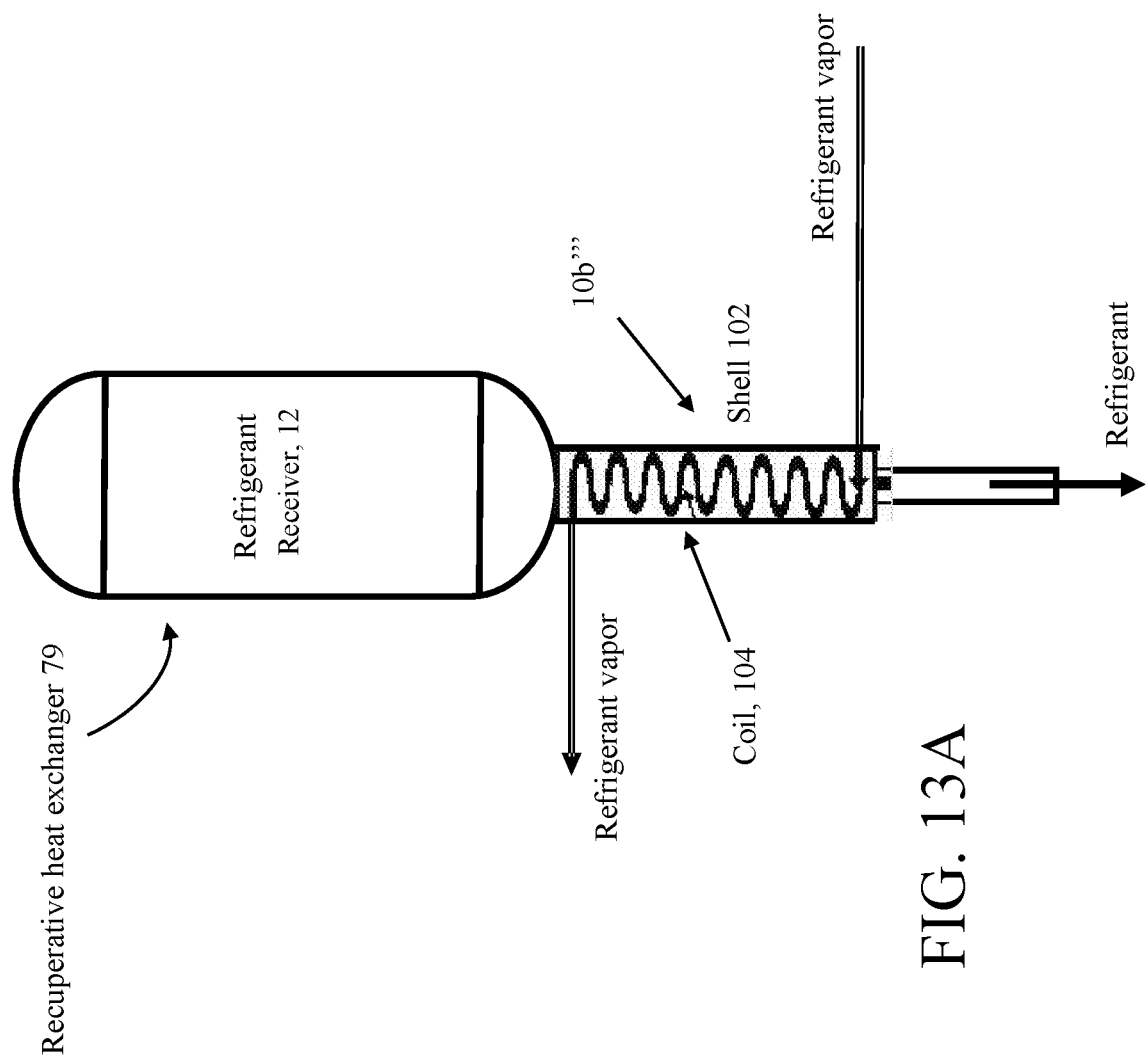
FIG. 13A is a schematic diagram of an example of the recuperative heat exchanger useful in FIG. 13.

Referring now to FIG. 13A, one embodiment of the recuperative heat exchanger 79 is a helical-coil type heat exchanger that includes a shell 102 and a helical coil 104 that is inside the shell 102. The refrigerant liquid stream from the receiver 12 flows though the shell 102 while the vapor stream from the vapor side of the liquid separator flows through the coil 104. The coil 104 can be made of different heat exchanger elements: conventional tubes, mini-channel tubes, cold plate type tubes, etc. The shape of the coil channels can be different as well. Heat from the vapor is transferred from the vapor to the liquid.

Figure 14:
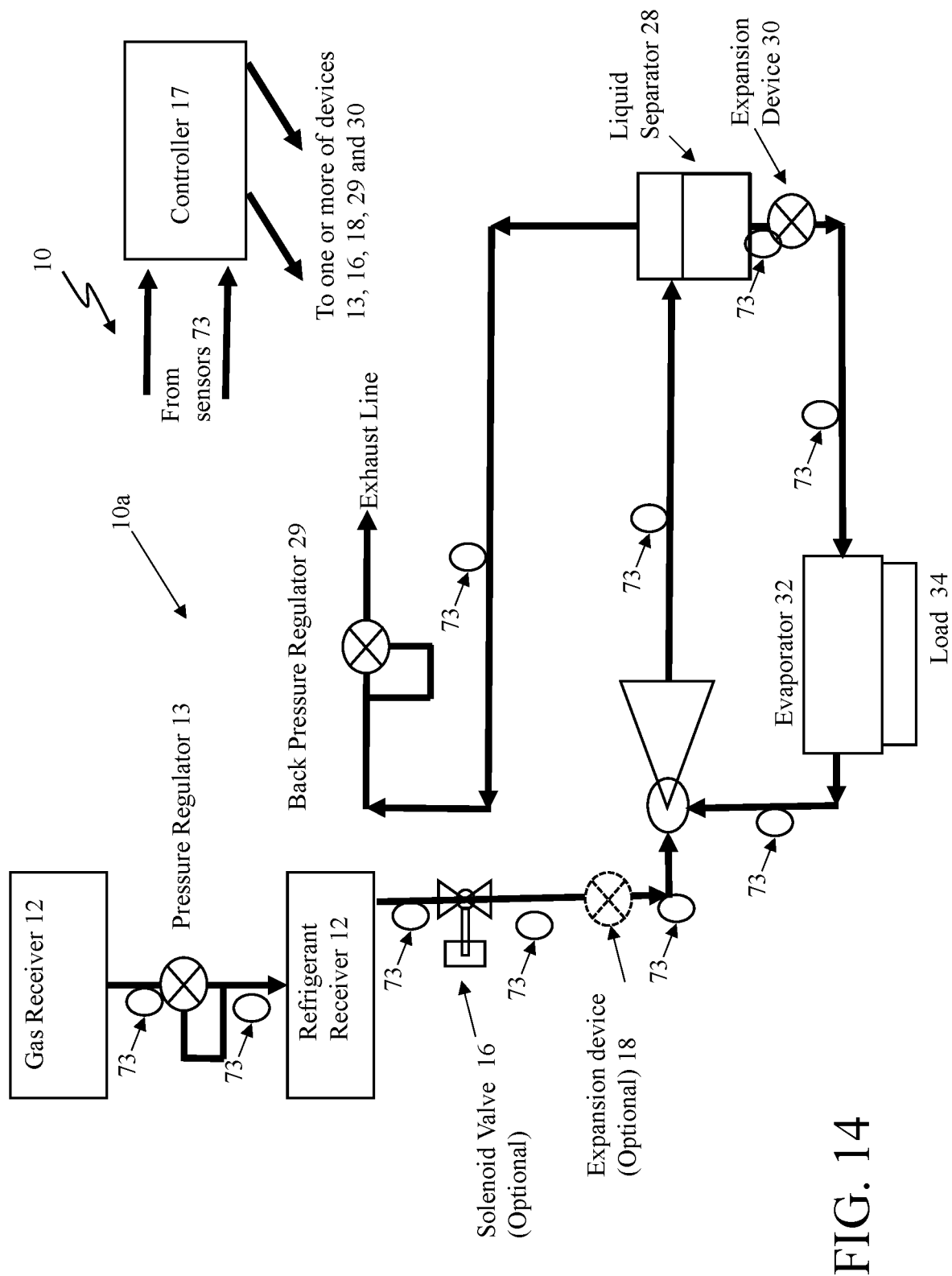
FIG. 14 is a schematic diagram of an example of the thermal management system of FIG. 1 that includes one or more sensors connected to a controller.

FIG. 14 shows the thermal management system 10 of FIG. 3 (representative of any of the variations, e.g., FIGS. 1, 2A-2F, 5A-5F, 6-7F, discussed above) but also including the gas receiver 14 and pressure regulator 13 (FIGS. 8 and 8A, discussed above, both not shown in FIG. 3) with a number of different sensors generally 73 each of which is optional. Various combinations of the sensors 73 shown can be used to measure thermodynamic properties of the system 10 that are used to adjust the control devices or pumps discussed above and which signals are processed by the controller 17. In FIG. 14, connections (not shown) are provided between each of the sensors and controller 17 (wired or wireless). In many embodiments, system includes only certain combinations of the sensors shown (e.g., one, two, three, or four of the sensors) to provide suitable control signals for the first and/or second control device.

Figure 15:
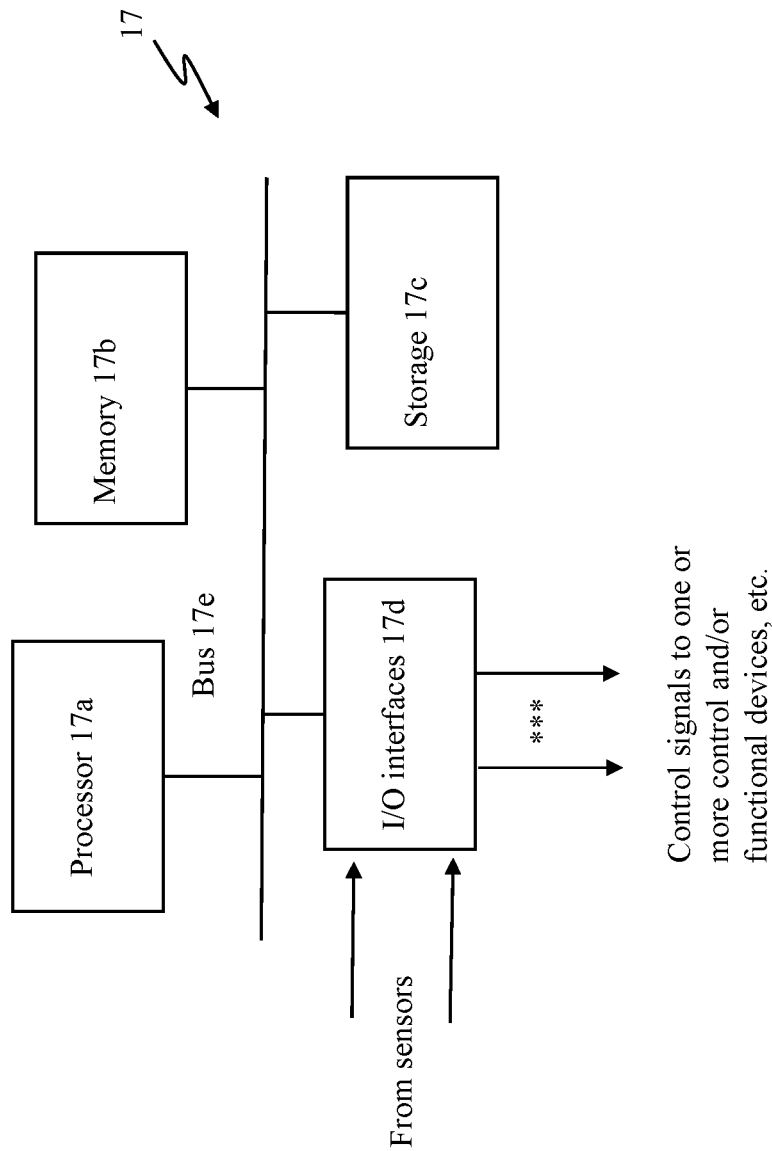
FIG. 15 is a block diagram of a controller.

FIG. 15 shows the controller 17 that includes a processor 17a, memory 17b, storage 17c, and I/O interfaces 17d, all of which are connected/coupled together via a bus 17e. Any two of the optional devices, as pressure sensors upstream and downstream from a control device, can be configured to measure information about a pressure differential $p_r$-$p_e$ across the respective control device and to transmit electronic signals corresponding to the measured pressure from which a pressure difference information can be generated by the controller 17. Other sensors such as flow sensors and temperature sensors can be used as well. In certain embodiments, sensors can be replaced by a single pressure differential sensor, a first end of which is connected adjacent to an inlet and a second end of which is connected adjacent to an outlet of a device to which differential pressure is to be measured, such as the evaporator. The pressure differential sensor measures and transmits information about the refrigerant fluid pressure drop across the device, e.g., the evaporator 32.

Temperatures sensor can be positioned adjacent to an inlet or an outlet of e.g., the evaporator 32 or between the inlet and the outlet. Such as temperature sensor measures temperature information for the refrigerant fluid within evaporator 32 (which represents the evaporating temperature) and transmits an electronic signal corresponding to the measured information. A temperature sensor can be attached to heat load 34, which measures temperature information for the load and transmits an electronic signal corresponding to the measured information. An optional temperature sensor can be adjacent to the outlet of evaporator 32 that measures and transmits information about the temperature of the refrigerant fluid as it emerges from evaporator 32.

In certain embodiments, the systems disclosed herein are configured to determine superheat information for the refrigerant fluid based on temperature and pressure information for the refrigerant fluid measured by any of the sensors disclosed herein. The superheat of the refrigerant vapor refers to the difference between the temperature of the refrigerant fluid vapor at a measurement point in the system and the saturated vapor temperature of the refrigerant fluid defined by the refrigerant pressure at the measurement point in the system.

To determine the superheat associated with the refrigerant fluid, the system controller 17 (as described) receives information about the refrigerant fluid vapor pressure after emerging from a heat exchanger downstream from evaporator 32, and uses calibration information, a lookup table, a mathematical relationship, or other information to determine the saturated vapor temperature for the refrigerant fluid from the pressure information. The controller 17 also receives information about the actual temperature of the refrigerant fluid, and then calculates the superheat associated with the refrigerant fluid as the difference between the actual temperature of the refrigerant fluid and the saturated vapor temperature for the refrigerant fluid.

The foregoing temperature sensors can be implemented in a variety of ways in system 10. As one example, thermocouples and thermistors can function as temperature sensors in system 10. Examples of suitable commercially available temperature sensors for use in system 10 include, but are not limited to, the 88000 series thermocouple surface probes (available from OMEGA Engineering Inc., Norwalk, CT).

System 10 can include a vapor quality sensor that measures vapor quality of the refrigerant fluid emerging from evaporator 32. Typically, such a sensor is implemented as a capacitive sensor that measures a difference in capacitance between the liquid and vapor phases of the refrigerant fluid. The capacitance information can be used to directly determine the vapor quality of the refrigerant fluid (e.g., by system controller 17). Alternatively, sensor can determine the vapor quality directly based on the differential capacitance measurements and transmit an electronic signal that includes information about the refrigerant fluid vapor quality. Examples of commercially available vapor quality sensors that can be used in system 10 include, but are not limited to, HBX sensors (available from HB Products, Hasselager, Denmark).

The systems disclosed herein can include a system controller 17 that receives measurement signals from one or more system sensors and transmits control signals to the control devices to adjust the refrigerant fluid vapor quality and the heat load temperature.

It should generally understood that the systems disclosed herein can include a variety of combinations of the various sensors described above, and controller 17 can receive measurement information periodically or aperiodically from any of the various sensors. Moreover, it should be understood any of the sensors described can operate autonomously, measuring information and transmitting the information to controller 17 (or directly to the first and/or second control device) or, alternatively, any of the sensors described above can measure information when activated by controller 17 via a suitable control signal, and measure and transmit information to controller 17 in response to the activating control signal.

To adjust a control device on a particular value of a measured system parameter value, controller 17 compares the measured value to a set point value (or threshold value) for the system parameter. Certain set point values represent a maximum allowable value of a system parameter, and if the measured value is equal to the set point value (or differs from the set point value by 10% or less (e.g., 5% or less, 3% or less, 1% or less) of the set point value), controller 17 adjusts a respective control device to modify the operating state of the system 10. Certain set point values represent a minimum allowable value of a system parameter, and if the measured value is equal to the set point value (or differs from the set point value by 10% or less (e.g., 5% or less, 3% or less, 1% or less) of the set point value), controller 17 adjusts the respective control device to modify the operating state of the system 10, and increase the system parameter value. The controller 17 executes algorithms that use the measured sensor value(s) to provide signals that cause the various control devices to adjust refrigerant flow rates, etc.

Some set point values represent "target" values of system parameters. For such system parameters, if the measured parameter value differs from the set point value by 1% or more (e.g., 3% or more, 5% or more, 10% or more, 20% or more), controller 17 adjusts the respective control device to adjust the operating state of the system, so that the system parameter value more closely matches the set point value.

Optional pressure sensors are configured to measure information about the pressure differential $p_r$-$p_e$ across a control device and to transmit an electronic signal corresponding to the measured pressure difference information. Two sensors can effectively measure $p_r$, $p_e$. In certain embodiments two sensors can be replaced by a single pressure differential sensor. Where a pressure differential sensor is used, a first end of the sensor is connected upstream of a first control device and a second end of the sensor is connected downstream from first control device.

System also includes optional pressure sensors positioned at the inlet and outlet, respectively, of evaporator 32. A sensor measures and transmits information about the refrigerant fluid pressure upstream from evaporator 32, and a sensor measure and transmit information about the refrigerant fluid pressure downstream from evaporator 32. This information can be used (e.g., by a system controller) to calculate the refrigerant fluid pressure drop across evaporator 32. As above, in certain embodiments, sensors can be replaced by a single pressure differential sensor to measure and transmit the refrigerant fluid pressure drop across evaporator 32.

To measure the evaporating pressure ($p_e$) a sensor can be optionally positioned between the inlet and outlet of evaporator 32, i.e., internal to evaporator 32. In such a configuration, the sensor can provide a direct a direct measurement of the evaporating pressure.

To measure refrigerant fluid pressure at other locations within system, sensor can also optionally be positioned, for example, in-line along conduit. Alternatively, sensor can be positioned at or near an inlet of compressor/vacuum pump 19. Pressure sensors at each of these locations can be used to provide information about the refrigerant fluid pressure downstream from evaporator 32, or the pressure drop across evaporator 32.

System includes an optional temperature sensor which can be positioned adjacent to an inlet or an outlet of evaporator 32, or between the inlet and the outlet to measure temperature information for the refrigerant fluid within evaporator 32 (which represents the evaporating temperature) and transmits an electronic signal corresponding to the measured information. System can also include an optional temperature sensor attached to heat load 34, which measures temperature information for the load and transmits an electronic signal corresponding to the measured information.

System includes an optional temperature sensor adjacent to the outlet of evaporator 32 that measures and transmits information about the temperature of the refrigerant fluid as it emerges from evaporator 32.

In certain embodiments, the systems disclosed herein are configured to determine superheat information for the refrigerant fluid based on temperature and pressure information for the refrigerant fluid measured by any of the sensors disclosed herein. The superheat of the refrigerant vapor refers to the difference between the temperature of the refrigerant fluid vapor at a measurement point in the system and the saturated vapor temperature of the refrigerant fluid defined by the refrigerant pressure at the measurement point in the system.

It should be appreciated that, in the foregoing discussion, any one or various combinations of two sensors discussed in connection with system can correspond to the first measurement device connected to control device 18, and any one or various combination of two sensors can correspond to the second measurement device connected to compressor/vacuum pump 19. In general, as discussed previously, the first measurement device provides information corresponding to a first thermodynamic quantity to the first control device, and the second measurement device provides information corresponding to a second thermodynamic quantity to the second control device, where the first and second thermodynamic quantities are different, and therefore allow the first and second control device to independently control two different system properties (e.g., the vapor quality of the refrigerant fluid and the heat load temperature, respectively).

In some embodiments, one or more of the sensors shown in system are connected directly to control device 18 and/or to compressor/vacuum pump 19. The first and second control device can be configured to adaptively respond directly to the transmitted signals from the sensors, thereby providing for automatic adjustment of the system's operating parameters. In certain embodiments, the first and/or second control device can include processing hardware and/or software components that receive transmitted signals from the sensors, optionally perform computational operations, and activate elements of the first and/or second control device to adjust the control device in response to the sensor signals.

In addition, controller 17 is optionally connected to control device 18 and compressor/vacuum pump 19. In embodiments where either control device 18 or compressor/vacuum pump 19 (or both) is/are implemented as a device controllable via an electrical control signal, controller 17 is configured to transmit suitable control signals to the first and/or second control device to adjust the configuration of these components. In particular, controller 17 is optionally configured to adjust control device 18 to control the vapor quality of the refrigerant fluid in system and optionally configured to adjust compressor/vacuum pump 19 to control the temperature of heat load 34.

During operation of system, controller 17 typically receives measurement signals from one or more sensors. The measurements can be received periodically (e.g., at consistent, recurring intervals) or irregularly, depending upon the nature of the measurements and the manner in which the measurement information is used by controller 17. In some embodiments, certain measurements are performed by controller 17 after particular conditions—such as a measured parameter value exceeding or falling below an associated set point value—are reached.

It should generally be understood that the systems disclosed herein can include a variety of combinations of the various sensors described above, and controller 17 can receive measurement information periodically or aperiodically from any of the various sensors. Moreover, it should be understood any of the sensors described can operate autonomously, measuring information and transmitting the information to controller 17 (or directly to the first and/or second control device), or alternatively, any of the sensors described above can measure information when activated by controller 17 via a suitable control signal, and measure and transmit information to controller 17 in response to the activating control signal.

By way of example, Table 1 summarizes various examples of combinations of types of information (e.g., system properties and thermodynamic quantities) that can be measured by the sensors of system and transmitted to controller 17, to allow controller 17 to generate and transmit suitable control signals to control device 18 and/or compressor/vacuum pump 19. The types of information shown in Table 1 can generally be measured using any suitable device (including combination of one or more of the sensors discussed herein) to provide measurement information to controller 17.

TABLE 1

|  |  | Measurement Information Used to Adjust First Control Device | | | | | | | |
|---|---|---|---|---|---|---|---|---|---|
|  |  | FCM Press Drop | Evap Press Drop | Rec Pres | VQ | SH | Evap VQ | Evap P/T | HL Temp |
| Measurement Information Used to Adjust Second Control Device | FCM Press Drop |  |  |  |  |  |  | x | x |
|  | Evap Press Drop |  |  |  |  |  |  | x | x |
|  | Rec Press |  |  |  |  |  |  | x | x |
|  | VQ |  |  |  |  |  |  | x | x |
|  | SH |  |  |  |  |  |  | x | x |
|  | Evap VQ |  |  |  |  |  |  | x | x |
|  | Evap P/T | x | x | x | x | x | x |  | x |
|  | HL Temp | x | x | x | x | x | x | x |  |

FCM Press Drop=refrigerant fluid pressure drop across first control device

Evap Press Drop=refrigerant fluid pressure drop across evaporator

Rec Press=refrigerant fluid pressure in receiver

VQ=vapor quality of refrigerant fluid

SH=superheat of refrigerant fluid

Evap VQ=vapor quality of refrigerant fluid at evaporator outlet

Evap P/T=evaporation pressure or temperature

HL Temp=heat load temperature

For example, in some embodiments, control device 18 is adjusted (e.g., automatically or by controller 17) based on a measurement of the evaporation pressure ($p_e$) of the refrigerant fluid and/or a measurement of the evaporation temperature of the refrigerant fluid. With control device 18 adjusted in this manner, compressor/vacuum pump 19 can be adjusted (e.g., automatically or by controller 17) based on measurements of one or more of the following system parameter values: the pressure drop across control device 18, the pressure drop across evaporator 32, the refrigerant fluid pressure in receiver 12, the vapor quality of the refrigerant fluid emerging from evaporator 32 (or at another location in the system), the superheat value of the refrigerant fluid, and the temperature of heat load 34.

In certain embodiments, control device 18 is adjusted (e.g., automatically or by controller 17) based on a measurement of the temperature of heat load 34. With control device 18 adjusted in this manner, compressor/vacuum pump 19 can be adjusted (e.g., automatically or by controller 17) based on measurements of one or more of the following system parameter values: the pressure drop across control device 18, the pressure drop across evaporator 32, the refrigerant fluid pressure in receiver 12, the vapor quality of the refrigerant fluid emerging from evaporator 32 (or at another location in the system), the superheat value of the refrigerant fluid, and the evaporation pressure ($p_e$) and/or evaporation temperature of the refrigerant fluid.

In some embodiments, controller 17 adjusts the speed of the compressor/vacuum pump 19 based on a measurement of the evaporation pressure pc of the refrigerant fluid downstream from control device 18 and/or a measurement of the evaporation temperature of the refrigerant fluid. With compressor/vacuum pump 19 adjusted based on this measurement, controller 17 can adjust control device 18 based on measurements of one or more of the following system parameter values: the pressure drop ($p_r$-$p_e$) across control device 18, the pressure drop across evaporator 32, the refrigerant fluid pressure in receiver 12 ($p_r$), the vapor quality of the refrigerant fluid emerging from evaporator 32 (or at another location in the system), the superheat value of the refrigerant fluid in the system, and the temperature of heat load 34.

In certain embodiments, controller 17 adjusts the speed of the compressor/vacuum pump 19 based on a measurement of the temperature of heat load 34 (e.g., measured by sensor 124). Controller 17 can also adjust control device 18 based on measurements of one or more of the following system parameter values: the pressure drop ($p_r$-$p_e$) across control device 18, the pressure drop across evaporator 32, the refrigerant fluid pressure in receiver 12 ($p_r$), the vapor quality of the refrigerant fluid emerging from evaporator 32 (or at another location in the system), the superheat value of the refrigerant fluid in the system, the evaporation pressure ($p_e$) of the refrigerant fluid, and the evaporation temperature of the refrigerant fluid.

To adjust either control device 18 (FIGS. 1, 2A-2E) or control device 68 (FIGS. 3, 5A-5D, 8) or control device 116 (FIGS. 6, 7A-7E) or compressor vacuum pump 19 (or 59, 119) based on a particular value of a measured system parameter value, controller 17 compares the measured value to a set point value (or threshold value) for the system parameter. Consider FIG. 1, certain set point values represent a maximum allowable value of a system parameter, and if the measured value is equal to the set point value (or differs from the set point value by 10% or less (e.g., 5% or less, 3% or less, 1% or less) of the set point value), controller 17 adjusts control device 18 and/or compressor vacuum pump 19 to adjust the operating state of the system, and reduce the system parameter value.

Certain set point values represent a minimum allowable value of a system parameter, and if the measured value is equal to the set point value (or differs from the set point value by 10% or less (e.g., 5% or less, 3% or less, 1% or less) of the set point value), controller 17 adjusts control device 18 and/or compressor vacuum pump 19 to adjust the operating state of the system, and increase the system parameter value.

Some set point values represent "target" values of system parameters. For such system parameters, if the measured parameter value differs from the set point value by 1% or more (e.g., 3% or more, 5% or more, 10% or more, 20% or more), controller 17 adjusts control device 18 and/or compressor vacuum pump 19 to adjust the operating state of the system, so that the system parameter value more closely matches the set point value.

Measured parameter values are assessed in relative terms based on set point values (i.e., as a percentage of set point values). Alternatively, in some embodiments, measured parameter values can be accessed in absolute terms. For example, if a measured system parameter value differs from a set point value by more than a certain amount (e.g., by 1 degree C. or more, 2 degrees C. or more, 3 degrees C. or more, 4 degrees C. or more, 5 degrees C. or more), then controller 17 adjusts control device 18 and/or compressor vacuum pump 19 to adjust the operating state of the system, so that the measured system parameter value more closely matches the set point value.

In the foregoing examples, measured parameter values are assessed in relative terms based on set point values (i.e., as a percentage of set point values). Alternatively, in some embodiments, measured parameter values can be in absolute terms. For example, if a measured system parameter value differs from a set point value by more than a certain amount (e.g., by 1 degree C. or more, 2 degrees C. or more, 3 degrees C. or more, 4 degrees C. or more, 5 degrees C. or more), then controller 17 adjusts control device 18 and/or compressor/ vacuum pump 19 to adjust the operating state of the system, so that the measured system parameter value more closely matches the set point value.

In certain embodiments, refrigerant fluid emerging from evaporator 32 can be used to cool one or more additional heat loads. In addition, systems can include a second heat load connected to a heat exchanger. A variety of mechanical connections can be used to attach second heat load to heat exchanger, including (but not limited to) brazing, clamping, welding, and any of the other connection types discussed herein.

Heat exchanger includes one or more flow channels through which high vapor quality refrigerant fluid flows after leaving evaporator 32. During operation, as the refrigerant fluid vapor phases through the flow channels, it absorbs heat energy from second heat load, cooling second heat load. Typically, second heat load is not as sensitive as heat load 34 to fluctuations in temperature. Accordingly, while second heat load is generally not cooled as precisely relative to a particular temperature set point value as heat load 34, the refrigerant fluid vapor provides cooling that adequately matches the temperature constraints for second heat load.

In general the systems disclosed herein can include more than one (e.g., two or more, three or more, four or more, five or more, or even more) heat loads in addition to heat loads depicted. Each of the additional heat loads can have an associated heat exchanger; in some embodiments, multiple additional heat loads are connected to a single heat exchanger, and in certain embodiments, each additional heat load has its own heat exchanger. Moreover, each of the additional heat loads can be cooled by the superheated refrigerant fluid vapor after a heat exchanger attached to the second load or cooled by the high vapor quality fluid stream that emerges from evaporator 32.

Although evaporator 32 and heat exchanger are implemented as separate components, in certain embodiments, these components can be integrated to form a single heat exchanger, with heat load and second heat load both connected to the single heat exchanger. The refrigerant fluid vapor that is discharged from the evaporator portion of the single heat exchanger is used to cool second heat load, which is connected to a second portion of the single heat exchanger.

The vapor quality of the refrigerant fluid after passing through evaporator 32 can be controlled either directly or indirectly with respect to a vapor quality set point by controller 17. In some embodiments, the system includes a vapor quality sensor that provides a direct measurement of vapor quality, which is transmitted to controller 17. Controller 17 adjusts control device, e.g., 19, 46, 70, 59, 53, 119, depending on configuration to control the vapor quality relative to the vapor quality set point value.

In certain embodiments, the system includes a sensor that measures superheat and indirectly, vapor quality. For example, a combination of temperature and pressure sensors measure the refrigerant fluid superheat downstream from a second heat load, and transmit the measurements to controller 17. Controller 17 adjusts control device according to the configuration based on the measured superheat relative to a superheat set point value. By doing so, controller 17 indirectly adjusts the vapor quality of the refrigerant fluid emerging from evaporator 32.

In some embodiments, controller 17 can adjust compressor/vacuum pump 19 based on measurements of the superheat value of the refrigerant fluid vapor that are performed downstream from a second heat load that is cooled by the superheated refrigerant fluid vapor.

As the two refrigerant fluid streams flow in opposite directions within recuperative heat exchanger, heat is transferred from the refrigerant fluid emerging from evaporator 32 to the refrigerant fluid entering control device 18. Heat transfer between the refrigerant fluid streams can have a number of advantages. For example, recuperative heat transfer can increase the refrigeration effect in evaporator 32, thereby reducing the refrigerant mass transfer rate implemented to handle the heat load presented by heat load 34. Further, by reducing the refrigerant mass transfer rate through evaporator 32, the amount of refrigerant used to provide cooling duty in a given period of time is reduced. As a result, for a given initial quantity of refrigerant fluid introduced into receiver 12, the operational time over which the system can operate before an additional refrigerant fluid charge is needed can be extended. Alternatively, for the system to effectively cool heat load 34 for a given period of time, a smaller initial charge of refrigerant fluid into receiver 12 can be used.

Because the liquid and vapor phases of the two-phase mixture of refrigerant fluid generated following expansion of the refrigerant fluid in control device 18 can be used for different cooling applications, in some embodiments, the system can include a phase separator to separate the liquid and vapor phases into separate refrigerant streams that follow different flow paths within the system.

Further, eliminating (or nearly eliminating) the refrigerant vapor from the refrigerant fluid stream entering evaporator 32 can help to reduce the cross-section of the evaporator and improve film boiling in the refrigerant channels. In film boiling, the liquid phase (in the form of a film) is physically separated from the walls of the refrigerant channels by a layer of refrigerant vapor, leading to poor thermal contact and heat transfer between the refrigerant liquid and the refrigerant channels. Reducing film boiling improves the efficiency of heat transfer and the cooling performance of evaporator 32.

In addition, by eliminating (or nearly eliminating) the refrigerant vapor from the refrigerant fluid stream entering evaporator 32, distribution of the liquid refrigerant within the channels of evaporator 32 can be made easier. In certain embodiments, vapor present in the refrigerant channels of evaporator 32 can oppose the flow of liquid refrigerant into the channels. Diverting the vapor phase of the refrigerant fluid before the fluid enters evaporator 32 can help to reduce this difficulty.

In addition to phase separator, or as an alternative to phase separator, in some embodiments the systems disclosed herein can include a phase separator downstream from evaporator 32. Such a configuration can be used when the refrigerant fluid emerging from evaporator is not entirely in the vapor phase, and still includes liquid refrigerant fluid.

VIII. Additional Features of Thermal Management Systems

The foregoing examples of thermal management systems illustrate a number of features that can be included in any of the systems within the scope of this disclosure. In addition, a variety of other features can be present in such systems.

In certain embodiments, refrigerant fluid that is discharged from evaporator 32 and passes through conduit and compressor/vacuum pump 19 can be directly discharged as exhaust from conduit without further treatment. Direct discharge provides a convenient and straightforward method for handling spent refrigerant, and has the added advantage that over time, the overall weight of the system is reduced due to the loss of refrigerant fluid. For systems that are mounted to small vehicles or are otherwise mobile, this reduction in weight can be important.

In some embodiments, however, refrigerant fluid vapor can be further processed before it is discharged. Further processing may be desirable depending upon the nature of the refrigerant fluid that is used, as direct discharge of unprocessed refrigerant fluid vapor may be hazardous to humans and/or may be deleterious to mechanical and/or electronic devices in the vicinity of the system. For example, the unprocessed refrigerant fluid vapor may be flammable or toxic, or may corrode metallic device components. In situations such as these, additional processing of the refrigerant fluid vapor may be desirable.

In general, refrigerant processing apparatus can be implemented in various ways. In some embodiments, refrigerant processing apparatus is a chemical scrubber or water-based scrubber. Within apparatus, the refrigerant fluid is exposed to one or more chemical agents that treat the refrigerant fluid vapor to reduce its deleterious properties. For example, where the refrigerant fluid vapor is basic (e.g., ammonia) or acidic, the refrigerant fluid vapor can be exposed to one or more chemical agents that neutralize the vapor and yield a less basic or acidic product that can be collected for disposal or discharged from apparatus.

As another example, where the refrigerant fluid vapor is highly chemically reactive, the refrigerant fluid vapor can be exposed to one or more chemical agents that oxidize, reduce, or otherwise react with the refrigerant fluid vapor to yield a less reactive product that can be collected for disposal or discharged from apparatus.

In certain embodiments, refrigerant processing apparatus 802 can be implemented as an adsorptive sink for the refrigerant fluid. Apparatus 802 can include, for example, an adsorbent material bed that binds particles of the refrigerant fluid vapor, trapping the refrigerant fluid within apparatus and preventing discharge. The adsorptive process can sequester the refrigerant fluid particles within the adsorbent material bed, which can then be removed from apparatus and sent for disposal.

In some embodiments, where the refrigerant fluid is flammable, refrigerant processing apparatus can be implemented as an incinerator. Incoming refrigerant fluid vapor can be mixed with oxygen or another oxidizing agent and ignited to combust the refrigerant fluid. The combustion products can be discharged from the incinerator or collected (e.g., via an adsorbent material bed) for later disposal.

As an alternative, refrigerant processing apparatus can also be implemented as a combustor of an engine or another mechanical power-generating device. Refrigerant fluid vapor from conduit can be mixed with oxygen, for example, and combusted in a piston-based engine or turbine to perform mechanical work, such as providing drive power for a vehicle or driving a generator to produce electricity. In certain embodiments, the generated electricity can be used to provide electrical operating power for one or more devices, including heat load 34. For example, heat load 34 can include one or more electronic devices that are powered, at least in part, by electrical energy generated from combustion of refrigerant fluid vapor in refrigerant processing apparatus.

The thermal management systems disclosed herein can optionally include a phase separator upstream from the refrigerant processing apparatus or a phase separator also downstream from the compressor/vacuum pump 19.

Particularly during start-up of the systems disclosed herein, liquid refrigerant may be present in conduits because the systems generally begin operation before heat load 34 and/or heat load are activated. Accordingly, phase separator functions in a manner similar to phase separators to separate liquid refrigerant fluid from refrigerant vapor. The separated liquid refrigerant fluid can be re-directed to another portion of the system, or retained within phase separator until it is converted to refrigerant vapor. By using phase separator, liquid refrigerant fluid can be prevented from entering refrigerant processing apparatus.

IX. Integration with Power Systems

In some embodiments, the refrigeration systems disclosed herein can be combined with power systems to form integrated power and thermal systems, in which certain components of the integrated systems are responsible for providing refrigeration functions and certain components of the integrated systems are responsible for generating operating power.

Figure 16:
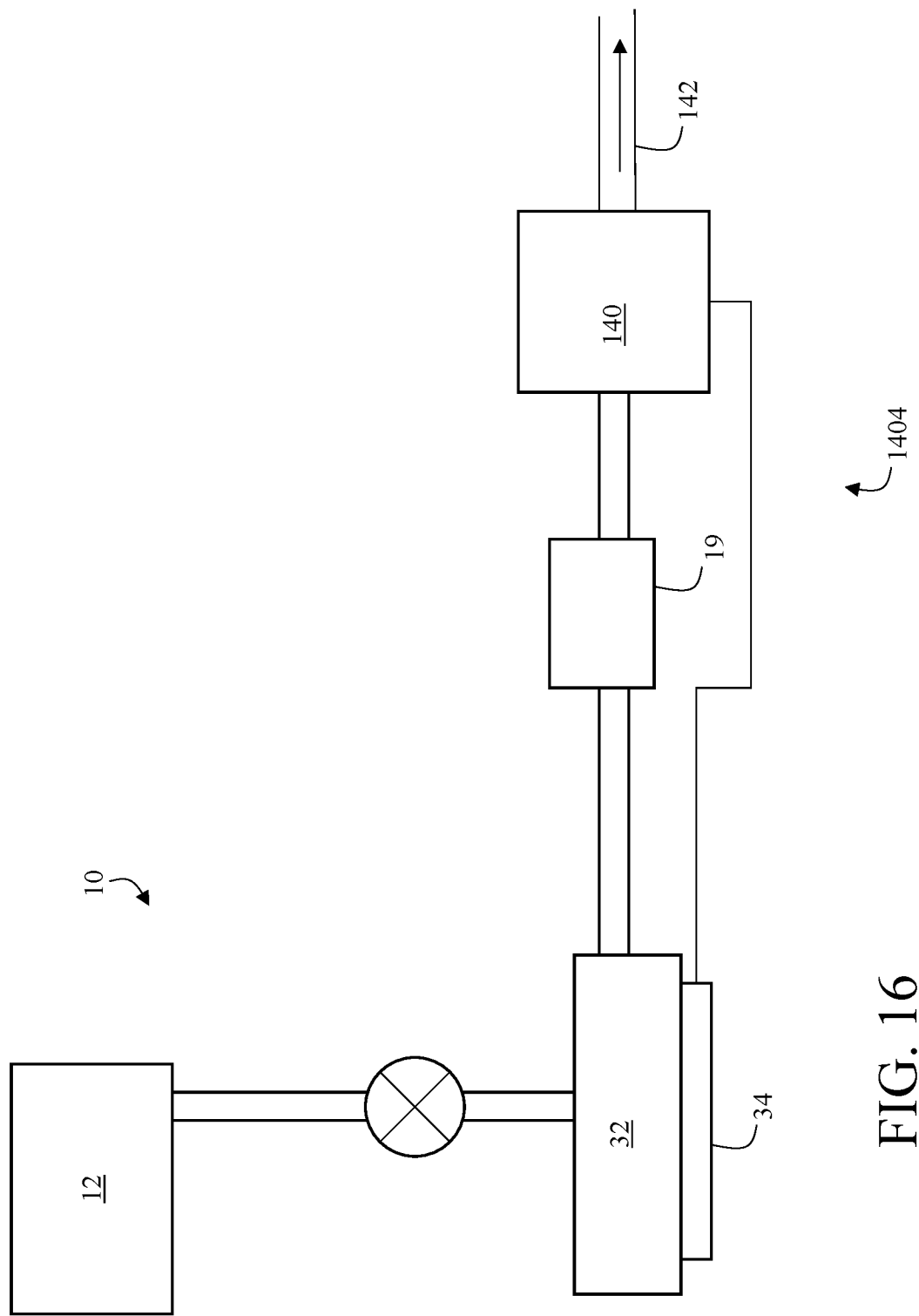
FIG. 16 is a schematic diagram of an example of a thermal management system that includes a power generation apparatus.

FIG. 16 shows an integrated power and thermal management system 10 that includes many features similar to those discussed above (e.g., see FIG. 1). In addition, system 10 includes an engine 140 with an inlet that receives the stream of waste refrigerant fluid that enters conduit after passing through compressor/vacuum pump 19. Engine 140 can combust the waste refrigerant fluid directly, or alternatively, can mix the waste refrigerant fluid with one or more additives (such as oxidizers) before combustion. Where ammonia is used as the refrigerant fluid in system 10, suitable engine configurations for both direct ammonia combustion as fuel, and combustion of ammonia mixed with other additives, can be implemented. In general, combustion of ammonia improves the efficiency of power generation by the engine.

The energy released from combustion of the refrigerant fluid can be used by engine 140 to generate electrical power, e.g., by using the energy to drive a generator. The electrical power can be delivered via electrical connection to heat load 34 to provide operating power for the load. For example, in certain embodiments, heat load 34 includes one or more electrical circuits and/or electronic devices, and engine 140 provides operating power to the circuits/devices via combustion of refrigerant fluid. Byproducts 142 of the combustion process can be discharged from engine 140 via exhaust conduit, as shown in FIG. 13.

Various types of engines and power-generating devices can be implemented as engine 140 in system 10. In some embodiments, for example, engine 140 is a conventional four cycle piston-based engine, and the waste refrigerant fluid is introduced into a combustor of the engine. In certain embodiments, engine 140 is a gas turbine engine, and the waste refrigerant fluid is introduced via the engine inlet to the afterburner of the gas turbine engine. In other embodiments, is introduced into the afterburner of a gas turbine engine or after the afterburner to be incinerated by a spent exhaust stream from the engine.

As discussed above, in some embodiments, system 10 can include phase separator (not shown) positioned upstream from engine 140 and either downstream or upstream from compressor/vacuum pump 19. Phase separator functions to prevent liquid refrigerant fluid from entering engine 140, which may reduce the efficiency of electrical power generation by engine 140.

X. Start-Up and Temporary Operation

In certain embodiments, the thermal management systems disclosed herein operate differently at, and immediately following, system start-up, compared to the manner in which the systems operate after an extended running period. Upon start-up, refrigerant fluid in receiver 12 may be relatively cold, and therefore the receiver pressure ($p_r$) may be lower than a typical receiver pressure during extended operation of the system. However, if receiver pressure $p_r$ is too low, the system may be unable to maintain a sufficient mass flow rate of refrigerant fluid through evaporator 32 to adequately cool heat load 34.

As discussed, receiver 12 can optionally include a heater 12d (especially when the system does not include the gas receiver 14). Heater 12d can generally be implemented as any of a variety of different conventional heaters, including resistive heaters. In addition, heater 12d can correspond to a device or apparatus that transfers some of the enthalpy of the exhaust from engine 140 into receiver 12, or a device or apparatus that transfers enthalpy from any other heat source into receiver 12.

During cold start-up, controller 17 activates heater 12d to evaporate portion of the refrigerant fluid in receiver 12 and raise the vapor pressure and pressure $p_r$. This allows the system to deliver refrigerant fluid into evaporator 32 at a sufficient mass flow rate. As the refrigerant fluid in receiver 12 warms up, heater 12d can be deactivated by controller 17. By heating refrigerant fluid within receiver 12 at start-up, the system can begin to cool heat load 34 after a relatively short warm-up period.

Controller 17 can also activate heater 12d to re-heat refrigerant fluid in receiver 12 between cooling cycles. Thus, for example, when the system runs periodically to provide intermittent cooling of heat load 34, controller 17 can activate heater 12d when the system is not running to ensure that when system operation resumes, the receiver pressure $p_r$ in receiver 12 is sufficient to deliver refrigerant fluid to evaporator 32 at the desired mass flow rate almost immediately. During the system operation the heater typically provides heat input at a reduced rate to maintain an acceptable refrigerant fluid pressure receiver 12. Insulation around receiver 12 can help to reduce heating demands.

For most applications it is envisioned that the gas receiver 14, storing nitrogen and/or the compressor can be used to elevate pressure in the refrigerant receiver 12 to start the system, would be more preferred options to the heater 12d.

XI. Integration with Directed Energy Systems

The thermal management systems and methods disclosed herein can be implemented as part of (or in conjunction with) directed energy systems such as high energy laser systems. Due to their nature, directed energy systems typically present a number of cooling challenges, including certain heat loads for which temperatures are maintained during operation within a relatively narrow range.

Figure 17:
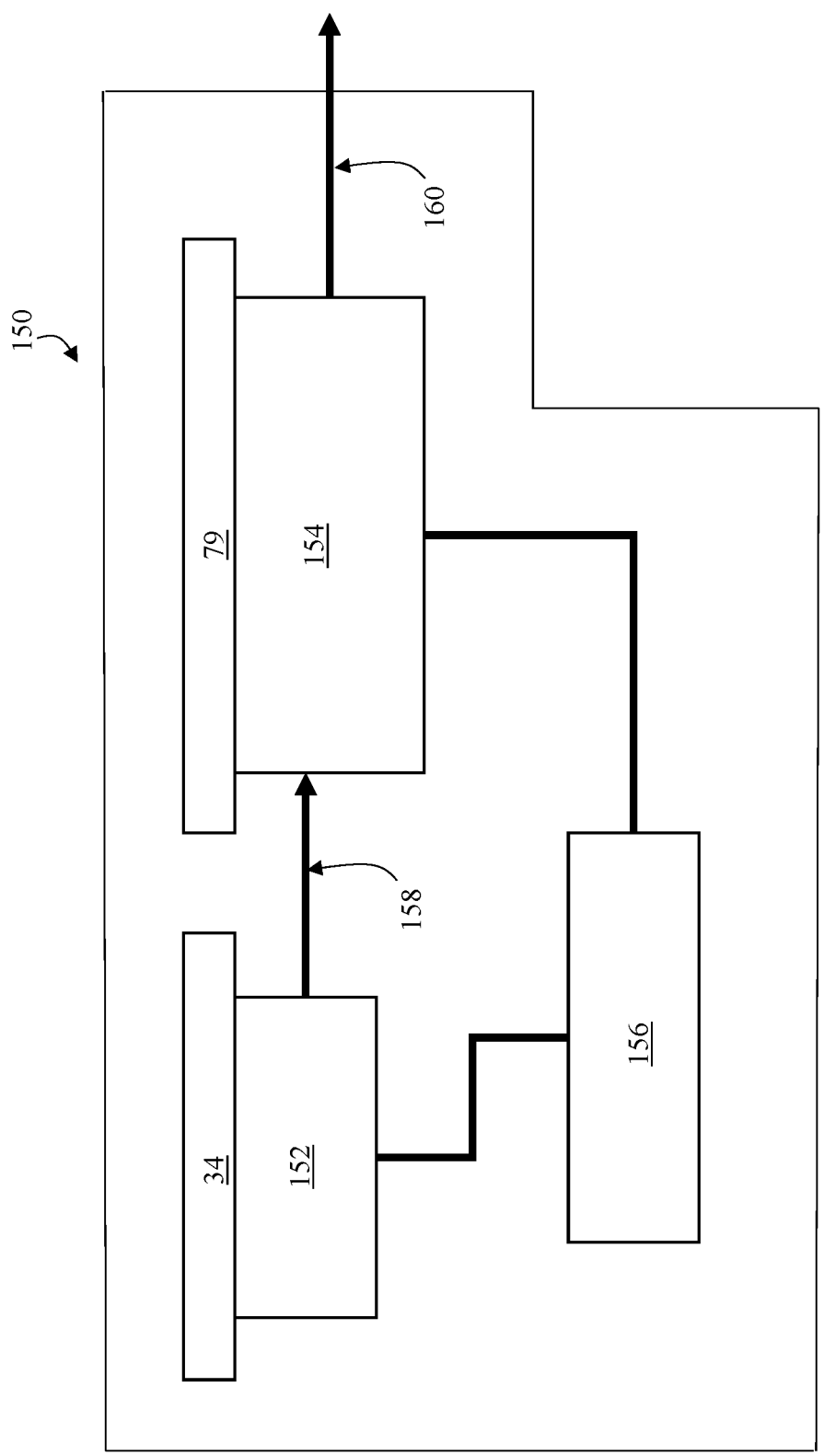
FIG. 17 is a schematic diagram of an example of directed energy system that includes a thermal management system.

FIG. 17 shows one example of a directed energy system, specifically, a high energy laser system 150. System 150 includes a bank of one or more laser diodes 152 and an amplifier 154 connected to a power source 156. During operation, laser diodes 152 generate an output radiation beam 158 that is amplified by amplifier 154, and directed as output beam 160 onto a target. Generation of high energy output beams can result in the production of significant quantities of heat. Certain laser diodes, however, are relatively temperature sensitive, and the operating temperature of such diodes is regulated within a relatively narrow range of temperatures to ensure efficient operation and avoid thermal damage. Amplifiers are also temperature-sensitively, although typically less sensitive than diodes.

To regulate the temperatures of various components of directed energy systems such as diodes 152 and amplifier 154, such systems can include components and features of the thermal management systems disclosed herein. In FIG. 17, evaporator 32 is coupled to diodes 152, while heat exchanger 79 is coupled to amplifier 154. The other components of the thermal management systems disclosed herein are not shown for clarity. However, it should be understood that any of the features and components discussed above can optionally be included in directed energy systems. Diodes 152, due to their temperature-sensitive nature, effectively function as heat load 34 in system 150, while amplifier 154 functions as heat load 35.

System 150 is one example of a directed energy system that can include various features and components of the thermal management systems and methods described herein. However, it should be appreciated that the thermal management systems and methods are general in nature, and can be applied to cool a variety of different heat loads under a wide range of operating conditions.

XII. Hardware and Software Implementations

Controller 17 can generally be implemented as any one of a variety of different electrical or electronic computing or processing devices, and can perform any combination of the various steps discussed above to control various components of the disclosed thermal management systems.

Controller 17 can generally, and optionally, include any one or more of a processor (or multiple processors), a memory, a storage device, and input/output device. Some or all of these components can be interconnected using a system bus. The processor is capable of processing instructions for execution. In some embodiments, the processor is a single-threaded processor. In certain embodiments, the processor is a multi-threaded processor. Typically, the processor is capable of processing instructions stored in the memory or on the storage device to display graphical information for a user interface on the input/output device, and to execute the various monitoring and control functions discussed above. Suitable processors for the systems disclosed herein include both general and special purpose microprocessors, and the sole processor or one of multiple processors of any kind of computer or computing device.

The memory stores information within the system, and can be a computer-readable medium, such as a volatile or non-volatile memory. The storage device can be capable of providing mass storage for the controller 17. In general, the storage device can include any non-transitory tangible media configured to store computer readable instructions. For example, the storage device can include a computer-readable medium and associated components, including: magnetic disks, such as internal hard disks and removable disks; magneto-optical disks; and optical disks. Storage devices suitable for tangibly embodying computer program instructions and data include all forms of non-volatile memory including by way of example, semiconductor memory devices, such as EPROM, EEPROM, and flash memory devices; magnetic disks such as internal hard disks and removable disks; magneto-optical disks; and CD-ROM and DVD-ROM disks. Processors and memory units of the systems disclosed herein can be supplemented by, or incorporated in, ASICs (application-specific integrated circuits).

The input/output device provides input/output operations for controller 17, and can include a keyboard and/or pointing device. In some embodiments, the input/output device includes a display unit for displaying graphical user interfaces and system related information.

The features described herein, including components for performing various measurement, monitoring, control, and communication functions, can be implemented in digital electronic circuitry, or in computer hardware, firmware, or in combinations of them. Methods steps can be implemented in a computer program product tangibly embodied in an information carrier, e.g., in a machine-readable storage device, for execution by a programmable processor (e.g., of controller 17), and features can be performed by a programmable processor executing such a program of instructions to perform any of the steps and functions described above. Computer programs suitable for execution by one or more system processors include a set of instructions that can be used directly or indirectly, to cause a processor or other computing device executing the instructions to perform certain activities, including the various steps discussed above.

Computer programs suitable for use with the systems and methods disclosed herein can be written in any form of programming language, including compiled or interpreted languages, and can be deployed in any form, including as stand-alone programs or as modules, components, subroutines, or other units suitable for use in a computing environment.

In addition to one or more processors and/or computing components implemented as part of controller 17, the systems disclosed herein can include additional processors and/or computing components within any of the control device (e.g., control device 18 and/or compressor/vacuum pump 19) and any of the sensors discussed above. Processors and/or computing components of the control devices and sensors, and software programs and instructions that are executed by such processors and/or computing components, can generally have any of the features discussed above in connection with controller 17.

Other Embodiments

A number of embodiments have been described. Nevertheless, it will be understood that various modifications may be made without departing from the spirit and scope of the disclosure. Accordingly, other embodiments are within the scope of the following claims.

What is claimed is:

1. A thermal management system, comprising:
    an open-circuit refrigeration system having an open-circuit refrigerant fluid flow path, with the open-circuit refrigeration system comprising:
        a receiver configured to store a refrigerant fluid, with the receiver having a receiver outlet;
        an evaporator configured to receive the refrigerant fluid and to extract heat from a heat load that contacts the evaporator, the evaporator having an evaporator inlet and an evaporator outlet;
        a vapor pump having a pump inlet configured to receive refrigerant vapor from the evaporator outlet and having a pump outlet that is configured to output compressed refrigerant;
        an exhaust line; and
        a back pressure regulator disposed in the open-circuit refrigerant fluid flow path in line with the pump outlet at a back pressure regulator inlet and disposed in the open-circuit refrigerant fluid flow path in line with the exhaust line at a back pressure regulator outlet, wherein the compressed refrigerant is discharged through the back pressure regulator outlet to the exhaust line, wherein the compressed refrigerant is discharged at the back pressure regulator outlet and is not returned to the receiver, and wherein the receiver, the evaporator, the vapor pump, the back pressure regulator, and the exhaust line are fluidly connected in the open-circuit refrigerant fluid flow path.

2. The thermal management system of claim 1 wherein the vapor pump is a vacuum pump that is configured to control a refrigerant fluid pressure according to a specified evaporation temperature, and assist in controlled discharge of refrigerant vapor from the open-circuit refrigerant fluid flow path by the back pressure regulator.

3. The thermal management system of claim 1 wherein the evaporator of the open-circuit refrigeration system is configured to control temperature of a heat load, at least in part, by operation of the vapor pump and the back pressure regulator.

4. The thermal management system of claim 1 wherein the vapor pump is one of a variable speed pump, a compressor, and a vacuum pump.

5. The thermal management system of claim 1 wherein the back pressure regulator is configured to regulate refrigerant flow at the back pressure regulator inlet to a set point value of inlet pressure.

6. The thermal management system of claim 1, further comprising:
a junction device disposed in the open-circuit refrigerant fluid flow path between the vapor pump and the back pressure regulator, with the junction device having an inlet configured to receive the compressed refrigerant from the pump outlet, the junction device having a first outlet and a second outlet, wherein the junction device is configured to divert a portion of the compressed refrigerant from the pump outlet out of the first outlet and into an inlet of the receiver, and direct a remaining portion of the compressed refrigerant to the back pressure regulator inlet.

7. The thermal management system of claim 6 wherein the thermal management system is further configured to use the portion of the compressed refrigerant diverted by the junction device to control pressure in the receiver to extend operation of the system.

8. The thermal management system of claim 7 wherein the thermal management system is further configured to maintain the portion of the compressed refrigerant diverted by the junction device at a substantially constant pressure in the receiver.

9. The thermal management system of claim 1 wherein the back pressure regulator is a fixed control device.

10. The thermal management system of claim 1 wherein the refrigerant fluid is water.

11. The thermal management system of claim 1 wherein the refrigerant fluid is ammonia.

12. The thermal management system of claim 1 further comprising one or more expansion valves configured to control a superheat condition of the compressed refrigerant at the outlet.

13. The thermal management system of claim 1 further comprising:
an expansion valve; and
a sensor device configured to measure one or more thermodynamic properties of the refrigerant fluid in the open-circuit refrigeration fluid flow path and produce signals representing the measured one or more thermodynamic properties.

14. The thermal management system of claim 13 wherein the sensor is configured to produce one or more sensor signals that are measures of one or more thermodynamic properties of the refrigerant fluid, and the expansion valve is configured to cause the evaporator to operate at a superheat condition.

15. The thermal management system of claim 14, further comprising a controller system configured to determine the superheat condition based on the one or more sensor signals produced from the sensor device.

16. The thermal management system of claim 14, further comprising:
a controller system that includes a processor device and memory operatively coupled to the processor device and configured to determine the superheat condition based on the signals produced from the sensor device, wherein the signals are representative of at least one or more of pressure and temperature measurements of the refrigerant fluid exiting the evaporator.

17. The thermal management system of claim 1, further comprising:
an expansion valve disposed in the open-circuit refrigerant fluid flow path between the receiver outlet and the evaporator inlet and configured to control a vapor quality of the compressed refrigerant at the evaporator outlet.

18. The thermal management system of claim 17 wherein the expansion valve is configured to control the vapor quality of the compressed refrigerant to within a threshold of a value of "1" at the evaporator outlet and provide substantially only refrigerant vapor to the pump inlet.

19. The thermal management system of claim 17 wherein the expansion valve is an electrically controllable expansion valve, with the system further comprising:
a controller system that includes a processor device and memory operatively coupled to the processor device, with the controller system configured to send a control signal to the electrically controllable expansion valve to control operation of the electrically controllable expansion valve.

20. The thermal management system of claim 17, further comprising:
one or more sensor devices configured to produce one or more sensor signals that are representative of one or more thermodynamic properties of the refrigerant fluid in the open-circuit refrigeration fluid flow path.

21. The thermal management system of claim 20, further comprising:
a controller system that comprises:
a processor device; and
memory coupled to the processor device, the processor device configured to execute computer instructions to cause the controller system to perform operations comprising:
receiving the one or more sensor signals produced by the one or more sensor devices;
calculating a state of the refrigerant fluid at the outlet of the receiver according to values of the one or more sensor signals; and
providing the one or more control signals to control an electrically controllable expansion valve to cause the open-circuit refrigeration system to operate with a controlled vapor quality at the evaporator outlet.

22. The thermal management system of claim 17 wherein the expansion valve is configured to control the vapor quality to within a threshold of critical vapor quality of 1.0.

23. The thermal management system of claim 22 wherein the refrigerant fluid comprises ammonia.

24. The thermal management system of claim 17 wherein the open-circuit refrigeration system is configured to operate with a controlled vapor quality at the evaporator outlet, where vapor quality is a ratio of mass of vapor to mass of liquid plus mass of vapor.

25. The thermal management system of claim 1, further comprising:
- an electronically controlled expansion valve disposed in the open-circuit refrigerant fluid flow path between the outlet of the receiver and the inlet of the evaporator;
- one or more sensor devices that produce one or more measures of one or more thermodynamic properties of the refrigerant fluid; and
- a controller system comprising:
  - a processor device; and
  - memory operatively coupled to the processor device, with the controller system configurable by execution of computer instructions to control one or more of the vapor pump, the back pressure regulator, and the electronically controlled expansion valve.

26. The thermal management system of claim 1 wherein the receiver is a first receiver, the open-circuit refrigeration system further comprising:
- a second receiver configured to store a gas, with the second receiver coupled in the open-circuit refrigerant fluid flow path to the first receiver.

27. The thermal management system of claim 26, further comprising:
- a control device that is configured to control a flow of the gas from the second receiver to the first receiver to regulate a vapor pressure in the first receiver and to maintain a target vapor pressure in the first receiver during operation of the system.

28. The thermal management system of claim 27 wherein the control device is a pressure regulator having a pressure regulator inlet coupled to the second receiver and a pressure regulator outlet coupled to the first receiver, and which pressure regulator regulates a pressure at the pressure regulator outlet.

29. The thermal management system of claim 28 wherein the control device is a first control device, the open-circuit refrigeration system further comprising:
- a second control device, the second control device configured to:
  - receive liquid refrigerant fluid from the first receiver at a first pressure;
  - expand the liquid refrigerant fluid to generate a liquid/vapor refrigerant fluid mixture at a second pressure; and
  - direct the liquid/vapor refrigerant fluid mixture into the evaporator.

30. The thermal management system of claim 29 wherein the second control device comprises an expansion valve that is coupled between the outlet of the first receiver and the inlet of the evaporator, and which expansion valve provides a constant-enthalpy expansion of the liquid refrigerant fluid to generate the liquid/vapor refrigerant fluid mixture and cause the evaporator to operate at a superheat.

31. The thermal management system of claim 30 wherein the expansion valve is an electronically controllable expansion valve.

32. The thermal management system of claim 1, wherein the receiver is a first receiver, the open-circuit refrigeration system further comprising:
- a second receiver configured to store a gas, with the second receiver coupled in the open-circuit refrigerant fluid flow path to the first receiver, wherein the gas does not react chemically with the refrigerant fluid.

33. The thermal management system of claim 32, wherein the gas comprises at least one gas selected from the group consisting of nitrogen, argon, xenon, and helium.

34. The thermal management system of claim 1 wherein the heat load is a laser system.

\* \* \* \* \*